(12) United States Patent
Watfa et al.

(10) Patent No.: US 11,240,647 B2
(45) Date of Patent: Feb. 1, 2022

(54) EFFICIENT VEHICULAR SERVICES

(71) Applicant: CONVIDA WIRELESS, LLC, Wilmington, DE (US)

(72) Inventors: Mahmoud Watfa, Quebec (CA); Chonggang Wang, Princeton, NJ (US); Quang Ly, North Wales, PA (US); Xu Li, Plainsboro, NJ (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/618,897

(22) PCT Filed: Jun. 8, 2018

(86) PCT No.: PCT/US2018/036589
§ 371 (c)(1),
(2) Date: Dec. 3, 2019

(87) PCT Pub. No.: WO2018/227039
PCT Pub. Date: Dec. 13, 2018

(65) Prior Publication Data
US 2020/0228948 A1 Jul. 16, 2020

Related U.S. Application Data

(60) Provisional application No. 62/517,469, filed on Jun. 9, 2017.

(51) Int. Cl.
*H04W 4/44* (2018.01)
*H04W 36/00* (2009.01)
(Continued)

(52) U.S. Cl.
CPC ......... *H04W 4/44* (2018.02); *H04W 36/0061* (2013.01); *H04W 36/00835* (2018.08);
(Continued)

(58) Field of Classification Search
CPC . H04W 4/44; H04W 36/03; H04W 36/00835; H04W 36/0061; H04W 48/12; H04W 48/14; H04W 80/04
(Continued)

(56) References Cited

U.S. PATENT DOCUMENTS

2015/0282240 A1* 10/2015 Visuri ................. H04W 4/025
370/329

FOREIGN PATENT DOCUMENTS

WO 2017/052683 A1 3/2017

OTHER PUBLICATIONS

"Benamar et al., ""Transmission of IPv6 Packets over IFFF 802.11 Networks operating in mode Outside the Context of a Basic Service Set (IPv6-over-80211-OCB)""", Network Working Group, Feb. 2018, 15 pages."
(Continued)

*Primary Examiner* — Nghi H Ly
(74) *Attorney, Agent, or Firm* — BakerHostetler

(57) ABSTRACT

Current approaches to vehicular services lack capabilities and efficiencies. As described herein, various embodiments improve how information is shared among road side units, vehicles, road side unit repositories, and pedestrians. Further, new information is defined to enhance vehicular capabilities.

20 Claims, 33 Drawing Sheets

(51) Int. Cl.
  *H04W 48/12* (2009.01)
  *H04W 48/14* (2009.01)
  *H04W 80/04* (2009.01)

(52) U.S. Cl.
  CPC ........... *H04W 36/03* (2018.08); *H04W 48/12* (2013.01); *H04W 48/14* (2013.01); *H04W 80/04* (2013.01)

(58) Field of Classification Search
  USPC ........ 370/310, 329, 328, 338, 341, 345, 350
  See application file for complete search history.

(56) References Cited

OTHER PUBLICATIONS

3GPP TR 21.905, "3rd Generation Partnership Project; Vocabulary for 3GPP Specifications", http://www.3gpp.org/DynaReport/21905.htm, 1 page.
3GPP TS 23.303 V14.1.0, "3rd Generation Partnership Project; Universal Mobile Telecommunications System (UMTS); LTE; Proximity-based Services, Stage 2, Release 14", 2017, 128 pages.
Bormann et al., "Neighbor Discovery Optimization for IPv6 over Low-Power Wireless Personal Area Networks (6LoWPANs)", Internet Engineering Task Force, RFC 6775, Nov. 2012, 56 pages.
Futurewei et al., "Problem Statement for IP in ITS use cases C-ACC and Platooning draft-petrescu-its-problem-03.txt", Network Working Group, Jul. 2016, 8 pages.
Gundavelli et al., "Proxy Mobile IPv6", Network Working Group, RFC 5213, Aug. 2008, 93 pages.
IEEE Standards for Wireless Access in Vehicular Environments (WAVE)—Architecture (IEEE 1609.0).
IEEE Standards for Wireless Access in Vehicular Environments (WAVE)—Networking Services (IEEE 1609.3).
IETF IPWAVE WG, "IP Wireless Access in Vehicular Environments (ipwave)", (https://datatracker.ietf.org/wg/ipwave/about/), 4 pages.
Jeong et al., "Survey on IP-based Vehicular Networking for Intelligent Transportation Systems draft-ietf-ipwave-vehicular-networking-survey-00", Network Working Group, Jul. 2017, 38 pages.
Jeong et al., "IPv6 Neighbor Discovery for Prefix and Service Discovery in Vehicular Networks draft-jeong-its-vehicular-neighbor-discovery-00", Network Working Group, Jul. 2016, 10 pages.
Jeong et al., "Problem Statement for Vehicle-to-Infrastructure Networking draft-jeong-ipwave-v2i-problem-statement-00", Network Working Group, Mar. 2017, 15 pages.
Junsik et al., "IPv6 neighbor discovery for prefix and service discovery in vehicular networks", International Conference On Information And Communication Technology Convergence (ICTC), IEEE, Oct. 19, 2016, pp. 231-236.
Lu et al., "VIP-WAVE: On the Feasibility of IP Communications in 802.11p Vehicular Networks", IEEE Transactions or Intelligent Transportation Systems, vol. 14, Issue 1, Mar. 2013, pp. 82-97.
Narten et al., "Neighbor Discovery for IP version 6 (IPv6)", Network Working Group, RFC: 4861, Sep. 2007, 97 pages.
Yan et al., "Requirements for Data Aggregation in Intelligent Transportation Systems", Network Working Group, draft-yan-its-aggregation-00.txt, Apr. 2016, 7 pages.

* cited by examiner

| Type | Code | Checksum |
|------|------|----------|
| | Reserved | |
| Options... | | |

Fig. 22

| Type | Code | Checksum |
|------|------|----------|
| | Reserved | Length |
| RSU Info Container | | |
| Options... | | |

Fig. 23

| Type | Length | Reserved 1 |
|---|---|---|
| | Reserved 2 | More Options |
| Source Link Layer Address | | |
| Group ID | | |

| Type | Length | Reserved 1 |
|---|---|---|
| | Reserved 2 | |
| Access Type | Length | Reserved 3 | More Options |
| Link Layer Address (for Indicated Access Type) | | | |
| [Optional] IP Address/Prefix (for Indicated Access Type) | | | |

One Entry

EFFICIENT VEHICULAR SERVICES

CROSS-REFERENCE TO RELATED APPLICATIONS

This application is the National Stage Application of International Patent Application No. PCT/US2018/036589 filed Jun. 8, 2018, which claims the benefit of U.S. Provisional Patent Application Ser. No. 62/517,469, filed Jun. 9, 2017, the disclosure of both of these applications is hereby incorporated by reference as if set forth in its entirety herein.

BACKGROUND

One of the emerging interne of things (Io)T applications is vehicle-to-vehicle (V2V) communication that enables cars to exchange, among other messages, safety-related messages (e.g., warnings related to sudden stops, communications related to the presence of road hazards, etc.) and positioning-related messages (e.g., location information, driving direction information, speed information, etc.) to attain increased driving safety and efficiency. These types of messages, which may be referred to generally as safety messages, can be transported as non-IP data using Dedicated Short Range Communication (DSRC) links. The Wireless Access in Vehicular Environment (WAVE) Short Message Protocol (WSMP) carries non-IP data that can be transmitted over IEEE 802.11 technology (hereafter referred to as 802.11), which is one form of DSRC links. FIG. 1 shows an example WAVE communication stack with the WSMP above the logical link control (LLC) layer. FIG. 1 is an example in which 802.11 is used. The WAVE Media Access Control (MAC) also supports transmission of IPv6 packets that are also located above the LLC layer in the stack. Both IPv6 packets and WSMP protocol data units (PDUs) may be considered data by the WAVE MAC and LLC layers, and hence may be part of the WAVE Data Plane. The Management Plane provides management functions such as, for example, time synchronization for channel coordination, processing service requests, and advertisements.

Infotainment is another example service that may be enabled by vehicular communications. Infotainment generally refers entertainment within a car, and may include, for example, music and video streaming, news, online gaming, web browsing, etc. As shown in FIG. 2, WAVE communication is expected to use the 5.9 GHz band with a total of 75 MHz bandwidth, over which several channels may be defined as shown in FIG. 2. Referring to the example channels shown in FIG. 2, Channel 178 is a control channel (CCH), and the each of the other channels is a service channel (SCH). In some cases, due to their importance, safety messages are allowed to be transmitted on both a CCH and a SCH. Otherwise IP packets are typically only allowed on a SCH. In some cases, IPv6 can be used for vehicular communications because it has enough "space" to accommodate the very large number of vehicles.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

In an example embodiment, a road side unit receives configuration information related to how the road side unit should advertise information associated with the road side unit. Based on the configuration information, the road side unit may send a transmission of information associated with the road side unit. The transmission may be sent over a channel to one or more vehicles, such that the road side unit is selectable by the one or more vehicles based on the information associated with the road side unit. The information associated with the road side unit may include at least one of a location of the road side unit, a coverage area associated with the road side unit, or one or more services obtainable via the road side unit. The information can be generally referred to as road side unit information. In some examples, the transmission may be sent in a neighbor discovery message, and the information associated with the road side unit further may include information associated with one or more road side units adjacent to the road side unit.

In another example embodiment, a vehicle apparatus stores road side unit information associated with a plurality of road side units. The vehicle may receive a request, from another vehicle apparatus, for a history of detected road side units (or a road side unit detection history). In response to the request, the vehicle may send at least a portion of the road side unit detection history to the other vehicle apparatus. In some examples, before storing the road side unit information associated with the plurality of road side units, the vehicle may detect the road side unit information, such that the stored road side unit information represents the road side unit detection history of the vehicle apparatus. The stored road side unit information associated each road side unit may be further associated with at least one of a respective location or a respective time at which the road side unit information was detected by the vehicle apparatus.

In yet another example embodiment, an apparatus may send a solicitation message to a road side unit. The solicitation message may request one or more access technologies supported by the road side unit. In response to the solicitation message, the apparatus may receive a response message from the road side unit. The response message may indicate the one or more access technologies supported by the road side unit. Based on the response message, the apparatus may store information comprising the one or more access technologies supported by the road side unit. Further, the apparatus may establish communication with the road side unit over one of the one or more access technologies supported by the road side unit.

In still another embodiment, a vehicle may send a request, to a road side unit repository, for service information associated with an area. In response to the request, the apparatus may receive, from the road side unit repository, a response comprising the service information associated with the area, wherein the response indicates a location or boundary for which the road side unit repository is responsible. When the vehicle apparatus moves outside of the location or boundary for which the road side unit repository is responsible, the vehicle apparatus may send a second request, to a road side unit, for an address of another road side unit repository. In some cases, a plurality of road side units are registered to the road side unit repository, such that the road side unit repository comprises service information associated with each of the plurality of road side units.

In yet another embodiment, an apparatus receives an indication that a vehicle apparatus is capable of communicating with the apparatus over a wireless connection. The apparatus sends a message toward the vehicle apparatus, wherein the message indicates criteria for switching between radio access technologies. The apparatus receives data, via a road side unit, from the vehicle apparatus. Based, at least in part, on the criteria for switching between radio access technologies, the apparatus receives direct communication from the vehicle apparatus over the wireless connection. Receiving direct communication may include receiving data associated with the vehicle apparatus, and the data may include at least one of a location of the vehicle apparatus, a speed of the vehicle apparatus, or a direction of the vehicle apparatus. Based on the data, the apparatus may establish a tunnel with a target road side unit. Further, the apparatus may send connection information over the tunnel to the target road side unit, such that the target road side unit can establish an association with the vehicle apparatus using the connection information. Further still, the apparatus may send an instruction to the vehicle apparatus to switch radio access technologies.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 22 depicts an example of a new ND message for soliciting RSU information.

FIG. 23 depicts an example of a new ND message for advertising RSU information.

DETAILED DESCRIPTION OF ILLUSTRATIVE EMBODIMENTS

Figure 1:
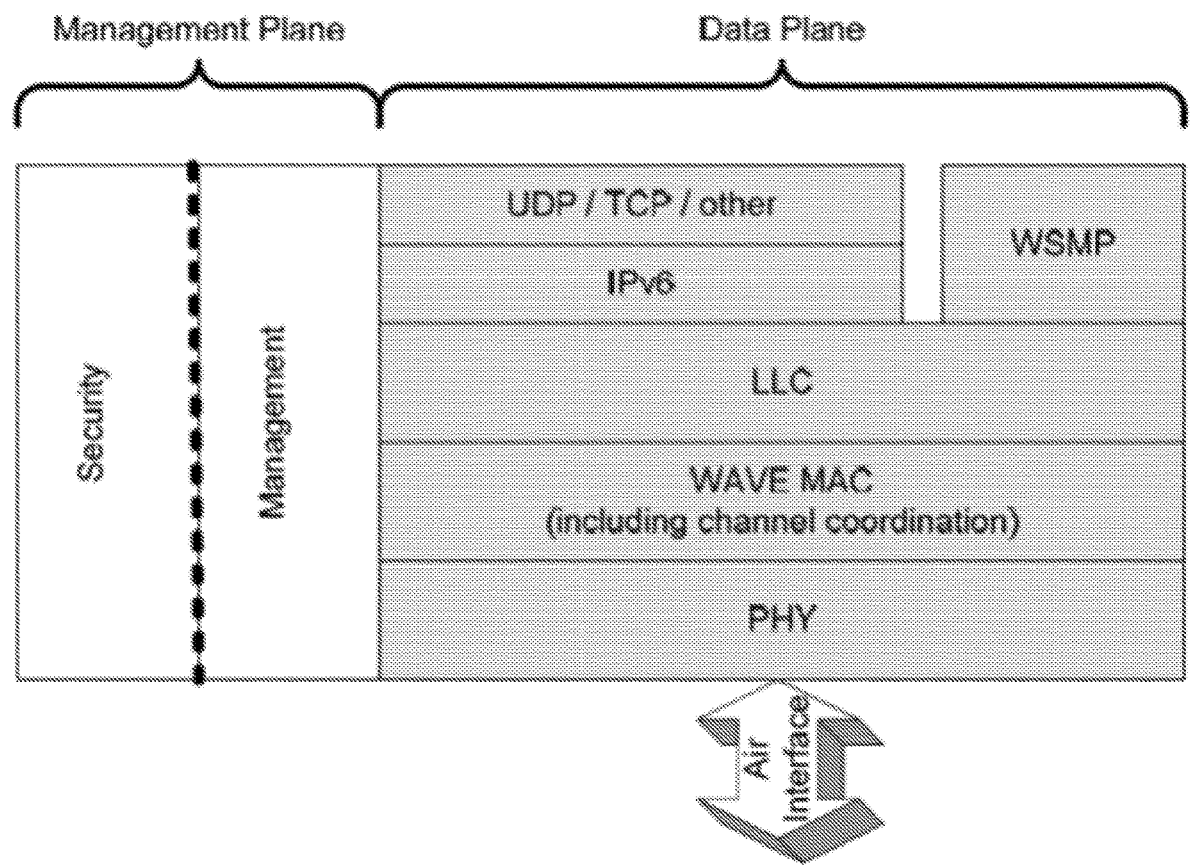
FIG. 1 depicts an example protocol stack that includes Wireless Access in Vehicular Environment (WAVE) protocols.
Figure 2:
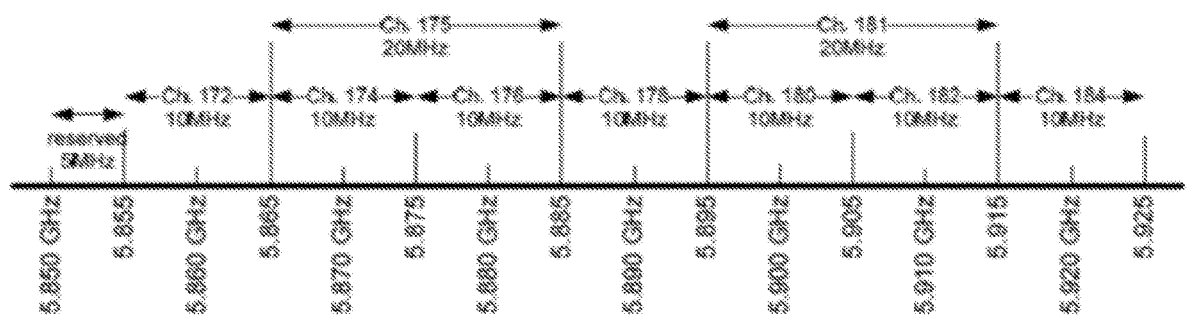
FIG. 2 shows example channels in WAVE.

It is recognized herein that IPv6 packets over Wireless Access in Vehicular Environment (WAVE), in some cases, might not include a beacon message. In particular, Outside the Context of a Basic service set (OCB) operation of IEEE 802.11 with IPv6 might not require beacons or an association. Further, in some cases, no authentication is performed in ICB operation of IEEE 802.11 with IPv6. In an example, the basic service set identification (BSSID) may be set to all ones. Thus, because no beacon is sent, it is recognized herein that, in some cases, there is no scanning at the access technology layer in OCB mode. Therefore, alternative approaches to discovering an 802.11 access point (AP) may need to be utilized.

Vehicular communications may make use of road side units (RSUs), which may be stationary entities or apparatuses (devices) that may be deployed at various locations. By way of example, RSUs may be deployed on roads, traffic lights, or the like, such that RSUs can communicate with vehicles and/or pedestrians. In some cases, RSUs may also act as gateways or routers to give access to an IP network (e.g., a local IP domain or access to the Internet). Such RSUs may send out router association (RA) messages that may be triggered by reception of a router solicitation (RS). These messages and other related neighbor discovery (ND) messages over IPv6 are further described in IETF RFC 4861: Neighbor Discovery for IP version 6. Further, although various embodiments are described herein in the context of vehicular use cases, various embodiments are not limited to vehicular uses cases. Thus, RSUs, in some cases, may include or function as, for example and without limitation, a fog node, a local fog node, an edge node, a gateway, or the like.

In some examples, a WAVE capable RSU can also send a RA in the form of a WAVE RA (WRA) that is embedded in a WAVE service announcement (WSA). A WSA generally refers to an announcement that may sent by a given WAVE capable device to inform other devices about the available services in the given device. In some examples, a WRA may contain the same or similar information of a typical RA message. Thus, a WSA may help neighboring devices to at least discover that the sending WAVE device can act as a router. It is recognized herein that ND and/or WSA messages may help the discovery of WAVE capable devices that also act as routers.

Vehicular communications may include vehicle-to-vehicle (V2V) communications, vehicle-to-infrastructure (V2I) communications, or vehicle-to-pedestrian (V2P) communications. For example, two vehicles can use V2V communications in order to share media. In an example, V2I communications can be used in cases where a vehicle uses a road side unit (RSU) to get IP access to the Internet. By way of example, V2P communications can be used for communications between a vehicle and a pedestrian in a carpooling service.

Regardless of whether a communication is V2V, V2I, or V2P, the communication may include neighbor discovery (ND) (e.g., where a neighbor may be an RSU, a vehicle, or pedestrian); prefix and IP address acquisition, prefix/IP discovery of a target device; and/or discovery of supported services in a target device. In some cases, multiple of the above-mentioned operations can occur at the same time. For example, in some cases, a RA from an RSU may be received, such that the RSU implicitly performs ND and also provides necessary information for IP address acquisition. After the establishment of an IP connection between two entities, such as a vehicle and a RSU for example, it is recognized herein that the connection may be monitored to ensure that the connection can be maintained. If the connection is not maintained, for example if the vehicle drives beyond the coverage area of a given RSU with which it is communicating, then a new connection may be needed, and other functions may be necessary in order to cause minimal or no impact to the communications (e.g., IP sessions) that were ongoing. To that end, issues related to IP mobility are discussed in detail below. Proximity services (ProSe) in LTE is now discussed, as it is recognized herein that ProSe can be used to enable vehicular communications.

Neighbor Discovery Protocol for IPv6 may include various operations such as, for example, Router Solicitation (RS), Router Advertisement (RA), Neighbor Solicitation (NS), Neighbor Advertisement (NA), and Redirect. Neighbor Discovery (ND) may refer to, unless otherwise specified any of the operations (or messages listed above). In some cases, advertisement messages (e.g., RA or NA) may be sent unsolicited, or may be sent in response to a solicitation message (e.g., RS or NS). As such, a RA may be expected after a RS, and a NS may be expected after a NA. Examples of ND messages are now described. When an interface becomes enabled, hosts may send out Router Solicitations that request routers to generate RAs immediately, rather than at their next scheduled time. In an example RA message, routers advertise their presence together with various link and Internet parameters periodically, or in response to a RS message. RAs may contain prefixes that are used for determining whether another address shares the same link (on-link determination) and/or address configuration, a suggested hop limit value, etc. A node may send an example NS message to determine the link-layer address of a neighbor, or to verify that a neighbor is still reachable via a cached link-layer address. NSs may also be used for Duplicate Address Detection. An example NA message is a response to a NS message. In some cases, a node may also send an unsolicited NA to announce a link-layer address change. An example redirect message is used by routers to inform hosts of a better first hop for a destination.

Turning now to Proximity Services in 3GPP LTE, a ProSe service has been developed in 3GPP to enable direct discovery (hereafter referred to as device-to-device (D2D) discovery) and direct communication (hereafter referred to as D2D communication). The direct link for a D2D service is referred to as PC5. Different sets of resources may be defined for discovery and communication. As such, PC5-D may be used to refer to the "discovery channel" or the resources or link used for D2D discovery. Because PC5-D is for discovery, in some cases, no IP data or signaling is sent over this channel. Likewise, a separate set of resources are defined for sending other types of data for D2D communication, of which PC5-U and PC5-S are types. PC5-U is used to denote D2D communication that carries data which may or may not be IP. The PC5-S is used to denote communication related to signaling, for example. In an example, two devices can use the PC5-S channel or plane to setup a direct D2D link (e.g., PC5-U) to exchange data. In some cases, from the lower layer perspective, however, there is no difference between PC5-U or PC5-S data because they may both be transmitted/received over the same set of resources (which are different from those for PC5-D).

Figure 3A:
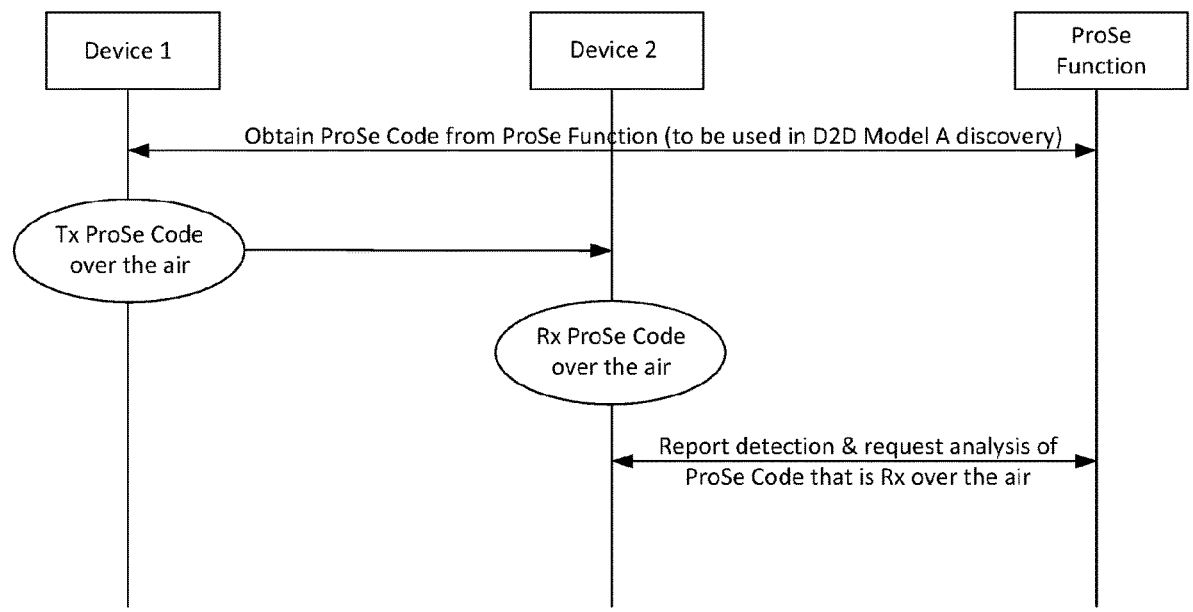
FIG. 3A shows an example of device-to-device (D2D) discovery in accordance with Model A.
Figure 3B:
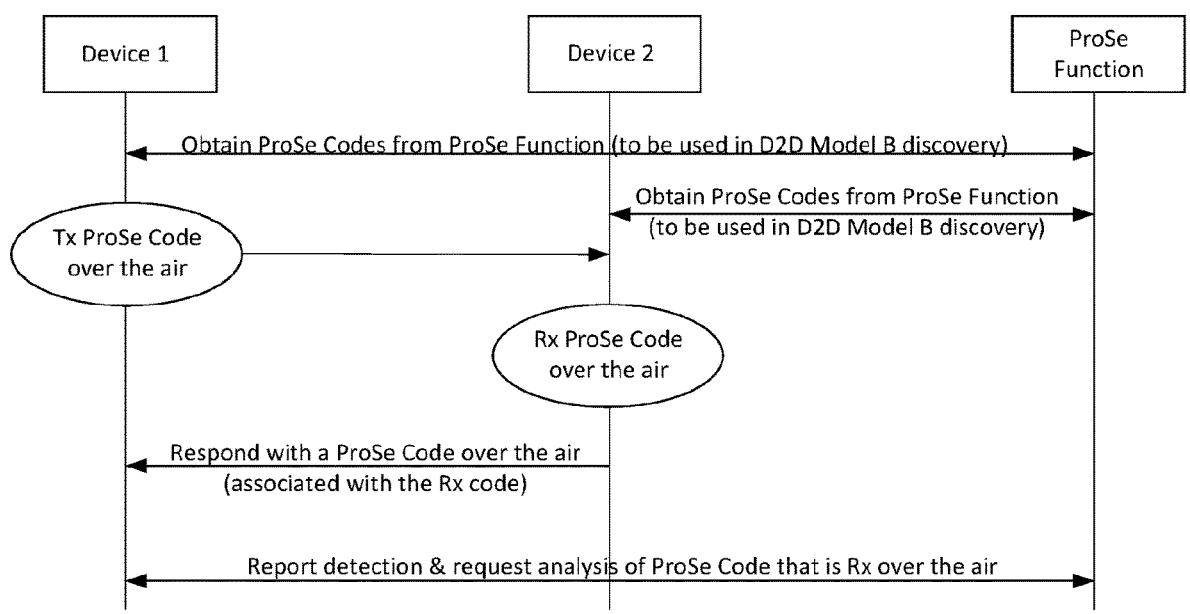
FIG. 3B shows an example D2D discovery in accordance with Model B.

With respect to D2D discovery, ProSe supports Model A and Model B. Referring to FIG. 3A, in Model A, a device transmits a discovery message without being solicited to do so. This is like sending an "I am here" message, where the announcing device may indicate the presence of a particular service based on the ProSe code that is included in the discovery message. Referring to FIG. 3B, in Model B, a discoverer sends a "who is out there" message and the discoveree then responds with "I am here". The discovery message sent by the discoverer includes a code such that only discoverees that understand it, or that are part of the same group, can announce a discovery message in response to the solicitation.

For both of the above-summarized models, the devices get the codes to transmit (in the discovery message) from a network node that is called the ProSe Function. The devices communicate with the ProSe Function using IP, and that reference point is referred to as the PC3 interface.

Currently, D2D discovery is used to announce the presence of a service (e.g. taxi or restaurant), or to discover members of a particular group. It is recognized herein that D2D discovery messages currently carry no information about RSUs that may be deployed in streets, traffic lights, etc.

With respect to D2D communication, D2D communication may include, without limitation, one-to-many communication, one-to-one communication, and communication via a relay device. Devices that get engaged in one-to-many communication use a well-known L2 address to address a group of devices that are communicating with each other, while the source L2 address is set to that of the sender. For one-to-one communication, each device in a pair of communicating devices uses a destination L2 address of the target individual device, which should be known a-priori (e.g., after performing D2D discovery). In another example, devices can use a relay D2D device to communicate with an IP domain via the network when these devices (known as remote devices) are out of coverage of the network, but in coverage of a D2D relay device that is in network coverage. The communication between a remote device and a D2D relay devices may one-to-one communication for uplink traffic from the remote device. Downlink traffic from the relay to the remote devices may be unicast or multicast.

Turning now to IP mobility, IP mobility generally refers to the impact of access technology mobility on ongoing IP connections or sessions. For example, a device may be connected to a WiFi AP, and may have obtained an IP address that it uses to communicate with application servers in the Internet. Upon a change of the AP (e.g., when the device is associated with a different AP), the IP address may be changed. Further, it is recognized herein that existing communications with peer nodes may also be affected, for example, if the application layer does not address the change of IP address. Various mechanisms to address the change have been proposed. Some mechanisms are implemented at the application layer, or at the IP stack layer in the devices and the network, or (at the IP stack of) the network nodes without any requirement on the mobile devices to implement anything.

In an example, proxy mobile IP (PMIP) is implemented. PMIP is a network based solution that does not put any requirements on the mobile devices. PMIPv6 is a version of PMIP that uses IPv6. Unless otherwise specified, PMIP may be used herein to refer to PMIPv6, and PMIP and PMIPv6 may be used interchangeably. PMIP includes a localized mobility anchor (LMA) and a mobile access gateway (MAG), examples of which are shown in FIG. 4.

Figure 4:
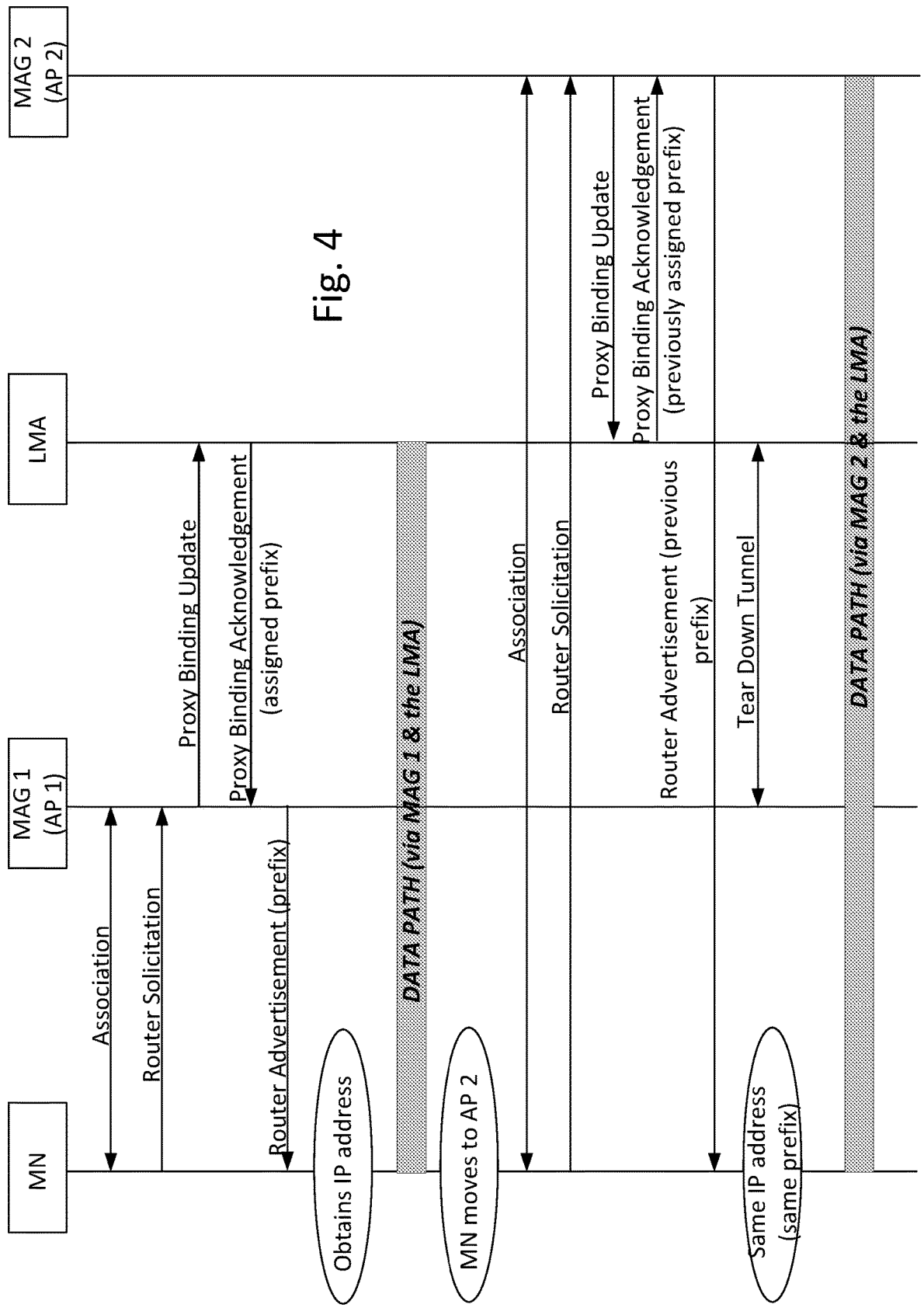
FIG. 4 is a call flow that shows an example of Proxy Mobility IP version 6 (PMIPv6).

Referring to FIG. 4, an example using PMIP is shown. In accordance with the illustrated example, a mobile node (MN) associates with an AP 1 (MAG 1) using access technology specific mechanisms. The MN then sends a RS to get prefix information. The MAG 1 then sends a PBU to the LMA. In this example, it is assumed that the MAGs are connected with the LMA using a wired link. Upon reception of the RS from the MN, the MAG 1 sends a proxy binding update (PBU) to the LMA to get a prefix for the identified MN whose identity is included in the message. The LMA assigns a prefix for the MN and creates a context with the MN's identity and prefix. The LMA responds with a PBA and provides the prefix. The MAG 1 then responds with a RA that includes the MN's assigned prefix. Note that as RS and RA are procedures and messages of the ND protocol, the MN is not aware of the interaction between the MAGs and the LMA. As such, no requirements are placed in the MN for PMIP operation. Thus, it may be considered a pure network based solution. In accordance with the illustrated example, the MN then gets an IP address using the prefix and can start sending data. The data path involves the MAG 1 and the LMA.

Still referring to the example depicted by FIG. 4, later, the MN moves to another AP 2 (MAG 2) and associates with it. Noticing the change of the L2 point of attachment, the MN sends a RS. The MAG 2 sends PBU to the LMA and includes the MN's identity that the LMA recognizes, prompting it to return the same prefix in the PBA. The MAG 2 then responds with the RA and includes the prefix received from the LMA. The MN sees the same prefix although the AP has changed. Therefore, the MN is able to maintain the same IP address that was previously used when it connected with AP 1. The LMA tears down the tunnel with the first MAG 1. The MN is able to continue its IP communication, however, the data path now goes via MAG 2 and the same LMA. It is recognized herein that a key enabler of this example is that the prefix is assigned by the LMA, which always remains in the data path.

Turning now to WiFi offloading, mobile network operators often attempt to use non-3GPP access technologies in order to increase the capacity of their systems and to provide relatively good connectivity at a low cost. One popular non-3GPP technology is WiFi, which has become widely deployed and whose performance has also improved over time, making it a very promising and complementary technology for IP connectivity. Being unlicensed and free (in terms of frequency band usage), many cellular service providers and standards bodies have increased their efforts in adopting WiFi as a technology to provide IP connectivity and also to offload mobile networks. Further, it is recognized herein that vehicular communications may make use of several access technologies, including cellular links for example. In some cases, operators that deploy vehicular services might leverage the coverage benefits of cellular networks while offloading data over WiFi, where possible.

By way of example, various uses cases are now described to highlight various issues that various embodiments described herein may address. It will be understood that issues related to the example use cases are not limited to the examples.

Figure 5:
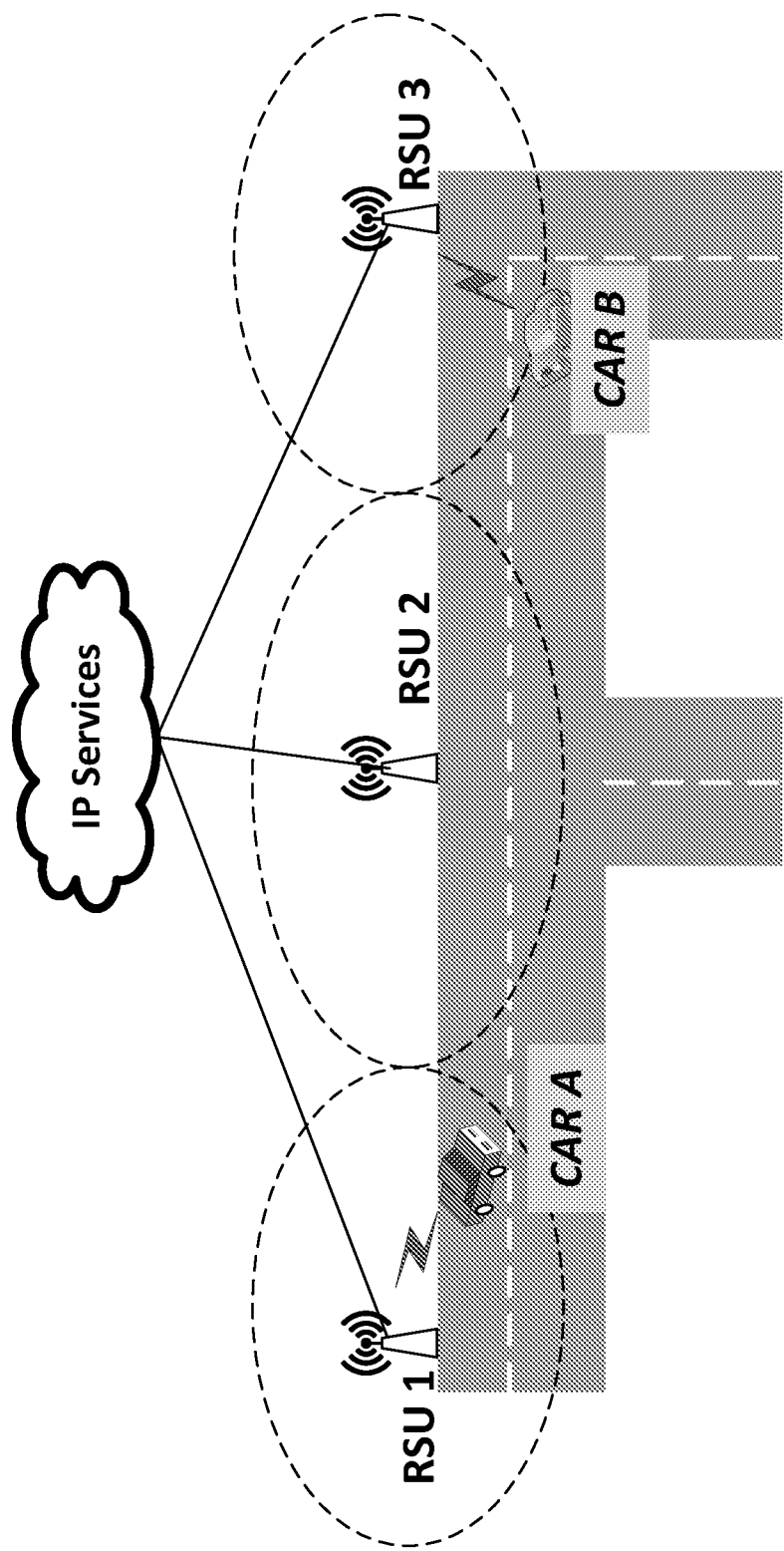
FIG. 5 depicts an example use case of vehicle-to-infrastructure (V2I) communications in which vehicles communicate with road side units (RSUs) for IP services.

In an example use case, V2I communications, which involve communication between a vehicle and an infrastructure network, are implemented. For example, RSUs deployed on the roads may provide IP connectivity and access to local services or to IP services (the Internet). FIG. 5 shows an example of three RSUs deployed on a street, each of which enable a connection to IP services for V2I communications. Referring to FIG. 5, in this example, the RSUs provide connection to IP Services that may be local or accessible via the Internet. Although not shown, each RSU may support a connection to, and hence communication with, different services. V2I communication may enable the streaming of media that is topologically closer to the area. For example, video content from a service provider may be located closer to the area of vehicles. As such, the RSUs may provide an IP connection for the vehicles to receive video and/or audio content as part of an infotainment service that is available in the cars. Furthermore, passengers in a car may, for example, use IP connections via RSUs to perform web browsing or download emails.

In some cases, updates about route conditions and traffic status can be obtained by a vehicle using mobile applications, such as Google Maps, for example. These applications are often a result of a derivation of tracking the users of the applications. It is recognized herein that there are drawbacks to using these applications for vehicular services. For example, a correct estimate of the traffic conditions may require the application to be active. Thus, if only a few users exist, then the actual traffic conditions may not be a true reflection of a given situation. Another example shortcoming of such applications is the lack of automatic real-time updates. Although the application might indicate the presence of construction via a route (which is an event that may be planned and lasts a long time such that it may be worth reporting despite the delays that may be encountered to get that information), these applications often do not support automatic detection and reporting of a hazard (which is not a planned event like the example construction scenario). The reporting of road hazards, in current applications, often requires manual reporting by a driver. A drawback of such a solution is that the users might not report the hazard for a long time, if at all. As such, the transfer of this report to the drivers in the affected area might not be on a real-time basis, of it is reported at all.

It is recognized herein that IP Wireless Access in Vehicular Environments (IPWAVE) can address the above-described shortcomings, and can improve driving efficiency generally, in accordance with various embodiments. It is further recognized herein that embodiments using IPWAVE can allow a real-time distribution of safety or other messages (e.g., for efficient driving) locally in affected areas, without delay incurred due to communication with an application server in the Internet. In some examples, reports can quickly reach vehicles using a direct communication link or via the RSUs deployed in the area. Furthermore, in some cases, the cost associated with using 802.11 links is less than that with cellular communication.

In various example V2V communications use cases, two or more vehicles engage in data exchange for a particular service (e.g., media sharing, gaming, downloading of local map, etc.). In an example platooning use case, continuous communications between a plurality of vehicles may be required. In a platooning example, at least two cars drive toward a certain destination using vehicular communications to exchange data in which three cars are driving toward the same destination, and thus in the same direction.

Efficient driving and infotainment services can be used in a platooning scenario. For efficient driving, vehicles can directly exchange information with other. Such information may concern their speeds, whether or not their brakes are being activated, or the like. For example, if Car 3 in FIG. 6, which is the leading car in FIG. 6, encounters a hazard or slows down for any particular reason, this information may instantly and automatically be sent to the two other cars behind it in accordance with an example. Cars 2 and 3 may, in turn, adjust their speeds, for example, to maintain a particular distance from each other. In addition to exchanging this type of information that makes driving more efficient, by way of example, the drivers can use V2V to establish a video call or to share media with each other while they are driving. It is recognized herein that, to enable these services, continuous communication may be needed, and moreover, the communication links might be verified to be available in order to prevent frequent signaling to setup the connections between cars.

In an example V2P use case, a carpooling service is provided. Carpooling generally refers to people sharing a ride in a vehicle to reach a common or similar destination. It is recognized herein that there are benefits to make a carpooling service available over 802.11 or IPWAVE. For example, carpooling may involve a meetup between a passenger and a driver in an indoor parking lot, or some other place with inadequate cellular coverage. Thus, positioning required by the carpooling service might not be sufficiently accurate. It is recognized herein that a carpooling service over IPWAVE may reduce the service delay, particularly, for example, if the service is performed close to the infrastructure. This document will discuss some solutions to make available this use case and service over IPWAVE in an efficient manner. Further, it will be recognized herein that V2P may involve a communication between a passenger who is using a smart phone and a driver who is using a communication module in a vehicle, but V2P is not so limited. For example, some V2P communications may also be classified as V2V communications.

As summarized above by way of the example use cases, embodiments described herein address various issues, such as for example, RSU discovery, neighbor discovery, service discovery, and IP mobility. Table 1 below summarizes issues that are applicable to the above-described use cases identified above. This table is presented by way of example. Thus, it will be understood that the issues may apply to each use case. In table 1, the first column identifies the example use case. For each use case, a check mark in any of the cells of the other columns indicates that the corresponding issue applies to the example use case, and is addressed herein.

TABLE 1

Example Use Cases and Associated Issues

| UseCase | RSU Discovery | Neighbor Discovery | Service Discovery | IP Mobility |
|---|---|---|---|---|
| V2I Communication | ✓ | ✓ | ✓ | ✓ |
| V2V Communication | | ✓ | ✓ | |
| Carpooling | ✓ | | ✓ | |

Turning first to RSU discovery for vehicular communications, it is recognized herein that issues may result from the 802.11 OCB mode not using beacons or an association procedure between a device and the AP. For example, there may be issues related to discovering that a node is an RSU, and consequently there may be issues related to discovering the prefix for an IP address allocation that is needed prior to engaging in an IP session. Further, it is recognized herein that current approaches (e.g., using an WSA or an RA from the ND protocol) might not allow a vehicle to discover an adjacent RSU that has a coverage area that does not yet include the vehicle. For example, referring to FIG. 5, Car A under the coverage of RSU 1 will need to be under the coverage of RSU 2 before it can discover it using current WSA or RA messages. In some cases, for a vehicle that is moving at a moderate speed, the discovery process may take a long time and by the time the discovery is complete, the vehicle may have moved to the coverage of another RSU. It various example embodiments described herein, a given RSU may be discovered before a vehicle is within the coverage area of the RSU, and IP addresses may be acquired and communication may begin before a vehicle is within the coverage area of the RSU.

Another issue related to lack of discovery of RSUs is that there may be a lack of information that can improve V2X services. For example, in various example embodiments described herein, a given RSU may be able to act as a relay for communication between two vehicles, or as a relay between a vehicle and a source RSU with which the vehicle may have setup an IP connection. Due to the relatively small coverage of 802.11, in current approaches, the vehicle may lose its IP session if it moves out of that RSU. Therefore, it is recognized herein that information concerning relay capability, load conditions, or other parameters may help the vehicle select the best RSU among the ones that may be available. Current selection methods do not introduce such parameters to meet the requirements of the service.

By way of background, although various embodiments are described herein in the context of a use case for purposes of example, the embodiments are not limited to the example use case. For example, an example embodiment described in the context of vehicular services may not be limited to vehicular services. Furthermore, it will be understood that embodiments described herein may be combined with each other to achieve various objectives. For example, an embodiment that addresses RSU discovery can also be used for service discovery, or can implicitly enable service discovery.

As used herein, unless otherwise specified, PC5 message may refer to a D2D discovery message (PC5-D), a D2D signaling message (PC5-S), or a message (IP or non-IP) that uses the PC5-U plane. Note that this also does not prohibit the use of any of the listed messages over new channels. For example, although PC5-D is sent over the discovery channel, a "PC5 message" may also refer to a D2D discovery message that is sent over the communication channel.

Turning now to RSU discovery, various embodiments now described may be implemented in, but not limited to, the V2I communication use case. In one example, a network node (e.g., an RSU, eNB, vehicle, etc) is configured with, or has access to, RSU information, optionally per geographical location. The network node may then provide this information to a vehicle (or vehicles), which may then use the information for RSU selection and access to service, for example. As used herein, unless otherwise specified, an RSU refers to a node that is compatible with a plurality of access technologies, such as 802.11 and cellular communication for example. For example, an RSU may support Uu based communication and/or PC5 based communication.

As used herein, RSU information (RSU info) may refer to various information elements (IEs), for example without limitation, an RSU indicator, channel information, prefix information, location information, IP address configuration information, an indication concerning the support of DNS services, relay support, support for other access technologies, a service or connectivity type, a coverage location, a valid time, or a services list. An RSU indicator may indicate that the node is an RSU. In some cases, the implementation of the indicator may be on several layers (e.g. L2) or in the ND protocol, or in other protocols such as the ProSe protocol (e.g., PC5-D, PC5-S messages, etc). Channel information may indicate the channel on which RSU Info will be transmitted, optionally where the channel indicates the channel on which RSU Info of neighboring or adjacent RSUs will be transmitted. Prefix information (Prefix info) may refer to information defined in the ND protocol. Location information (Location info) may indicate the location of the RSU. Location information may include, for example, coordinate information (e.g., x, y, z coordinates), a longitude, a latitude, an address (e.g., street name, zip code, etc.), GPS-based location information, or any other type of location information that can help determine where the RSU is located. IP address configuration information may indicate how the IP address of the receiving entity (e.g., vehicle, pedestrian, etc) can be acquired. By way of example, the IP address configuration information may indicate that the IP address may be acquired using SLAAC, DHCP, or through some other means of IP address provisioning. By way of further example, when the IP address has to be obtained with DHCP, the RSU can also include a list of IP addresses for a list of DHCP servers. The list can also contain the information that would be available in the Advertise message that a DHCP node may send in response to a Solicit message from a device (both of which are DHCP particular protocol messages). The vehicle can then choose a server based on the information received, and contact the server for an IP address allocation.

An indication may inform a vehicle whether an RSU supports (either directly or indirectly) DNS services. In some cases, if supported, the address of the DNS server may also be provided. A relay support indication may indicate whether the RSU is capable of acting as a relay (e.g., for V2V or V2I). In some examples, there may be an indication for relay capability between vehicles (e.g., vehicles communicate via the relay), and another indication for an RSU being capable to relay to another RSU. An information element may indicate whether the RSU supports other access technologies, and may provide the L2 address(es) per access technology of the RSU. The Service/Connectivity type may indicate whether the RSU provides a connection to the Internet, and/or whether the RSU provides a connection to a local IP domain/network (local IP service). The coverage location (which may also be referred to as location or location coverage) may indicate the location information where the corresponding RSU information is valid. For example, the provided RSU information may be valid within an area of 1 square kilometer. Thus, the information will only be useful or accurate within the indicated location of 1 square mile. The valid time information element may refer to a period of time during which the corresponding information is valid. After the valid time expires, in some cases, the information should be refreshed. A services list may refer to a list of services that can be obtained from the RSU. For example, this list may include indications concerning whether the RSU can be used to obtain internet connectivity, send SMS messages, place voice calls, place only emergency calls, etc.

For purposes of example herein, unless otherwise specified, a given vehicle apparatus, which is often referred to herein as a vehicle for simplicity, is assumed to support multiple access technologies, such as, for example, 802.11 and cellular technologies. It may also be assumed, unless otherwise specified, that D2D communication is supported. Furthermore, from a protocol perspective, a communication device in a given vehicle (which can also be referred to as the vehicle for simplicity) or the device of a pedestrian (which can be referred to as a pedestrian) may be substantially the same. Thus, various embodiments described herein in the context of vehicles may also apply to a pedestrian or an RSU, unless otherwise specified.

In some examples, because the coverage of an 802.11 AP may be limited, an RSU uses D2D communication to send RSU info to the vehicles in the area of its coverage. An RSU that can act in this manner may be referred to as a D2D-RSU herein. In some cases, a network operator may deploy a specific number of D2D-RSUs per RSU location. In another example, one D2D-RSU may be deployed in an area that also has RSUs that are capable of 802.11 only in coverage of the D2D-RSU. For example, referring to FIG. 8, the cellular coverage of the example D2D-RSU overlaps with the combined 802.11 coverage of the deployed RSUs 1-4 in that area. In the illustrated example, RSUs 1, 2, 3, and 4 are only capable of 802.11.

In an example, a D2D-RSU is used to communicate with vehicles (which can also be cellular and D2D capable) to provide RSU info. A vehicle may receive the RSU info, which may include the information elements described above, and analyze the information. For example, the vehicle may determine the area and time for which the RSU info is applicable. The vehicle may display this information to the user, or may provide this information to a connection management layer that then may this for RSU selection.

Figure 9A:
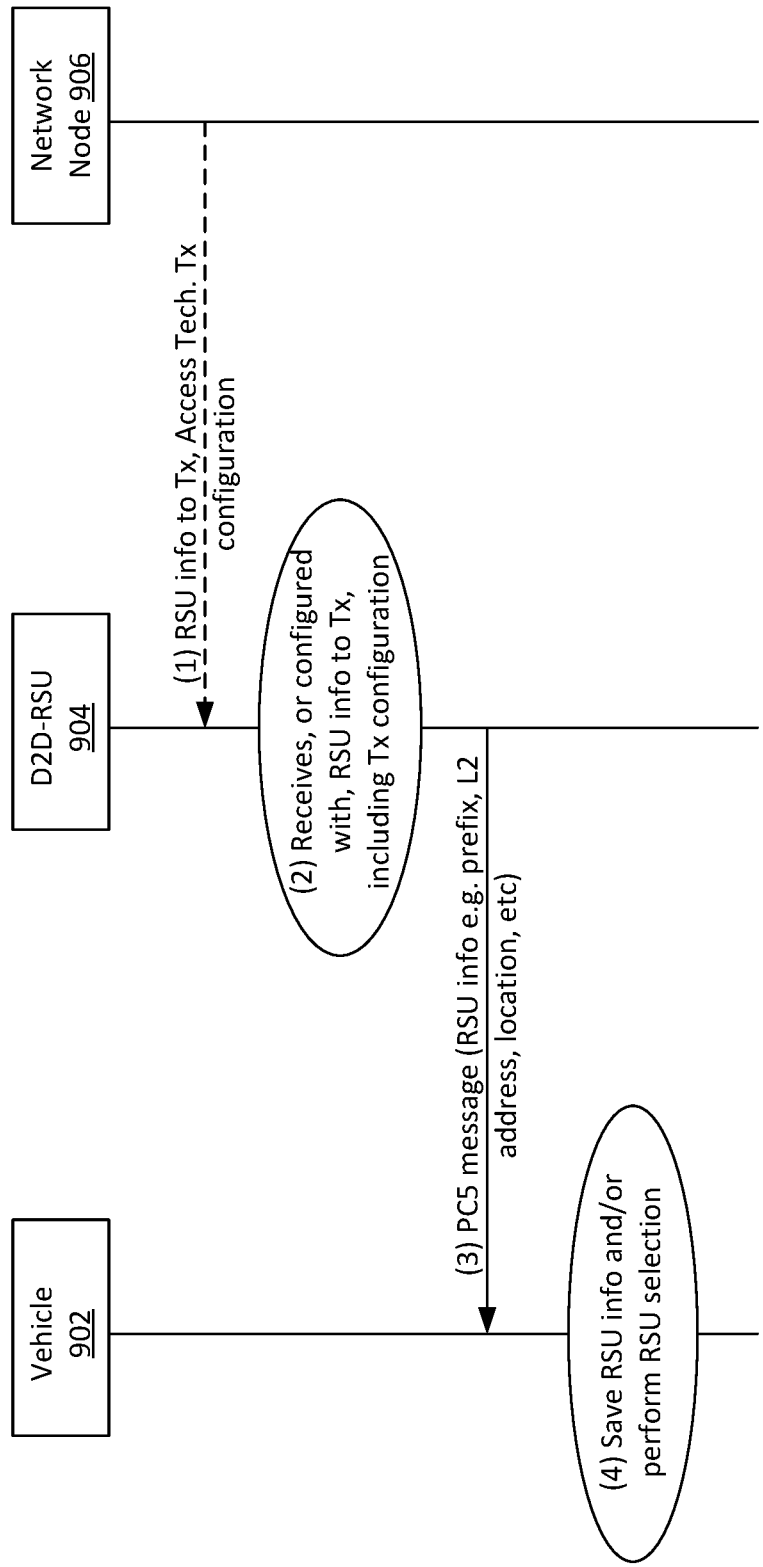
FIG. 9A is a call flow in which an example RSU autonomously advertises RSU information in accordance with an example embodiment.
Figure 9B:
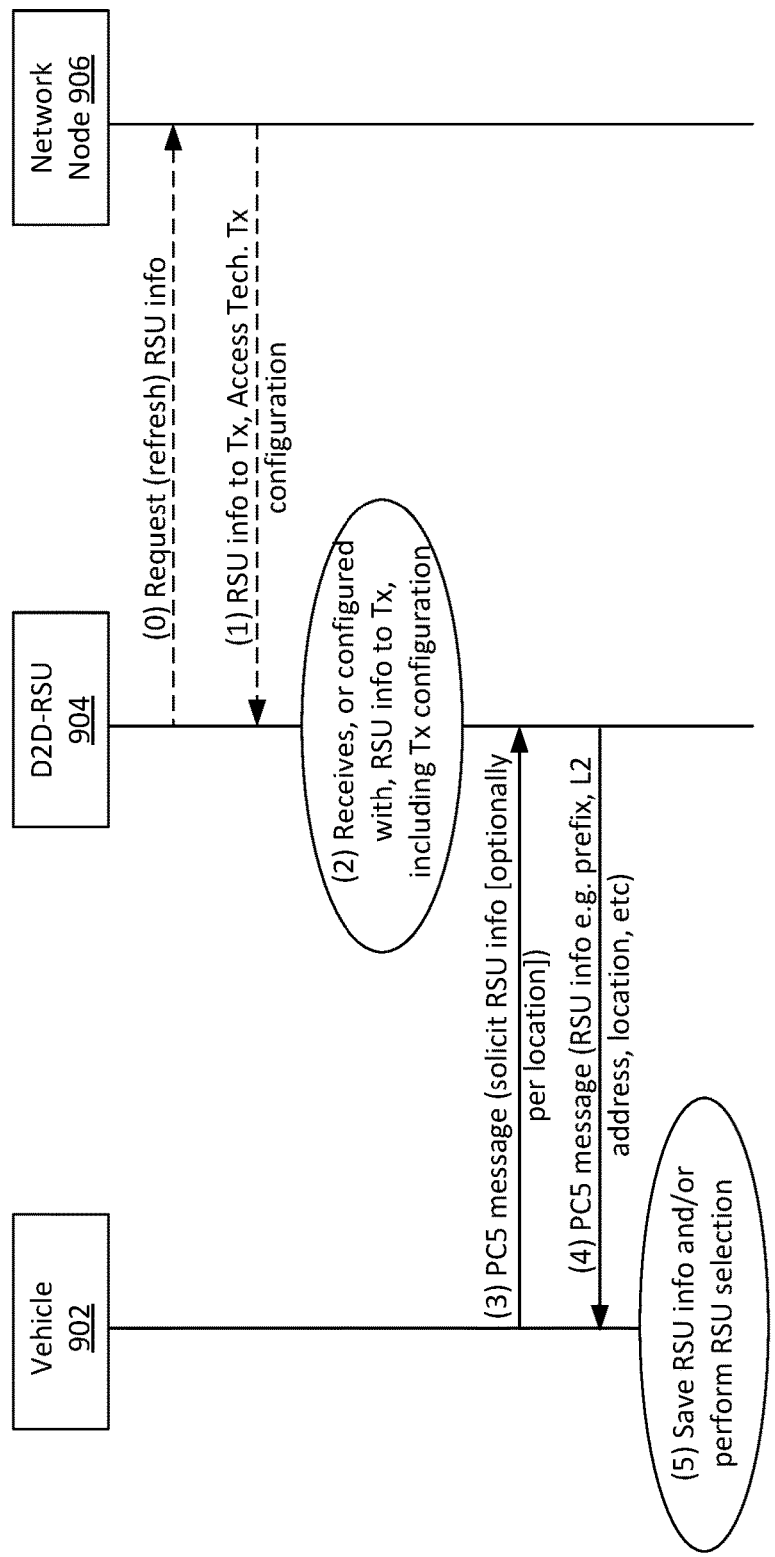
FIG. 9B is a call flow in which an example RSU advertises RSU information in response to a solicitation from a vehicle, in accordance with an example embodiment.

FIGS. 9A and 9B depict an example system 900 that includes a vehicle 902, a D2D-RSU 904, and a network node 906. It will be appreciated that the example system 900 is simplified to facilitate description of the disclosed subject matter and is not intended to limit the scope of this disclosure. Other devices, systems, and configurations may be used to implement the embodiments disclosed herein in addition to, or instead of, a system such as the system shown in FIGS. 9A and 9B, and all such embodiments are contemplated as within the scope of the present disclosure.

Referring in particular to FIG. 9A, in accordance with the illustrated example, the D2D-RSU 904 may autonomously send, advertise, or announce RSU info to vehicles, such as to vehicle 902, which are in the coverage area of the D2D-RSU 904. The D2D-RSU 094 may use a PC5 message to autonomously advertise RSU info to the vehicles in the coverage area. It will be understood that, although the vehicle 902 is illustrated for purposes of example, a PC5 message may be broadcast/multicast, and thus multiple vehicles in the area may receive it. A PC5 message may be a discovery message, a PC5-S message, or a message (IP or non-IP) that is sent over a PC5-U channel (i.e. data plane). In some examples, the D2D-RSU 904 may receive the RSU info via local configuration, or using an API call, or from a network node such as, but not limited to, the ProSe Function, a Mobile Management Entity (MME), a Home Subscriber Server (HSS), or a Network Function Repository Function, or the like.

Figure 8:
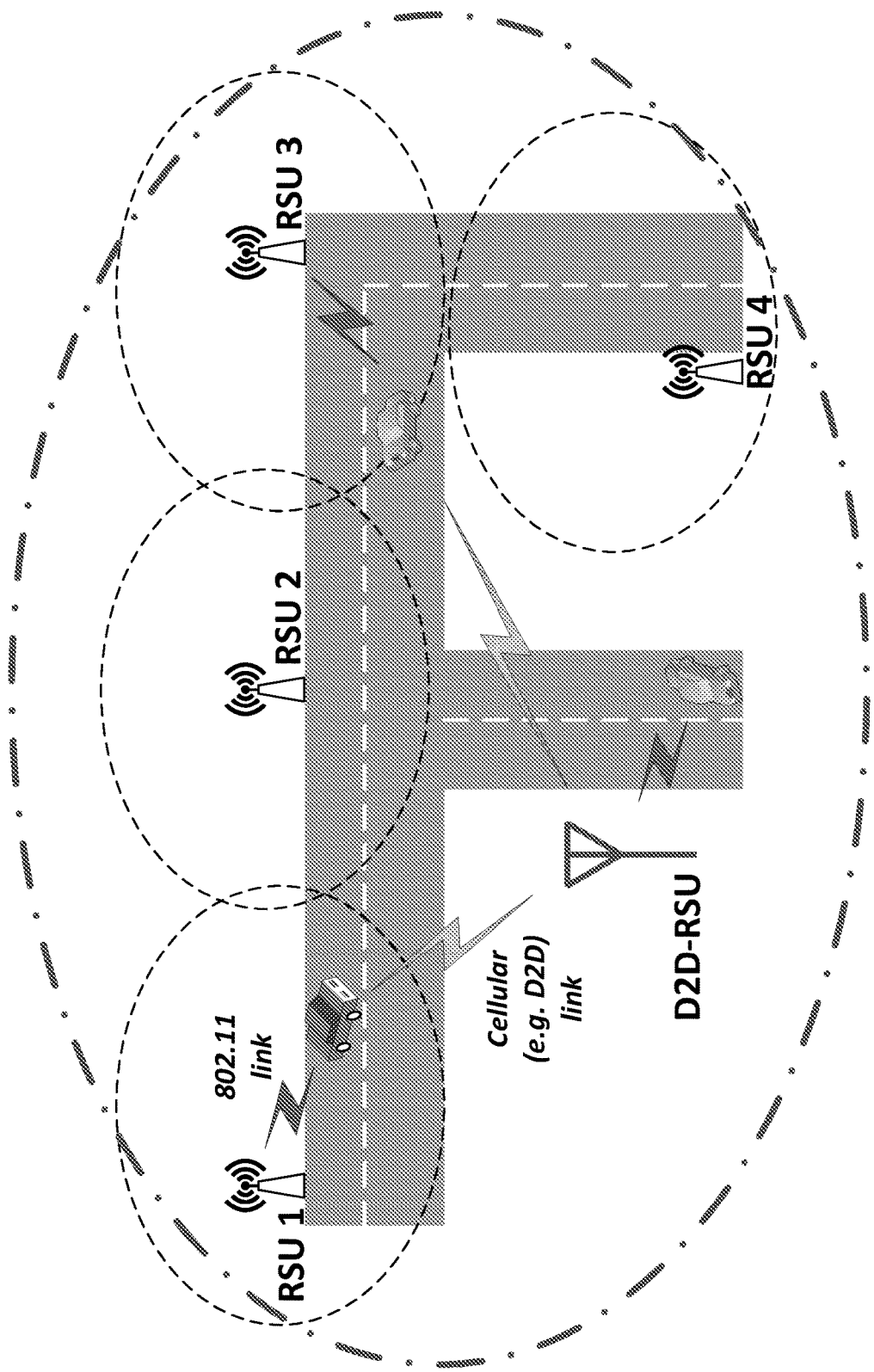
FIG. 8 shows an example scenario in which an example road side unit (RSU) has a cellular coverage area that spans the coverage area of multiple RSUs without cellular coverage.

Still referring to FIG. 9A, in accordance with the illustrated example, at 1, the network node 906 sends configuration information for PC5 transmission to the D2D-RSU 902. In an example, the RSU 904 may receive configuration information related to how the road side unit should advertise information associated with the RSU 904. The network node 906 may include, for example and without limitation, a ProSe Function, functionality of a MME, functionality of a HSS, a Network Function Repository Function, or the like. The configuration information may include, for example and without limitation, the type of message to use when sending the RSU info (e.g., PC5-D, PC5-S, IP/non-IP over PC5-U, etc), the frequency of transmission, the source and destination L2 address, the D2D-RSU ID, the source and destination IP address to use, etc. The RSU information may define characteristics of the transmission on the cellular access. The network node may also include the RSU info that should be sent over PC5. The RSU info may contain information of other RSUs in the D2D-RSU's coverage area, as shown in FIG. 8, for example.

At 2, the D2D-RSU 904 may receive configuration information, or may be configured with configuration information, regarding the transmission of the RSU info, such as, but not limited to, the frequency of advertisement, whether or not the advertisement has should be sent after a solicitation, the code to use, the L2 addresses, etc. Thus, the RSU 904 may receive or be configured with configuration information related to how the RSU should advertise information associated with the RSU 904 and/or other RSUs. The configuration information may be received from the network. Alternatively, the configuration information may be received via a user interface that is communicatively coupled to the road side unit 904. Upon reception or configuration, the D2D-RSU 904 may create the necessary configurations in the lower layers (of the cellular stack) accordingly. At 3, in accordance with the illustrated example, the D2D-RSU 904 initiates the transmission of the RSU info according to the configurations received at 1 and/or 2. In some cases, the D2D-RSU maintains the transmission of the RSU info according to the frequency indicated, or as per local configurations in the device 904.

At 4, the vehicle 902 receives a transmission of information associated with the RSU 904. For example, the vehicle 902 may receive a PC5 message with the RSU info. The vehicle 902 may save the information and optionally use it for RSU selection (in its current location or in locations nearby as indicated by the RSU info). In some cases, the information may be used for RSU selection for an indicated location and during an indicated time that may expire, thereby requiring the information to be refreshed. The vehicle may start a timer to guard the validity of this information, where the timer value may be set to a predefined value or may be set to a value received in the advertisement message from 3. In some examples, the vehicle may display the RSU info on the screen of the vehicle for the passenger to select an RSU. Thus, based on the configuration message, the RSU 904 may send a transmission of information associated with the RSU 904. The transmission may be sent over a channel to one or more vehicles, such that the RSU 904 is selectable by the one or more vehicles based on the information associated with RSU 904. Further, the information associated with the RSU 904 may include, for example, a location of the RSU 904, a coverage area associated with RSU 904, or one or more services obtainable via the RSU 904.

Still referring to FIG. 9A, in some examples, a PC5-D message is used at 3, and therefore the procedure may be classified as a Model A discovery. If configured to operate in this manner, the D2D-RSU 904 may request (e.g., before operation 1) that the network node 906 (e.g., a ProSe Function) sends the RSU info. The request may indicate, for example and without limitation, the vehicle's expected destination, expected travel path, and rate of speed. The node 906 may then accept the request and provide the information as described above in operation 1. In specific examples, the information that is provided may be based on where the vehicle is going and how fast it is going. For example, if the RSU 904 provides interne connectivity, but the vehicle 902 is only expected to be momentarily in range of the RSU 904, the node 906, which may comprise a ProSe Function, may choose to advertise the RSU 904. The D2D-RSU 904 may know the vehicle's destination, expected travel path, and rate of speed based on information that was obtained from the vehicle, based on observation, based on querying a network function, or the like.

Referring now to FIG. 9B, in an alternative example, the RSU 904 advertises the RSU info if it is solicited do so by a vehicle. In some cases, the vehicle 902 may already have the necessary parameters to solicit an advertisement from the D2D-RSU 904. For example, the vehicle 902 may have obtained a ProSe code for solicitation (Model B discovery) from a ProSe Function. Moreover, the code may be indicative of a discovery service for RSU Info.

Still referring to FIG. 9B, in accordance with the illustrated example, the D2D-RSU 904 may be configured to request RSU info from the network node 902, which may include a ProSe Function. The refresh request (sent at 0) may be guarded by a (refresh) timer that is started the first time the D2D-RSU 904 receives the RSU info. This timer may also be provided by the ProSe Function or any other network node. Operations 1 and 2 are described above with reference to FIG. 9A. At 3, in accordance with the illustrated example, the vehicle 902 sends a solicitation message. The vehicle 902 may be triggered to send the solicitation message for RSU info over the PC5 link. For example, the trigger may be by an application that wants to use an IP connection, or by the user via a GUI, or when the vehicle enters a new location for which no RSU info is available. The vehicle may send a PC5 message, for example using preconfigured information or information received from a ProSe Function (e.g., due to a prior communication with a ProSe Function). The information may include, for example, source and destination L2 address for the PC5 link, source and destination IP address, etc. The PC5 message may indicate a solicitation for RSU info. The RSU solicitation message may include location information (as described above) for which the vehicle 902 is interested in receiving RSU info. For example, the user of the vehicle 902 may enter a location, an address, or a destination, which is then included in the PC5 message. The request may indicate, for example and without limitation, the Vehicle's expected destination, expected travel path, and rate of speed. Thus, as described above, the RSU 904 may receive a solicitation, from one or more vehicles, for information associated with the RSU 904 and/or other RSUs, and the transmission of information associated with the RSU 904 and/or other RSUs (at 4) may be sent in response to the solicitation.

At the D2D-RSU 904, a solicitation message for RSU info may be received, from a plurality of vehicles, for instance the vehicle 902. The D2D-RSU 904 may verify if the vehicle is authorized to solicit this request, before responding. The D2D-RSU 904 may verify if location information is included in the message. In some examples, the location information indicates the area for which RSU info is requested. The area may also be based on the vehicle's expected destination, travel path, and rate of speed, for example. The D2D-RSU 904 may, for example using mapping information it contains locally, retrieve the RSU info that corresponds to the included location information. The D2D-RSU 904 may also verify how the response should be sent (e.g., unicast or multicast/broadcast). In a unicast/broadcast scenario, vehicles that did not request the RSU information may receive it anyway. In some cases, this causes an overhead savings because other vehicles might not need to send solicitation messages that they would have otherwise sent. In an example, before sending the message at 4, the D2D-RSU 904 determines how the message should be sent, based on local configuration or policies. The RSU 904 may also determine the location information that should be included in the message based on the determined RSUs, and may determines the period of time for which this information is valid.

At 4, in accordance with the illustrated example, the D2D-RSU 904 transmits the PC5 message with the RSU info. Operation 5 may proceed as described above with reference to operation 4 in FIG. 9A.

In some cases, the RSU info may be too long to fit in one PC5 message. For example, PC5-D messages may have a limited size that is less than RSU info. In such cases, by way of example, the D2D-RSU 904 may be configured to send M number of PC5 messages, where M is an integer, such that the overall RSU info content is carried in portions over the M transmissions.

Thus, in accordance with various embodiments, a vehicle may be configured or triggered to send a solicitation message, such as a PC5 solicitation message, for RSU info when requested by the user (e.g., via a GUI), when the vehicle enters a new area for which no RSU info is available or saved, when a timer expires wherein the timer guards the validity of previously received RSU info, or the like. The D2D-RSU 904 may also provide an indication in the PC5 message as to whether the receiving vehicle should also autonomously advertise the received RSU Info. If so, the information may also include, for example and without limitation, the type of access technology to use, the type of protocol to use (e.g., PC5 and/or ND), the addresses (e.g., destination L2, and/or IP address, port numbers, etc.) to use, the frequency of transmission, and the time window during which transmissions should be made with a certain (optional) frequency. Alternatively, or additionally, the vehicle may be configured with this information such that it takes the actions described above when it receives the RSU Info, using the configured information that defines if and how the RSU Info should be advertised to other vehicles.

In the examples described above, a vehicle (or device) may be configured to transmit the received (via PC5 interface) RSU Info over another access technology using the same or different protocol. For example, a vehicle supporting both cellular (and D2D communication) and 802.11 may receive RSU Info over PC5 (as described above), and send the same information over 802.11. When sending the same information over 802.11, the vehicle can use PC5 messages (and hence a D2D protocol message such as PC5-D or PC5-S messages) again over 802.11, or it can use a different protocol such as the ND protocol in which it includes the RSU Info as is described below. In some cases, the vehicle can get this configuration from a ProSe Function, or the configuration can be an explicit indication in the received PC5 message that carries the RSU Info.

Turning now to an example ND-based embodiment, in an example, an RSU may use neighbor discovery (ND) to provide RSU info to a vehicle. The RSU info may correspond to other RSUs that are in the neighborhood of the RSU having a coverage area that includes a given vehicle. In an example, an RSU is configured to provide RSU info for its adjacent K neighbors only, where K is an integer. Thus, a given RSU may transmit information in a ND message, wherein the information may be associated with one or more RSUs adjacent to the given RSU. In accordance with various embodiments now described, ND messages are created or modified to carry RSU information. Similarly, an ND message may be created or modified to solicit RSU info.

For example, the RA message may be modified to carry RSU info. The RSU info may be included in an "Options" field. A new type may be defined and used in the Options field, where the value indicates that the content is RSU info. An RSU (that is using 802.11, regardless of whether or not it supports cellular communication or D2D communication) may be configured to include RSU info in the RA messages that it advertises.

Figure 10:
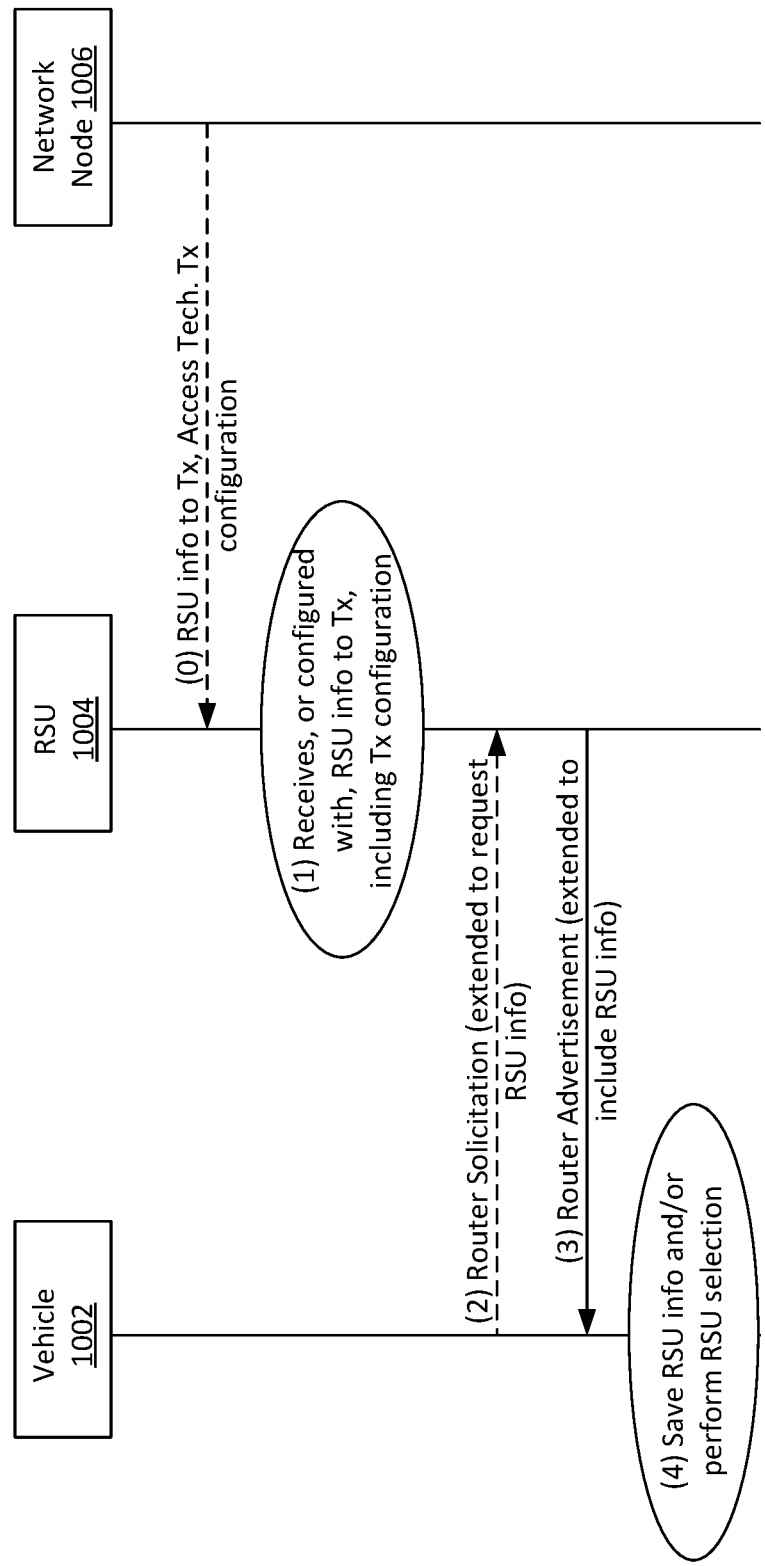
FIG. 10 is a call flow in RSU information is solicited and advertised in neighbor discovery (ND) messages, in accordance with an example embodiment.

FIG. 10 shows an example procedure for an RSU to include RSU info in the RA message. FIG. 10 depicts an example system 1000 that includes a vehicle 1002, a RSU 1004, and a network node 1006. It will be appreciated that the example system 1000 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 10, and all such embodiments are contemplated as within the scope of the present disclosure.

At 0, in accordance with the illustrated example, the network node 1006, for example an operation and management server, may provide RSU info about other RSU's to each RSU. For example, the network node 1006 may provide RSU info to the RSU 1004, and the RSU info may related to RSUs other than the RSU 1004. The network node 1006 may also provide configuration information regarding how this information should be sent (e.g., using ND messages, the frequency of transmission, etc). At 1, the RSU 1004 receives RSU info and configuration info regarding the advertisement of the received RSU info, optionally from the network node 1006. For example, the network node 1006 may comprise another RSU or a network function. In some examples, this information may also be locally configured via an API.

Still referring to FIG. 10, at 2, the vehicle 1002 may be triggered to send a solicitation for RSU info. This trigger may be any of the listed triggers described above. The vehicle 1002 may be configured to use the ND protocol and thus ND messages (e.g., RS or NS messages) to get RSU info in addition to the info of the RSU with which the vehicle communicates to. The vehicle may use a new or modified ND message (e.g., a modified RS message to solicit RSU info. For example, in the RS message that the vehicle 1002 may send, the vehicle 1002 may use a new value for the Options field that indicates the need for RSU info. The message may indicate the Vehicle's expected destination, expected travel path, and rate of speed, among other indications.

At 3, in accordance with the illustrated example, the RSU 1004 may be configured to include RSU info in the ND messages such as, but not limited to, the RA messages. The RSU 1004 may also receive a solicitation request for RSU info in a modified ND message as described in operation 2. The RSU 1004 may use a new or modified ND message (e.g., a modified RA message that includes the RSU info in it). For example, a new value may be defined for the Options field that indicates that the content is RSU info. In an example, the RSU info is included in the RA message and sent to the vehicle(s). In some examples, the RSU 1004 may use a unicast or multicast address when sending the ND message with the RSU info. For example, if responding to a RS message, the RSU 1004 might use a unicast message that carries the RSU info. Otherwise, the RSU might send the modified or new ND message using a multicast address. Alternatively, a new IP multicast address may be defined and used for this purpose. At 4, the vehicle saves the RSU info and performs RSU selection in accordance with operation 4 described with reference to FIG. 9A above.

In an alternative example, RSU info is advertised by the RSU indicating an IP address or a link that can be used by the vehicles to get the RSU info. Thus, an RA message may be modified to include, for example, "IP address for RSU info" or "link to RSU info". This may also be defined as a new Options field. The vehicles, upon reception of this information in the RA (or ND) message, can then use the IP address to obtain the RSU info over IP, for example. Thus, referring to FIG. 10, if the vehicle 1002 receives an RA message (at 3) with an IP address that can be used for RSU info retrieval, the vehicle 1002 may use the IP address to get the RSU info. This may be performed between operations 3 and 4. After retrieving the RSU info using the indicated IP address, the vehicle 1002 may perform operation 4 as described above.

Figure 11:
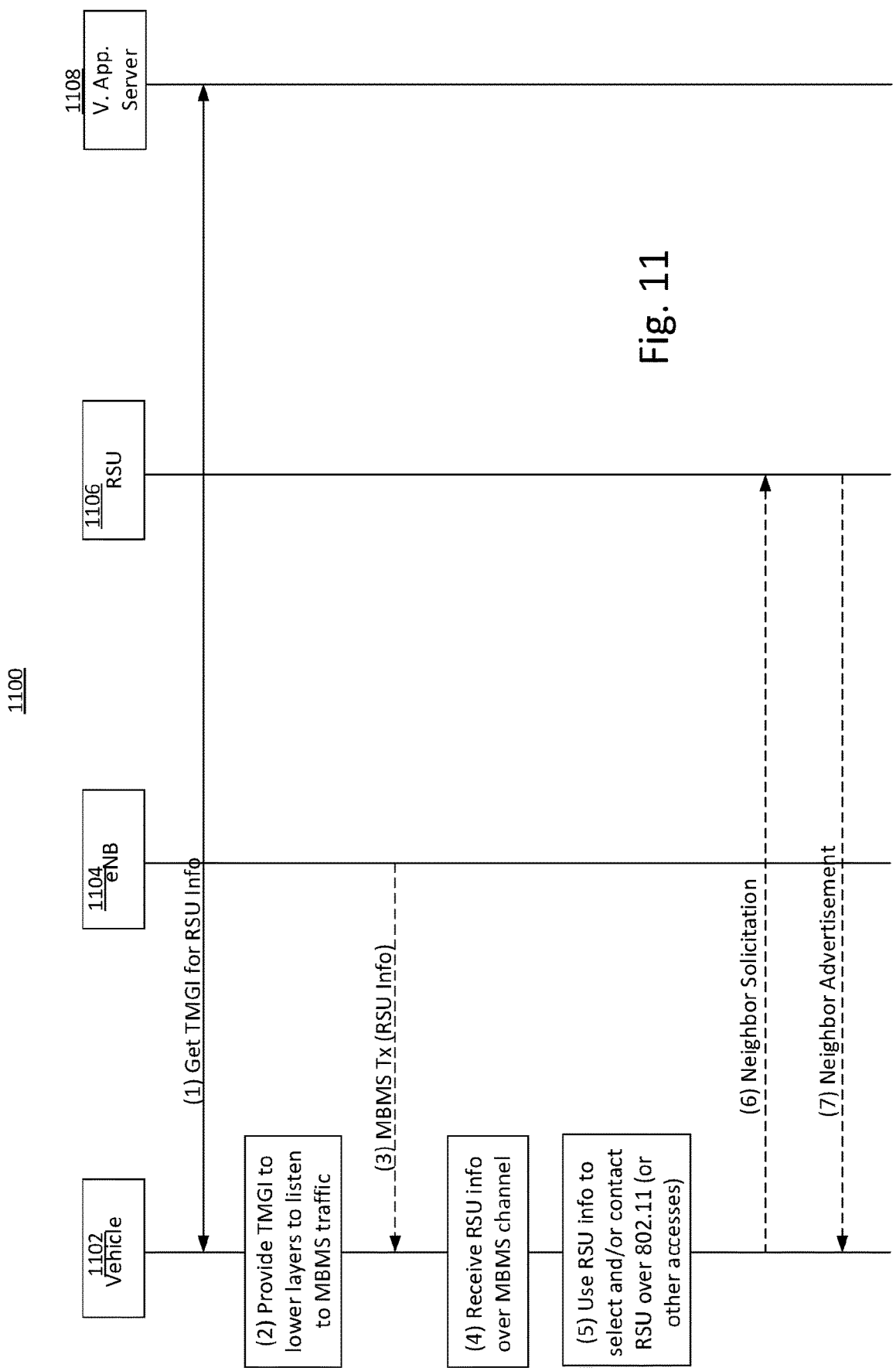
FIG. 11 is a call flow for obtaining RSU information via a multimedia broadcast multicast service (MBMS) in accordance with an example embodiment.

Referring now to FIG. 11, an example multimedia broadcast multicast service (MBMS) based embodiment is depicted. In accordance with the illustrated example, RAN nodes of the cellular network broadcast the RSU info as MBMS data or content. Thus, the vehicles may be aware of the temporary mobile group ID (TMGI) related to this MBMS service or data. In an example, the vehicles may obtain the TMGI from a Vehicular Service Application Server (or any other related application server or server), or may be configured with this information, or may obtain this information from any network node, such as, for example, an MME, HSS, ProSe Function, etc. When the vehicle is triggered to obtain RSU info, using any of the mechanisms described above for example, or when the vehicle enters a new area in which it cannot detect data for previously received MBMS data (which contains RSU info), then the vehicle may contact the application server using a unicast connection to get the TMGI. In some cases, if triggered to retrieve RSU info, the vehicle listens for MBMS data on the MBMS channel corresponding to the TMGI for RSU info. Once this data is detected, the vehicle may retrieve the RSU info for storing or using as described above.

FIG. 11 depicts an example system 1100 that includes a vehicle 1102, an eNB 1104, an RSU 1106, and a vehicle application server 1108. It will be appreciated that the example system 1100 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 11, and all such embodiments are contemplated as within the scope of the present disclosure.

At 1, in accordance with the illustrated example, the vehicle 1102 obtains the TMGI for a service that provides RSU Info over MBMS. This operation may occur at the application layer. In the illustrated example, the vehicle 1102 obtains the TMGI from the server 1108. At 2, the vehicle 1102 (or the application layer that obtained the TMGI) provides the TMGI to the lower layers of the cellular stack or the entity that is responsible for managing RSU info (which in turn may provide this info to the lower layers of the cellular stack) so that data for this TMGI is read. The vehicle 1102 starts listening for the RSU info using the received TMGI. At 3, the Radio Access Network (RAN), which is referred to as the eNB 1104 for simplicity, broadcasts MBMS data carrying RSU info with the associated TMGI. At 4, the vehicle 1102 receives RSU info over the MBMS channel after the MBMS service is detected using the corresponding TMGI for RSU info. Operation 5 is described above with reference to operation 4 of FIG. 9A. At 6, in accordance with the illustrated example, the vehicle 1102 may use the RSU info to send an NS message to the RSU 1106. At 7, the RSU 1106 responds with an NA message. In some cases, the RSU 1106 may also provide an indication in the ND message as to whether the receiving vehicle should also autonomously advertise the received RSU Info. If so, the information may also include, for example and without limitation, the type of access technology to use, the type of protocol to use (e.g. PC5 and/or ND), the addresses (e.g., destination L2, and/or IP address, port numbers, etc) to use, the frequency of transmission, the time window during which transmissions should be made with a certain (optional) frequency. The vehicle 1102 may also be configured with this information such that it takes the actions described above when it receives the RSU Info, using the configured information that defines if and how the RSU Info should be advertised to other vehicles. The vehicle 1102 may the use the RSU info as described earlier.

Figure 12:
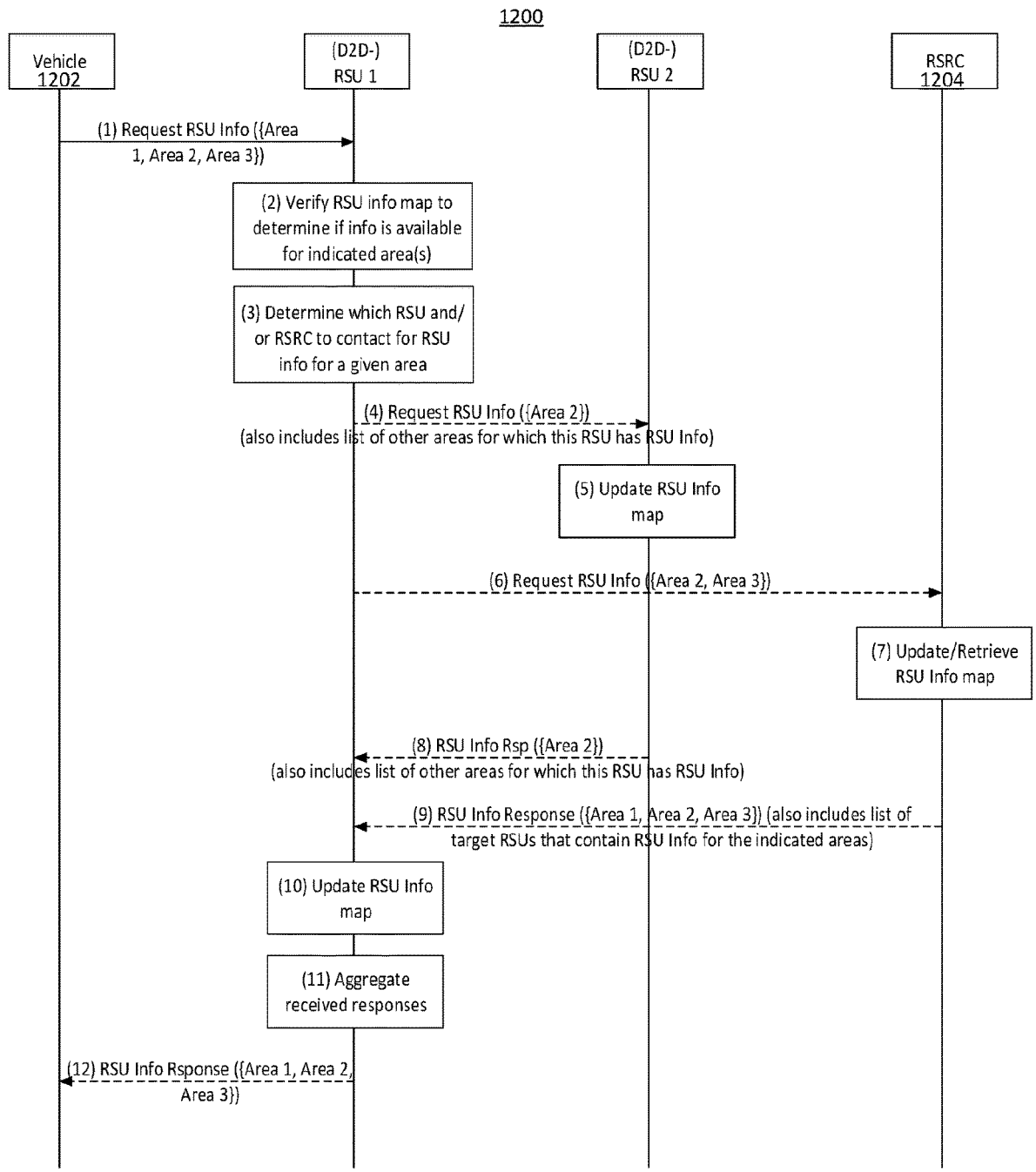
FIG. 12 is an example call for retrieving RSU information in accordance with an example embodiment.

Referring generally to FIG. 12, RSU behavior for retrieving RSU info is now discussed. In some cases, RSU info may be retrieved upon a request from a vehicle for a given list of areas. In specific examples, the request message (from the vehicles) and the response message from the RSU may be a PC5 message or a ND message as described above. Thus, the general terms "request" and "response" may be used herein to refer to both PC5 and ND messages, or any similar request/response message using any protocol.

FIG. 12 depicts an example system 1200 that includes a vehicle 1202, an RSU 1, an RSU 2, and RSU service repository center (RSRC) 1204. It will be appreciated that the example system 1200 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 12, and all such embodiments are contemplated as within the scope of the present disclosure.

In accordance with the illustrated example, at 1, the request includes at least one identified area for which the vehicle is interested to get RSU info. As an example, the request contains three areas: Area 1, Area 2, and Area 3. It will be understood that "Area X" can be represented in any form of location information as described herein.

When the RSU 1, which is also referred to herein as the source RSU, receives a request for RSU Info, the RSU 1 verifies the area or location for which the requester is interested in getting RSU Info. The source RSU may already contain the information locally. If so, in an example, it responds and provides the RSU Info in a response message (e.g., PC5 message or a RA/NA message). If the source RSU does not have RSU Info for a given location or area, the source RSU may be configured with mapping information that contains the RSU ID/Address per location (e.g. {Location Y/Area Y to RSU ID/Address} mapping), and then the source RSU may use this information to contact the identified target RSU for a given area. The configuration or local information at the source RSU may also include the target RSU's (e.g., RSU 2) address (e.g., IP or L2 address, port number to use, etc).

Having identified a target RSU, the source RSU may send a request for RSU Info to the target RSU. In this request, the source RSU may also include its own RSU Info and the area that the information corresponds to. The source RSU may also include address information (e.g., IP and/or L2) that the target RSU should use to send the response back. This way, the target RSU can save the information and update its "RSU Info map". The link between the source and target RSUs may be wired or wireless (e.g., 802.11 or cellular). In some cases, each RSU may be configured with information about which access/link to use for such purposes and the necessary IP addresses, etc, to use for sending and receiving requests and responses, respectively. In specific examples, the source RSU may also be configured with a policy that requires contacting the RSRC 1204 for retrieving RSU Info. The RSRC 1204 may be a repository node that contains RSU Info of the RSUs in a given area, and that can provide RSU Info or information about how one RSU can contact another directly and/or how one RSU can be contacted by a vehicle. Example RSRCs are further described below.

In some cases, the source RSU may contact the RSRC 1204 if it does not know or does not have any information about potential target RSUs (e.g., for a given area). The source RSU may alternatively send the request to the RSRC if the required number of areas exceeds a certain threshold. By way of example, if the list of areas contains 10 different locations, it may be faster to get the information from the RSRC instead of contacting 10 different target RSUs. In specific examples, an RSU that sends a request to the RSRC may also include the list of target RSUs with which it can communicate directly (over wired or wireless links). This information may help the RSRC to determine if it can indicate to the requesting RSU that future requests may be sent directly to these indicated target RSUs.

A target RSU may receive a request (over a wired or wireless link) for RSU Info for a given list of areas or locations. The request may also contain information about the areas that the source RSU has valid RSU Info, or the request may also include the RSU Info per area. The target RSU may update its RSU Info map based on this included information. In an example, the target RSU determines whether it contains the information for the requested area(s). If it does, the target RSU may respond and provides the RSU Info. In some cases, the response may include information about the areas for which the target RSU has valid RSU Info, or the response may include the RSU Info itself for other areas. If the target RSU does not contain the information for the requested area, the RSU may then contact the RSRC as described above (for a source RSU contacting the RSRC).

An RSRC may receive a request from an RSU to get RSU Info for a list of areas. The RSRC may verify its mapping information and determine the RSU Info that is relevant for the indicated areas. The RSRC also may verify its local information to determine which other RSUs are in that area, or which other target RSUs can be reached by the source RSU using information included in the source RSU's request as described above. The RSRC may update its RSU Info map accordingly. For example, the RSRC may update information about which target RSUs can be reached by this requesting RSU. The RSRC may respond back to the source or requesting RSU and include RSU Info for the requested area, and optionally other RSU Info for other areas or identities (including relevant addresses) of target RSUs that have this information. This can be used by the requesting RSU for future requests.

A source or requesting RSU may receive a response with RSU Info from a target RSU or from the RSRC. The source RSU may use any received information about other RSUs or other RSU Info per area to update its RSU Info map. The source RSU may wait to receive responses from multiple target entities (e.g., multiple target RSUs), or at least one RSU and an RSRC, etc. The source RSU may aggregate the RSU Info to match the areas for which this request was received. The source RSU then may send a response to the requesting vehicle containing the RSU Info for the requested areas.

Referring in particular to FIG. 12, the RSU 1 and the RSU 2 may be referred to as the source RSU and the target RSU, respectively. At 1, in accordance with the illustrated example, the vehicle 1202 is triggered, as described above, to send a request for information associated with road side units (RSU Info). The request indicates one or more areas pertaining to the request for information. For example, the request may include the areas for which information is desired. The request message may comprise any of the previously discussed PC5 or ND messages. At 2, the source RSU receives the request for RSU Info for a list of one or more areas. The source RSU verifies its local RSU Info map to determine if this information is available at the source RSU for the indicated areas. If the information pertaining to the one or more areas is available at the RSU 1, the RSU 1 may send a response to the vehicle 1202 (at 11), and the response may include the information pertaining to the one or more areas.

At 3, if the information pertaining to the one or more areas is not available at the RSU 1, the RSU 1 may determine, based on local policies for example, one or more target road side units corresponding to the one or more areas. At 3, the RSU 1 may also determine that the RSRC 1204 should be contacted to get RSU Info for the areas for which no valid RSU Info is available. The source RSU may have in its RSU Info map the required addresses to use in order to contact the target RSU(s) and/or the RSRC 1204.

At 4, in accordance with the illustrated example, the source RSU determines to contact a target RSU (RSU 2), and the source RSU sends a request for RSU Info. The request may include the area for which the information is required. The source RSU may also include a list of areas for which the source RSU contains valid RSU Info, or it may contain the RSU Info itself. The request also may contain address(es) that the target RSU can/should use to send the response to this request. At 5, the target RSU receives the request for RSU Info from the source RSU. The target RSU verifies the indicates area(s) for which RSU Info is needed. The target RSU also may use any RSU info (or area list for which the source RSU has valid RSU Info) to update its RSU Info map. If the target RSU has a valid RSU Info for the requested area, the target RSU may send a response to the source RSU as shown in operation 8. If not, the target RSU may be configured to request other target RSUs or the RSRC 1204 for RSU Info pertaining to the indicated area. The target RSU can take similar actions as the source RSU's action in operation 6.

At 6, the source RSU may be configured to contact the RSRC 1204 to get RSU Info. Optionally, the source RSU may do so when it does not have valid RSU Info for the requested area(s), or when the requested list of areas contains a preconfigured number of requested areas. The source RSU may send a request to the RSRC 1204 to get the RSU Info, and may include a list of areas for which the request is made. The source RSU may also include the list of target RSUs with which it can communicate. The source may also include the RSU Info per area that it currently has. At 7, in accordance with the illustrated example, the RSRC 1204 updates its RSU Info map according to the list of target RSUs that the source RSU indicated are reachable by the source RSU. The RSRC 1204 may determine the RSU Info for the requested area(s), retrieve the RSU Info map, and send the RSU Info and a list of target RSU identities (and addresses e.g. IP and/or L2) per area that the source RSU can contact for future requests.

At 8, in accordance with the illustrated example, the target RSU sends the determined RSU Info to the source RSU. The target RSU also includes a list of areas for which it has valid RSU Info, or it may also include the RSU Info for these areas. At 9, the RSRC 1204 sends the determined RSU Info to the source RSU. The RSRC 1204 may also include a list of RSUs (and their identities, addresses, etc) per area that can be contacted for future requests. At 10, the source RSU receives responses from one or more target RSUs and/or the RSRC 1204. The source RSU then updates its RSU Info map based on the received information. For example, it may save the target RSUs (and their addresses) per area, which can be contacted for future RSU Info requests that correspond to these areas. At 11, the source RSU may aggregate the responses for the requested RSU Info corresponding to the requested areas. At 12, the source RSU may send the response message (e.g., PC5 or ND) to the vehicle 1202. The response message may contain the RSU Info for the requested areas). The vehicle 1202 can then perform the operations for using the RSU Info as described with reference to FIG. 9A at 4.

It will be understood that the examples described above, unless otherwise specified, may apply to vehicle-to-vehicle communication as well as to the V2I example scenarios provided. Further, other aspects of V2V RSU Info exchange are now described.

In various examples, vehicles may be configured to save, for example and without limitation, a list of detected RSUs (referred to generally as RSU Info), the location of a detection or a coverage area, the time of detection, the types of access technologies supported, etc. The vehicles may also be configured to save a maximum number of detected RSUs (and the corresponding RSU Info per RSU). Alternatively, the maximum number may be defined per area. The vehicles may also have a certain time during which any RSU Info is assumed to be valid, and after which the vehicle is supposed to retrieve or refresh the RSU Info.

A given vehicle may be configured with well-known addresses or links (e.g., destination L2 address, IP address, etc.) that a vehicle can use to request a history of detected RSU Info from other vehicles that are in its coverage. For example, a L2 address and/or IP address may be defined and used specifically for sending a multicast request that solicits a history of RSU information. A requesting vehicle may use the defined address as the destination L2/IP address, and the receiving vehicles (or RSUs) may process the request, for example, because the defined address is understood by them. A vehicle may be configured with policies or rules that define how the vehicle should retrieve or refresh RSU Info. For example, a given vehicle may first try using 802.11 access along with the ND protocol. The given vehicle may then use PC5 messaging, etc. These rules can be configured in the vehicles by the RSRC or the ProSe Function or any other network node, or specific RSUs. When requesting RSU Info (or history of RSU Info since a time of detection may also be saved and included in the response), a vehicle may also indicate the area for which it is interested in getting RSU Info. The vehicle may also indicate a time period, starting at (or prior to) the history of RSU Info is required. The vehicles may also be configured to report a history of detected RSU to a server such as an RSRC, the ProSe Function, or another server. The report can be sent when, as an example, a certain number of RSUs have been detected, optionally over a certain period of time. Or, in an alternative example the report can be sent periodically, etc.

In some cases, a vehicle may receive a request to report a history of RSU Info. The vehicle may verify if the request includes a list of areas and/or a time window, starting from which, the detected RSU Info should be sent back. The vehicle may filter RSU Info based on area and time as described. The vehicle may then respond with the filtered RSU Info.

A vehicle may receive a history of RSU Info from other vehicles, optionally as a response to a previous request sent by this vehicle. The vehicle may save the RSU Info and use it to display RSUs or select RSUs for IP services.

Figure 13:
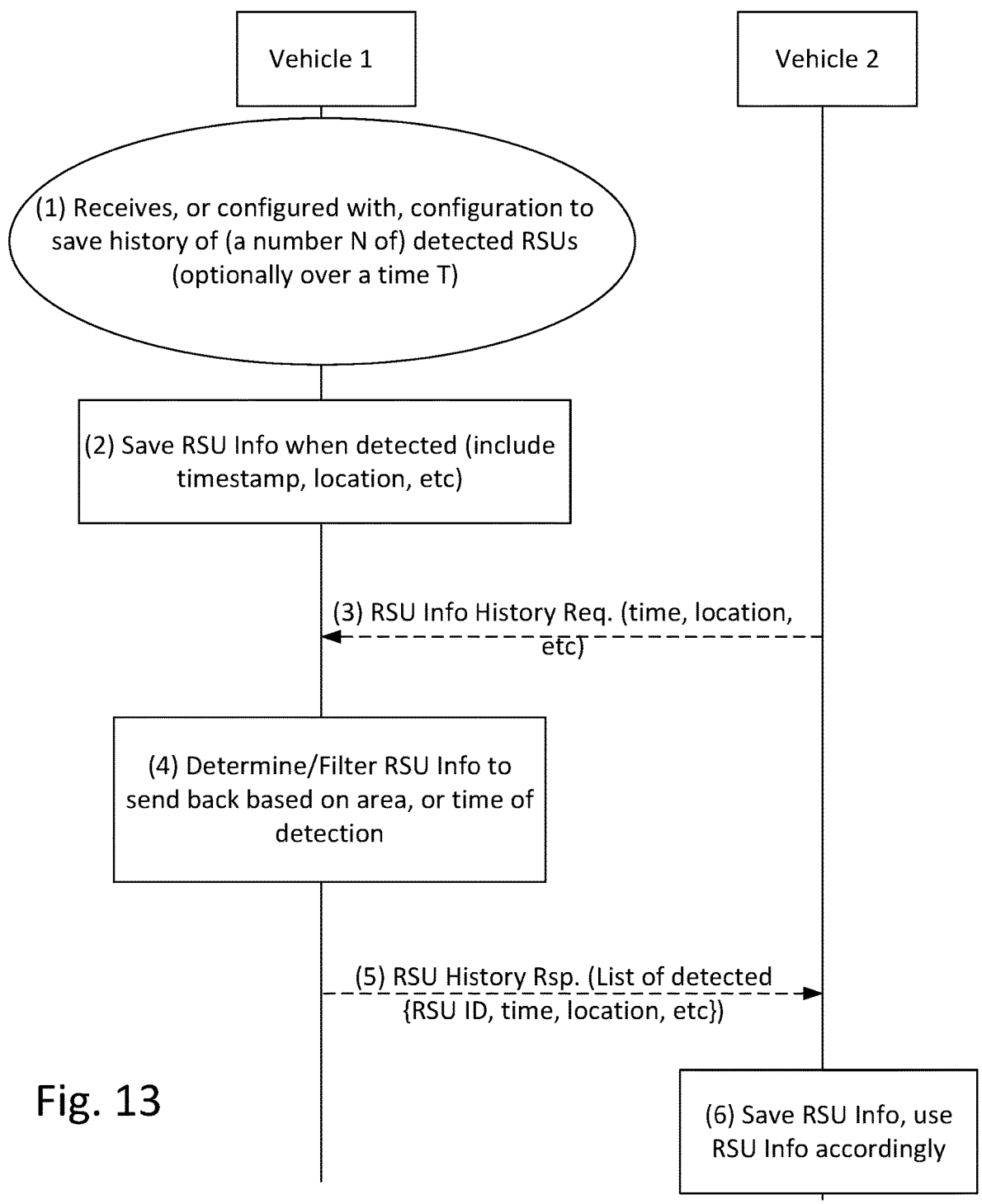
FIG. 13 is a call flow for exchanging RSU information between vehicles in accordance with an example embodiment.

Referring now to FIG. 13, an example system 1300 is shown that includes a first vehicle 1 and a second vehicle 2. It will be appreciated that the example system 1300 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 13, and all such embodiments are contemplated as within the scope of the present disclosure.

At 1, in accordance with the illustrated example, the Vehicle 1 is configured, or receives configuration information, to store a history of detected RSU Info, optionally per area, and optionally for a given time. At 2, the Vehicle 1 detects (e.g., using any of the previous described mechanisms) RSUs and saves the corresponding RSU Info accordingly. At 3, the Vehicle 2 may be triggered to get a history of detected RSU Info using any of the triggering mechanisms previously described. At 3, the vehicle 2 sends a request for history of RSU Info. The request may be sent by means of a ND or PC5 message. Regardless, the vehicle 2 can be configured with, and hence can use, specific (multicast) L2 and/or IP address, port numbers, transport protocol (e.g., UDP) to do so. The vehicle 2 may also have policies that define whether ND and/or PC5 messages should be used. The request may include a list of areas and time for which the RSU Info is needed. At 4, the Vehicle 1 receives a request for a history of RSU Info that has been detected. The vehicle 1 may filter the RSU Info it saved based on the request criteria as described earlier. At 5, the Vehicle 1 may send a response with the history of RSU Info. At 6, the Vehicle 2 receives the history of detected RSU Info. The vehicle 2 may take the same actions as described with reference to FIG. 9A at 4.

The RSU Info described above can also include other information, parameters, information elements described below, such as, for example and without limitation, a Group ID, Access Technology Info, Additional Info, etc. Various information will be presented and discussed below, but it should be understood that the RSU Info reference herein is not limited to the parameters listed above, and examples of RSU Info may include any combination of parameters described herein.

Figure 6:
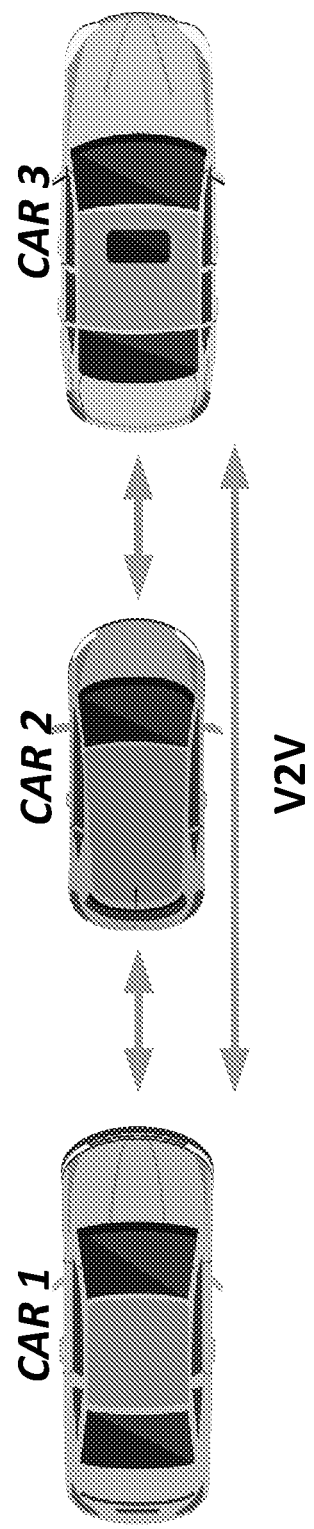
FIG. 6 depicts an example platooning use case in which vehicle-to-vehicle (V2V) communications are utilized among vehicles traveling in the same direction as each other.

Turning now to various embodiments related to neighbor discovery for vehicular communications, in an example platooning use case depicted in FIG. 6, using current approaches, in order to ensure the link layer address has not changed, each car might need to send one NS message to two other cars, which may then respond using a NA message. Therefore, in current approaches, a total of 6 NS messages, and a total of 12 ND messages because each NS triggers a NA, would be needed so that each car can ensure that the neighbor is still reachable. It is recognized herein that the number of ND messages may grow as the number of cars in a platoon increases. It is further recognized herein that this becomes even more inefficient when transmissions collide if, for example, at least two cars attempt to verify the reachability of the neighbors at the same time. Thus, it is recognized herein that verifying the reachability of the member cars of a platoon may be improved. Further, in some cases, NS messages are sent by a node to register an IP address, which triggers Duplicate Address Detection (DAD). With a large number of cars on the road, it is recognized herein that this may require numerous messages for DAD. The NS messages are also used for Neighbor Unreachability Detection (NUD), which may further create network congestion as the vehicles move and links with neighbors are lost.

Because the ND protocol runs at the network layer (e.g., IP), the requests and responses are sent and received over a particular link or access technology. Thus, the solicitations and responses only carry information pertaining to the access technology over which they are sent (e.g., information about the L2 address of a sender or receiver). It is recognized herein, however, that vehicles or other communicating nodes (e.g., RSUs, smartphones, etc) are often capable of at least two access technologies, such as 802.11 and cellular (e.g., D2D communication). Current ND messages do not contain information about the support of other access technologies. It is recognized herein that his information may be beneficial for V2X communication. For example, if a vehicle learns that an RSU is capable of both 802.11 and cellular technology, the vehicle may switch to the use of cellular D2D communication when it goes out of coverage of the RSU. It may switch because cellular technology has a larger coverage area. It is further recognized herein that other information that can render V2X services more efficient is currently missing in ND messages.

In various examples, new or modified ND messages are used for group neighbor discovery. In an example, access technology information is included in ND messages. Although new parameters are now described, it will be understood that the RSU Info presented previously can also be used where appropriate.

In an example platooning use case, to save signaling time, a Group Neighbor Discovery (GND) message is used in accordance with an example embodiment. In an example, a Group ID (GID) is used to define the group to which vehicles belong. The vehicles that are part of a particular group are aware of the GID. For example, the vehicles may be configured with this information or a user may input this information using a GUI. In some cases, the number of member vehicles in particular groups may vary. Further, in various examples, a vehicle may be part of a plurality groups, and thus a vehicle may have a different GID for each group.

In an example, a vehicle in a group may send a Group Neighbor Discovery message to verify if the members of the group are still within communication range, or are on the same link. A vehicle may be configured with a periodicity for sending a Group Neighbor Discovery (GND) message, where a GND may be a Group NS (GNS) or Group NA (GNA). In an example, if a vehicle that wants to verify the reachability of other member vehicles, it sends a GNS message.

In a GND message, a vehicle may include at least one GID. In the lower layers, the vehicle may include its L2 address as the source L2 address. In an example, the destination L2 address may be set to the multicast address of 802.11 (01-00-5E-00-00-00-01-00-5E-7F-FF-FF for IPv4 multicast, and 33-33-xx-xx-xx-xx for IPv6 multicast) or that of any technology that is being used. The vehicle may send the GND and set the destination IP address to the all-nodes multicast address (i.e. FF02::1) or to a well-known solicited-node multicast address. When sending a GND, in some cases, the vehicle may already know the members of the group. As such, when a source vehicle receives a response, it may verify the response against its local information regarding which member has responded. The vehicle may then update an "availability" list, where a "status" field may be defined to indicate if the target vehicle is "reachable" or "not reachable". In various examples described below, the GND messages is referred to as a new ND message, but it will be understood that the GND message may be implemented using an existing ND message with a new Options field.

Figure 14:
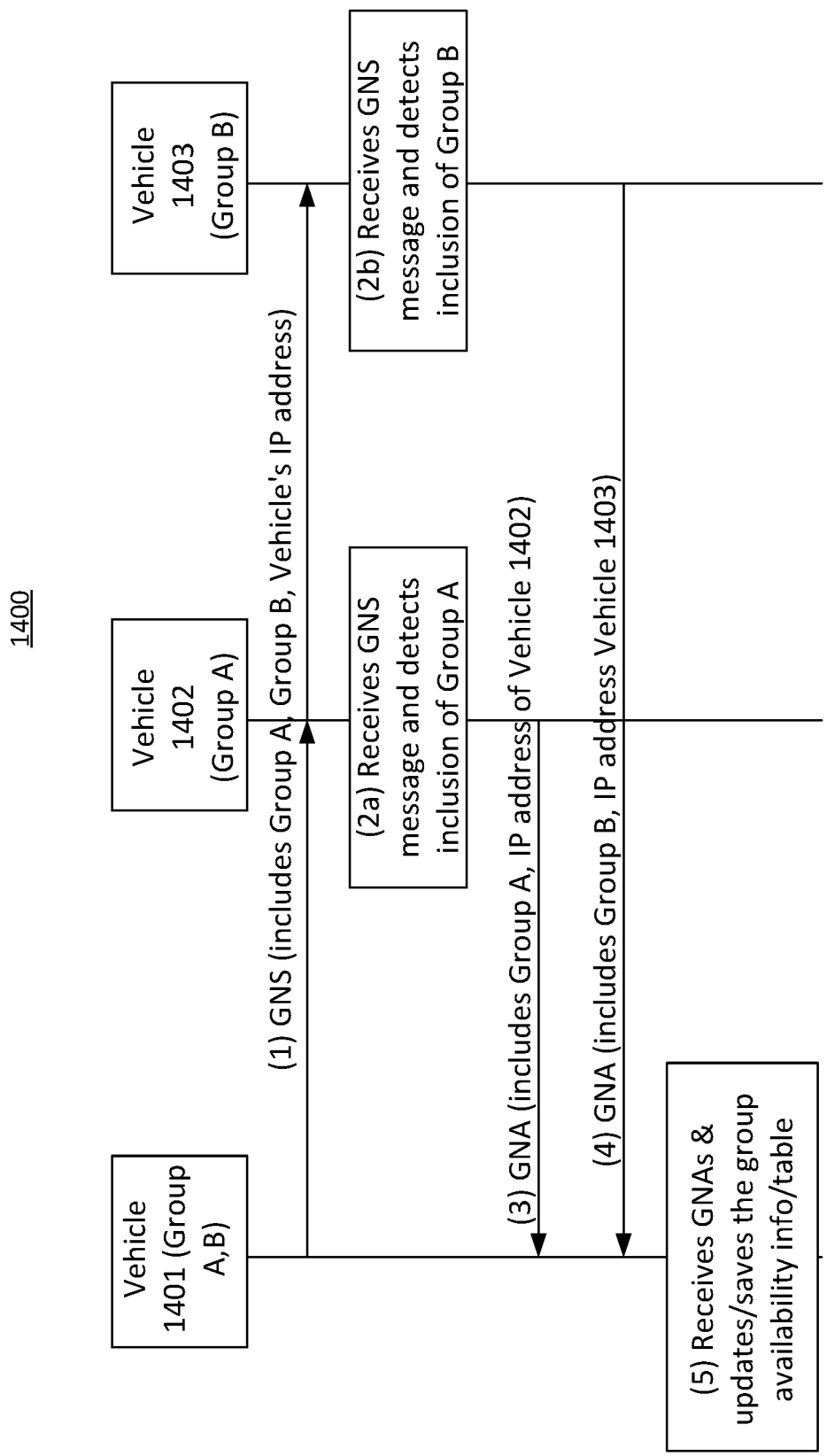
FIG. 14 is a call flow for group neighbor solicitation and advertisement in accordance with an example embodiment.

In an example, a vehicle may receive a GNS message that may contain an L2 address set to a multicast address, or set to a well-defined value that is meant to be used for GND messages. The vehicle may verify the contents so as to at least verify the list of GIDs that is included in the GNS message. If the vehicle is a member of at least one of the GIDs, the vehicle may send a GNA message. The GNA may contain one or more groups of which the target vehicle is a member. For example, if the target vehicle is a member of only one group out of the included list, then the response may include only the GID corresponding to the group of which it is a member. By way of further example, if a target vehicle is a member of two or more groups, then the response may include two or more GIDs corresponding to the two or more groups of which the vehicle is a member, and which were part of the GNS message. In some cases, the GNA may be sent unicast to the source vehicle that sent the GNS, and the destination L2 address may be set to the source L2 address in the received GNS message. FIG. 14 shows an example of GND in accordance with an example embodiment.

Referring to FIG. 14, an example system 400 includes a first vehicle 1401, a second vehicle 1402, and a third vehicle 1403. It will be appreciated that the example system 1400 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 14, and all such embodiments are contemplated as within the scope of the present disclosure.

Various triggers may cause an GNS or GNA messages to be sent. For example, a user may trigger the message via a GUI. Alternatively, when a vehicle is engaged in group communications, it may start a timer, based on local configurations or configuration received from a network node or application server, which guards the periodicity for sending the GND message. Another example trigger for sending the GND message is when a vehicle stops receiving data from its neighbors with which it had an IP session. The GND message (e.g., GNS) may be sent if a vehicle stops receiving data from one group member (and neighbor vehicle), or if data is no longer being received from a predetermined number of group member vehicles. Optionally or additionally, the GNS message may be sent if data is no longer received during a preconfigured time period.

Referring now in particular to FIG. 14, in accordance with the illustrated example, Vehicle 1401 is a member of two groups, Group A and Group B. Vehicle 1402 and Vehicle 1403 are members of only one group, respectively. In accordance with the example, vehicle 1402 is a member of Group A, and vehicle 1403 is a member of Group B. At 1, Vehicle 1401 is triggered to send a GNS message. The vehicle 1401 sends the GNS message and includes two GIDs, namely the ID for Group A and Group B. It also may set the source/destination L2 address fields of the access technology frame or PDU as described earlier. The GNS may also include the IP address of vehicle 1401. At 2a, in accordance with the illustrated example, Vehicle 2 receives the GNS message and verifies the included GIDs. Vehicle 1402 also determines that it is member of one of the included GIDs, namely Group A. It then determines to respond to Vehicle 1401. At 2b, in accordance with the illustrated example, Vehicle 1403 receives the GNS message and verifies the included GIDs. Vehicle 1403 also determines that it is member of one of the included GIDs, namely Group B. Vehicle 1403 then determines to respond to Vehicle 1401. It will be understood that operations 2a and 2b may occur at the same time, or in any order as desired.

Still referring to FIG. 14, in accordance with the illustrated example, at 3, based on the determination at 2a, Vehicle 1402 sends a GNA as a unicast message to Vehicle 1401 using the L2 field values as described above. The GNA may include a list of one or more GIDs that Vehicle 1402 is a member of, and that matched at least one of the subset of GIDs in the GNS message. The GNA may also include the IP address of Vehicle 1402. At 4, based on the determination at 2b, Vehicle 1403 sends a GNA as a unicast message to Vehicle 1401 using the L2 field values as described above. The GNA may include a list of one or more GIDs that Vehicle 1403 is a member of, and that matched at least one of the subset of GIDs in the GNS message. The GNA may also include the IP address of Vehicle 1403. It will be understood that the operations at 3 and 4 may occur at the substantially the same time or in any order. At 5, Vehicle 1401, which is the source vehicle in this example, receives the GNA messages from both Vehicle 1402 and Vehicle 1402, for example at different times. The Vehicle 1401 may verify the GIDs included in the response. The Vehicle 1401 may this information to update an availability table or information as described herein. As part of the update, the vehicle may also update the L2 address of the vehicle that sent the GNA, for example, if the address has changed.

In the above-described example, it is assumed that Vehicle 1401 sends the GNS message, though it will be understood that any of the other vehicles can also send this message. Furthermore, in some cases, each vehicle may be configured to send a GNA even if not solicited. In that case, the destination IP address (and potentially the destination L2 address) may be set to a multicast address as described above.

Thus, in accordance with various embodiments described above, a new ND message, for instance a GNS and/or GNA, can be used to perform optimized neighbor discovery, for instance group member discovery. The ND message may be a new message or a modification of an existing ND message. The GND message may contain a list of GIDs for which group member discovery is being done. A given GNA may be sent in response to a solicitation message (GNS) or may be sent unsolicited. The GNA may include the list of GIDs that the sending vehicle is a member of Recipients of the GNA messages use may the list of GIDs to update an availability table or information that indicates whether the sender is reachable or not. The update may also contain the L2 address of the vehicle.

Turning now to access technology info in ND Messages, as described above, ND messages (e.g., NS and NA) may be used to determine whether a device's L2 address with which communication was established has changed. As such, the ND message may be sent over a specific access technology, such as 802.11 for example, because an objective is to know the L2 address associated with that access technology. As described above, however, a device (vehicle) may be capable of communicating with at least two access technologies, such as 802.11 and cellular for example. By way of example, a vehicle may use 802.11 technology to communicate with a D2D-RSU or another (target) vehicle, without knowing that the D2D-RSU or the target vehicle supports cellular communication. Embodiments now described include information about the support of other access technologies in ND messages (e.g., NS, NA, RS, RA) and GND messages described above. In the examples now described, unless otherwise specified, ND message may be used to refer to any of the above ND messages or GND messages, or any other existing ND messages. For example, when a vehicle or device sends an ND message (e.g. RS) the vehicle may include a list of other supported access technologies and its L2 address per technology. The message may also include an IP address associated to that interface, if any. The message may include various other parameters such as, for example, a GID (as defined earlier) that may be associated with an access technology (if any). These parameters may be referred to generally as access technology info, though it will be understood that the parameters mentioned above are examples, and thus access technology info is not limited to those parameters.

For simplicity, in the following examples, a device or apparatus may, unless otherwise specified refer to a vehicle or a (D2D-)RSU that may receive an ND message with access technology info. The device may verify a received ND message for any access technology info. If the ND messages contains access technology info, the device may verify or determine the specific access technology type that is supported by the sender. For each type, if the device supports the same technology, for example, the device may also include access technology info in the response message.

In some cases, a device may be configured to always include the access technology info, or the user may interact with the device (e.g., via a GUI) to trigger or enable the inclusion of this information in ND messages. Moreover, when a device receives an ND message with access technology info, the device may update the context or information of the neighbor (sender) with that information. For example, for each neighbor, the device may maintain a context referred to herein as access technology support, which may contain the access technology info which is included and received in ND messages.

In some examples, a device that sends an ND message that is a solicitation (e.g., a RS) with access technology info, may expect a response to the solicitation message (e.g., a RA) on the same access technology in which the ND message was transmitted, or on any of the other supported access technologies (as per the access technology info that was included by the sending device in the ND message). In some cases, the device may also receive the response on more than one access technology. In another example, the sending device may alternatively indicate its preference of access technology on which the response should be sent if the receiver supports that access technology. To ensure correspondence between a solicitation on one access and a potential response on another, the device may include a random token or number in the solicitation message. The receiver may echo the same token or number in the response that may be sent on a different access technology. In some examples, the token or number can also be included even if the response is sent over the same access technology with which the solicitation was received.

Figure 15:
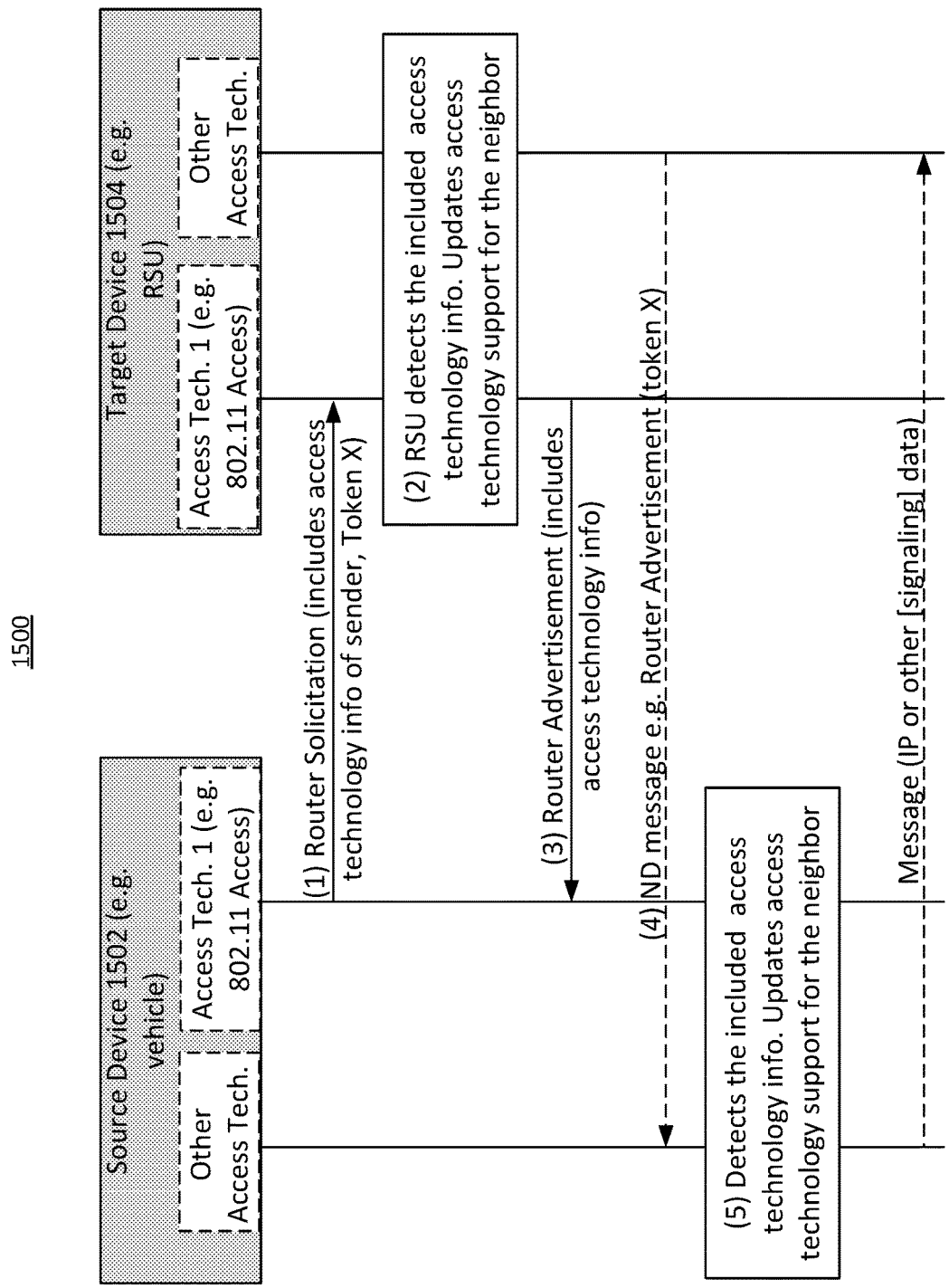
FIG. 15 is a call flow for discovering support of access technologies in accordance with an example embodiment.

Similarly, in various examples, a device may be configured with policies to always send a response message over the same access technology on which the solicitation was received, or to use an access technology explicitly by the sender, or to send a response message over all the access technologies that are supported by both parties, or to send a response based on a defined priority of the supported access technologies. FIG. 15 shows an example for informing and/or discovering the support of other access technologies using ND messages.

Referring now to FIG. 15, an example system 1500 is depicted that includes a source device or vehicle 1502 and a target device or vehicle 1504. It will be appreciated that the example system 1500 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 15, and all such embodiments are contemplated as within the scope of the present disclosure.

In accordance with the illustrated example, at 1, the source device 1502 is triggered to send a ND message (e.g., RS) with access technology info. The message may also include a random number or token (Token X). The message may also include indications as to whether a response should also be sent on this same access technology and any other access technology that is supported by the receiving node (target vehicle 1504).

At 2, the target device 1504, which is depicted as a vehicle but alternatively may be an RSU or other apparatus, receives a ND and detects the inclusion of access technology info. The device 1504 updates the supported access technologies for the sender or neighbor (source device 1504) from which the access technology info is received. The device 1504 verifies and determines which access technologies are supported in both nodes (device 1502 and device 1504). The device 1504 determines how the response should be sent. For example, the device 1504 determines the access technology that should be used to send the response.

Still referring to FIG. 15, in accordance with the illustrated example, at 3, the target device 1504 sends a response (e.g., RA) over the 802.11 access on which it received the solicitation. The message includes access technology info related to the target device 1504. The message also includes the same token or random number that was received in at 1 (Token X). At 4, based on local policies at the target device 1504, a response may also be sent over another access technology (e.g., cellular link) using the IP address and/or L2 address of the source device 1502 that was retrieved from the ND message (e.g., RS) at 1 and 2. The message may also include the same token that was previously received from this neighbor (Token X). At 5, in accordance with the illustrated example, the source device 1502 receives the response message (e.g., a RA) with access technology info. The device 1502 detects the included access technology info and uses it to update the sender's information, in particular the supported access technologies at the neighbor (target device 1504). As described above, the response may be received over multiple access technologies. The device 1502 may match the token in the ND message with that token that was sent in the previous ND message at 1. The device 1502 may then associate the response to the previous solicitation. The device 1502 may then take one or more of actions described with reference to FIG. 9A at 4. For example, the device 1502 may save the information and optionally use it for RSU selection in an optional indicated location and for a given time before this information may be refreshed again. The device 1502 may start a timer to guard the validity of this information, where the timer value is set to a predefined value or is received in the advertisement message. The device 1502 may optionally display the RSU info on the screen of the device 1502 such that, for example, a passenger may select an RSU. At 6, in accordance with the illustrated example, the device 1502 may use the received access technology info, or the updated supported access technology info of the neighbor in question (target device 1504), to establish a communication or send a message over the other accesses that are commonly supported. It will be understood that the above-described example can be performed when the device 1504 sends an ND message (e.g., RA) that is not solicited.

As mentioned above, in accordance with various embodiments, additional information can be added in ND messages. By way of example, additional info may include, but is not limited to, speed, location, direction of travel, average speed over a period, relay capability, etc. The information received by a node can be used to fine tune the frequency of transmission of ND messages. For example, an RSU may receive RS messages from several vehicles with additional info. The RSU may then use the vehicle speeds to determine its frequency of sending RA messages. For example, if the average speed of all the vehicles is high, the RSU may send RA message with a higher frequency. On the other hand, if most of the cars are travelling on a low speed, it can reduce the frequency of RAs. The embodiments now described are not limited to an RSU, and thus may also apply to two or more vehicles that send ND messages. For examples, vehicles may fine tune their frequency of transmission of ND to determine the reachability of one another.

In some cases, a vehicle may be configured with policies that define when additional info should be included. For example, policies may indicate that a given vehicle should always include the additional information, that the vehicle should include particular additional information when the speed exceeds a certain threshold, or that the vehicle should include the information when the user explicitly indicates this via a GUI, that the vehicle should include the information when a ND message is received with this information and the device is responding to the neighbor from which the message with additional info was received, etc. Alternatively, a device may include additional information based on its location or area. By way of example, when driving in certain areas, a vehicle may be instructed (via policy for example) to send additional info in ND messages. Alternatively, a device may still include information because it is part a particular group. In some cases, a network node may configure a device with additional information and policies.

Figure 16:
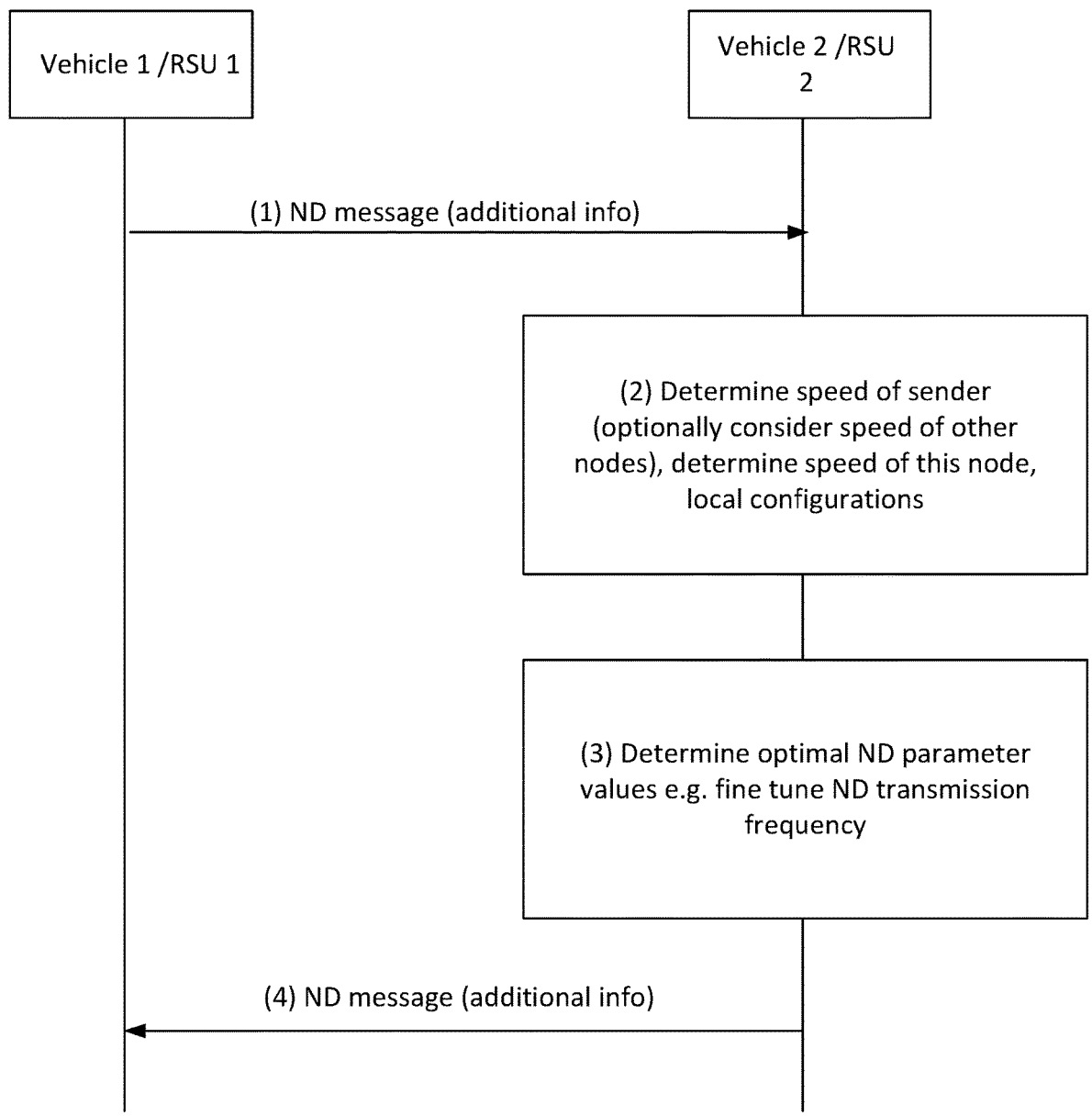
FIG. 16 is a call flow in which ND operations are enhanced using additional information in accordance with an example embodiment.

Referring now to FIG. 16, an example system 1600 is depicted that includes a first or source vehicle 1, which may alternatively be an RSU 1, and a second or target vehicle 2, which may alternatively be an RSU 2. It will be appreciated that the example system 1600 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 16, and all such embodiments are contemplated as within the scope of the present disclosure.

At 1, in accordance with the illustrated example, the source vehicle 1 is triggered to send a ND message. Based on its local configurations or policies, the source device includes additional info in the ND message (e.g., an RS). At 2, the target, which may be the RSU 2, receives the ND message and determines that additional info is included. For example, the RSU 2 may verify the speed of the sender (vehicle 1). At 3, the RSU 2 takes into account the most up to date information (e.g., additional info) received from the devices (or a subset of devices based on its local policies) and may determine an update set of parameter values to use when sending ND messages. For example, the RSU 2 may determine to increase the frequency of ND messages because most of the cars under its coverage are driving at a high speed. At 4, the RSU 2 sends a ND message using the determined parameter values at 3. As mentioned above, this message may also be sent from another vehicle. Whether the message is sent from an RSU or vehicle, the target device may also include additional info in the ND messages that it sends out.

The various example parameters described above can also, in some cases, be part of the RSU Info that was described earlier. Further, the exchange of RSU Info may be applicable to V2V, and thus is not limited to interactions between a vehicle and an RSU.

Turning now to service discovery for vehicular communications, currently WAVE enables the transmission (e.g., by an RSU) of a WSA to advertise services and provide channel information (e.g., IP address, etc) such that a requesting node (e.g., vehicle) that can tune in to receive a service or data for that service. It is recognized herein, however, that a vehicle might not be able to discover the services in an area that has multiple RSUs until it performs service discovery under the coverage of each RSU. It is further recognized herein that vehicles may need to discovery services that are available across multiple RSUs. Further still, it is recognized herein that vehicles may benefit from being able to exchange service information with each other. It is also recognized herein that current tracking mechanisms lack efficiencies and capabilities. For example, to enable an example carpooling use case to work efficiently indoors, the passenger and vehicle might need to be tracked without using GPS or cellular connections, which may be unreliable in certain scenarios.

Embodiments related to service discovery are now described. As used herein, service discovery may refer to, for example and without limitation, a set of services supported by an individual RSU, the services provided by a set of RSUs, the services supported in a vehicle, the services supported in an area, a type of IP connection (e.g., local vs Internet), a type of service (e.g., local service or Internet service), etc. As used herein, unless otherwise specified, Service Info may refer to any of the service discovery examples mentioned above. Further, Service Info may include any of the previously defined parameters or information, such as, for example and without limitation, RSU Info, additional info, access technology info, etc.

In some cases, embodiments described above with reference to RSU discovery may also apply to service discovery. For example, the above-described RSU Info may contain Service Info, or the RSU Info described above may be replaced by Service Info. Therefore, upon discovery of the services, a vehicle may save and display the services per RSU or per area or per vehicle. Further, a user may select an RSU or vehicle to communicate with based on the supported services. As such, the methods described above may also apply to service discovery. Further still, the neighbor discovery optimizations described above may also apply to service discovery. That is, the parameters described relative to neighbor discovery may be augmented to include Service Info, or can be replaced by Service Info. In an example, Service Info can also contain channel information that indicates the 802.11 channel on which the service will be provided.

Figure 17:
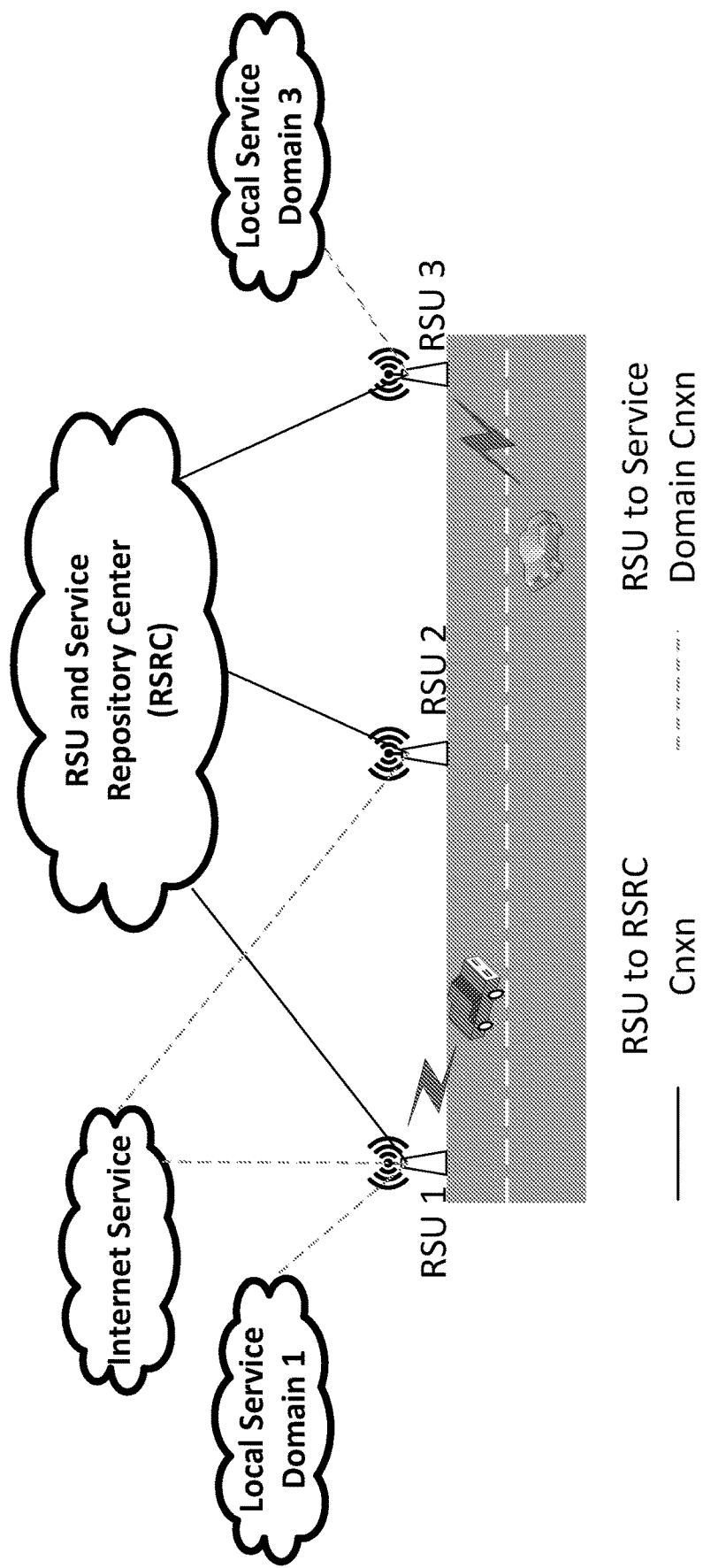
FIG. 17 depicts an example architecture in which a service repository is in communication with one or more RSUs in accordance with an example embodiment.

Referring now to FIG. 17, an example system includes an RSU and Service Repository Center (RSRC). In an example, the RSRC may be a server that may be close to the edge of the network. The RSRC may contain information about the RSUs and services that are available in a certain area. Thus, the RSRC may contain RSU Info, Service Info, and access technology info per RSU, etc, as described above. As shown in FIG. 17, the RSRC may connect to one or more other RSUs, for instance RSU 1, RSU 2, and RSU 3. Thus, each RSU may connect to the RSRC. This connection may be wired. In some cases, the protocol used between the RSU and the RSRC may be IP-based, or may be other lower or higher layer protocols. As shown in FIG. 17, each RSU may support services that are specific to it, or services that are provided by other RSUs. These services may be local or on the Internet. In an example embodiment, as a vehicles drive by and discovers RSUs, the vehicle can also discover the services that are offered by these RSUs. By way of example, a passenger that requires Internet access will desire to connect to an RSU that actually provides Internet access, and the passenger can discover an RSU that provides Internet access in accordance with various embodiments described below.

In some cases, the RSRC may be local to a given area. Thus, vehicles may need to know how to reach the RSRC so that they may get or download the Service Info in that area. A vehicle may be triggered to contact the RSRC periodically after a time period that is configured or provided to the vehicle by a network node, such as, for example, an RSU, ProSe Function, or an application server. In some examples, the vehicle may be aware that the service of an RSRC is limited to a certain area. Thus, the vehicle may track its position relative to the coverage (e.g., in terms of location of validity of service) of the RSRC. In some examples described below, when the vehicle moves to a new location in which a previous RSRC does not span or cover, the vehicle may then fetch the address of the RSRC in the new area, contact it, and obtain the Service Info for that area.

With respect to discovery of an RSRC IP address, in some examples, the RSRC's IP address may be included in ND messages, such as RA, NS, GNS, etc. In some cases, a node (e.g., vehicle or RSU (including D2D-RSU) may include a new field, without being solicited, that is defined to carry the IP address of the RSRC. In other cases, a vehicle may solicit a neighbor (e.g., another vehicle, or RSU) to provide this information (if available) by also including a new field whose value indicates a request for an RSRC IP address in that area. Note that the proposal applies to any ND message that exists or defined in this document. It will be understood that the above examples may apply to any vehicle that is communicating with any other vehicle or RSU, and also for RSU to RSU communications.

Furthermore, example PC5 messages can include a request for an RSRC address (in PC5 solicitation messages or PC5 advertisement messages described above). The above-described parameters and methods (e.g., RSU Info, Service Info, additional info, etc) can be augmented to include the RSRC's IP address. Moreover, the IP address of an RSRC may be associated with a given indicated location area. As such, in some cases, each RSRC IP address may correspond to an area that is served by the RSRC in question. For example, vehicles can exchange a history of discovered RSRC IP addresses per area. Then, the vehicles may use a particular RSRC IP address depending on the area they are in, and therefore, when moving to a new area that is not covered by the current RSRC, the vehicle may use the IP address associated with the RSRC in the new area and communicate with it for service discovery.

In some cases, the RSUs may be configured with the RSRC address. In an example, the RSUs that connect to an RSRC may register with the RSRC and include their RSU Info, Service Info, etc. The RSUs may periodically register their services with the RSRC.

Figure 18:
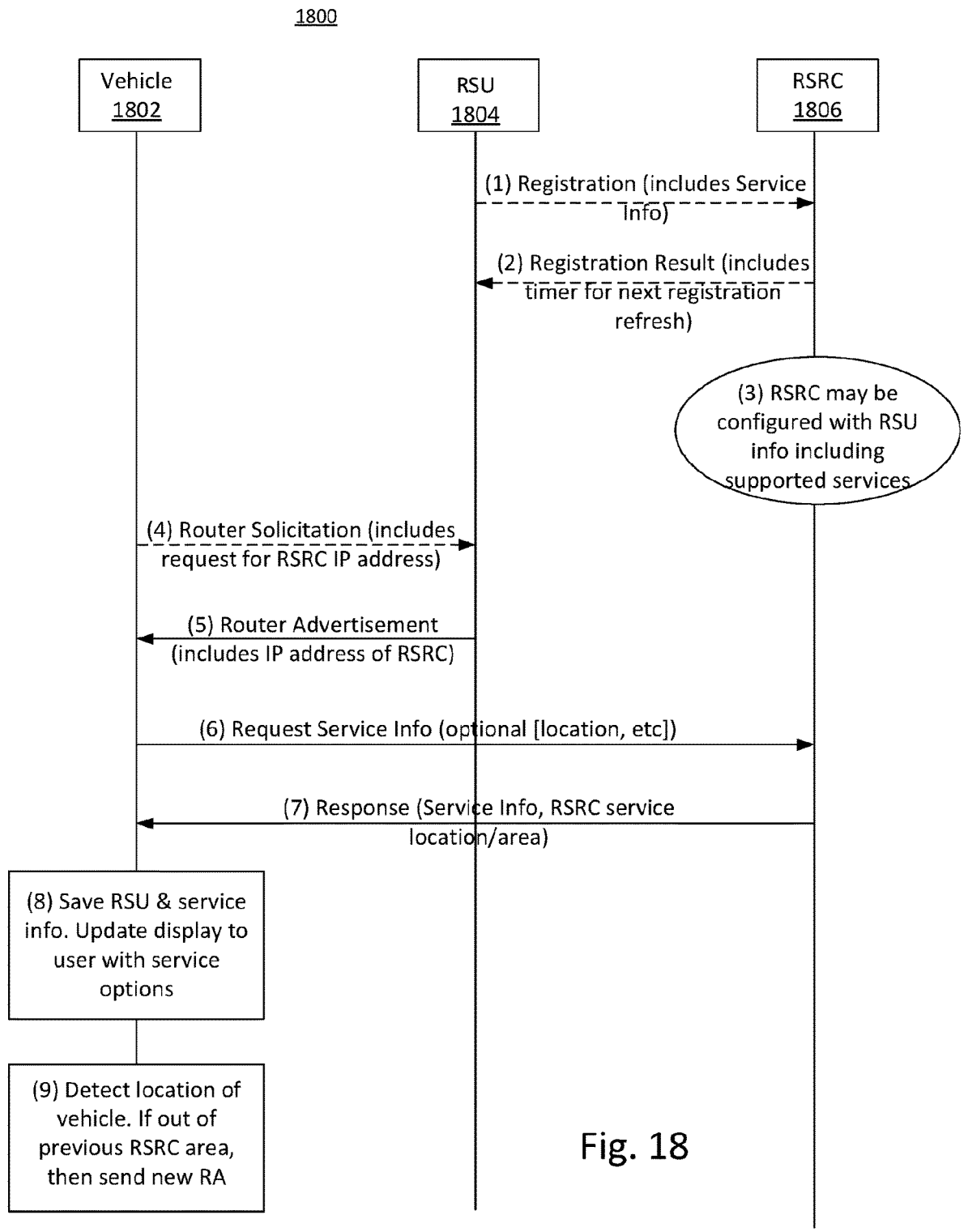
FIG. 18 is a call flow in which a services are discovered using the service repository in accordance with an example embodiment.

A vehicle may discover the RSRC's IP address from ND or PC5 messages that are sent by RSUs, or obtained from any other vehicle (e.g., via ND messages). The vehicle may then contact the RSRC and request Service Info for a given set of areas. The RSRC may then forward the Service Info in the requested areas. The vehicle may then use the Service Info for RSU and service selection as described above. FIG. 18 shows an example for RSU registration and for a vehicle's discovery of an RSRC address. FIG. 18 further shows an example of how a vehicle may obtain Service Info from the RSRC.

FIG. 18 depicts an example system 1800 that includes a vehicle 1802, an RSU 1804, and an RSRC 1806. It will be appreciated that the example system 1800 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 18, and all such embodiments are contemplated as within the scope of the present disclosure.

Referring to FIG. 18, at 1, in accordance with the illustrated example, the RSU 1804 may be configured with an address of the RSRC 1806, and the RSU 1804 may be configured to register with the RSRC 1806. The RSU 1804 may send a registration message to the RSRC 1806 and includes its Service Info in the registration message. This information may also include the location of the RSU 1806. At 2, the RSRC 1806 processes the registration request of the RSU 1804. The RSRC 1806 may save the Service Info as part of the RSU context. The RSRC 1806 may allocate a periodic registration or refresh timer, and send a response message to the RSU 1804. The response message may include the status of the registration (e.g., "accept", "reject", etc) and include a timer that guards the period of the next registration that should be done by the RSU 1804. The RSU 1804 receives the response, processes the status of the registration, and may start a timer, the expiry of which may trigger another registration. In some cases, the RSRC 1806 may also provide a registration ID to point to the RSU context. The RSU 1804 may include this identity in subsequent registrations with the RSRC 1806. The response at 2 may also include information concerning how to connect to particular services, or an indication that the RSU 1804 can access certain services (e.g., Internet access). At 3, the RSRC 1806 may be configured with the Service Info and location information of the RSUs in a given area. In some cases, this information may be configured locally at the RSRC 1806, by a user for example.

Still referring to FIG. 18, at 4, the vehicle 1802 sends an ND message (e.g., RS) to the RSU 1804, and includes a request for an RSRC address as described above. At 5, if the RSU 1804 has or is configured with the RSRC address, the RSU responds or sends a ND message with the RSRC IP address as a new field in existing or new ND messages. At 6, in accordance with the illustrated example, using the obtained RSRC IP address, the vehicle 1802 contacts the RSRC 1806 and requests the Service Info, optionally for a given area list. At 7, the RSRC 1806 maps the requested area to its local RSU map, and retrieves the Service Info that is valid for the requested area. The RSRC 1806 may respond to the vehicle 1802 and may provide the Service Info. In addition, the RSRC 1806 may provide the location or boundaries that the RSRC 1806 is responsible for. In an example, this defines the location for which the RSRC 1806 has Service Info and beyond which another RSRC becomes the serving RSRC. At 8, the vehicles 1802 may save and use the Service Info as described above. At 9, in accordance with the illustrated example, the vehicle 1802 monitors its location and verifies against the receiving location/area that the RSRC 1806 is serving. If the vehicle 1802 moves out of this area, for example, the vehicle 1802 may request the RSRC address again as described above with reference to operation 4. Alternatively, or additionally, the vehicle 1802 may request, for instance always request, the RSRC address or identification when it sends ND messages.

In some cases, in addition to the IP address of the RSRC, RSUs may also include or advertise an "RSRC ID" in the ND messages. Thus, vehicles can also get that information from the RSUs or the RSRC directly when it contacts it. The vehicle may also use the RSRC ID to verify if they have moved to a new RSRC service area. For example, if another RSU advertises a different RSRC ID, the vehicle can use the (also) included IP address to contact the RSRC given that the ID is different from the RSRC ID that it last obtained.

It will be understood that the RSRC may be a logical node that can physically be deployed in a server or other apparatus, for example. For example, an RSRC may be deployed on an(physical) RSU. From a protocol perspective, the functions are may be the same regardless of whether the IP address of an RSRC deployed on the RSU is different or the same as the IP address of a separate RSRC.

Turning now to RSU behavior for service detection and matching, a use carpooling use case is now presented by way of example. For simplicity, it will be assumed that there is a driver that can provide a carpooling service (hereafter referred to as service provider or provider) and a passenger who wants to use a carpooling service (hereafter referred to as a service requester or requester). In an embodiment, the RSRC to which both parties have register the type of service that they provide or request is used.

In some examples, the RSRC may match a service provider with a service requester based on one or more criteria, such as, for example and without limitation, a destination, a number of requesters available, a number of available spaces with a service provider, and any other criteria that may be defined. These criteria may be collectively referred to as service criteria.

Based on the service criteria (from providers and requesters), the RSRC may perform a match and allocate a service ID. In some cases, the RSRC may allocate a pair of service IDs, where one of the entries is for the provider and the other is for the requester. In the examples presented below, one service ID is allocated and provided to both parties, though it will be understood that the example embodiments may alternatively include different ID allocations for each of the provider and requester. Once allocated, the RSRC may determine the list of RSUs that are along the path of the provider and/or the requester. In an example, the provider is a driver who will be mobile via the vehicle. In this example, the vehicle may be assumed to be the provider, and thus a vehicle may be used to refer to a provider.

In some cases, the RSRC contacts the list of RSUs in the path of the vehicle, where the current vehicle location may be considered the starting point and the location of the requester (hereafter referred to as the pedestrian for purposes of example and simplicity) may be the destination, for example, because the carpooling service involves meeting at a given place prior for the carpool to occur. The RSRC may provide the service ID to the RSUs. The RSRC may further provide the IP and/or L2 address of the vehicle and the pedestrian. The RSRC may request the RSUs to report back a detection of the service ID if advertised by the vehicle and/or the pedestrian. The RSRC may also indicate if the RSU should solicit a response for a neighbor with that service ID. Thus, the RSU may solicit the presence of the vehicle or the pedestrian. If the RSU should solicit a response, the RSRC may also provide the time at which period solicitation should be performed or sent by the RSU. The RSRC may also indicate whether or not to use PC5 and/or ND messages. The RSRC may also provide specific values to use for destination L2 address of the target, or the target IP address, etc. In an example below, an ND message is used, though it will be understood that alternative messaging, such as PC5 messages may be used as desired.

In some examples, the RSRC also contacts the vehicle and the pedestrian, provides the service ID, and indicates that the service ID should be included in ND messages. The RSRC may provide the periodicity with which a ND message with the service ID should be sent, optionally for a given area.

Figure 19:
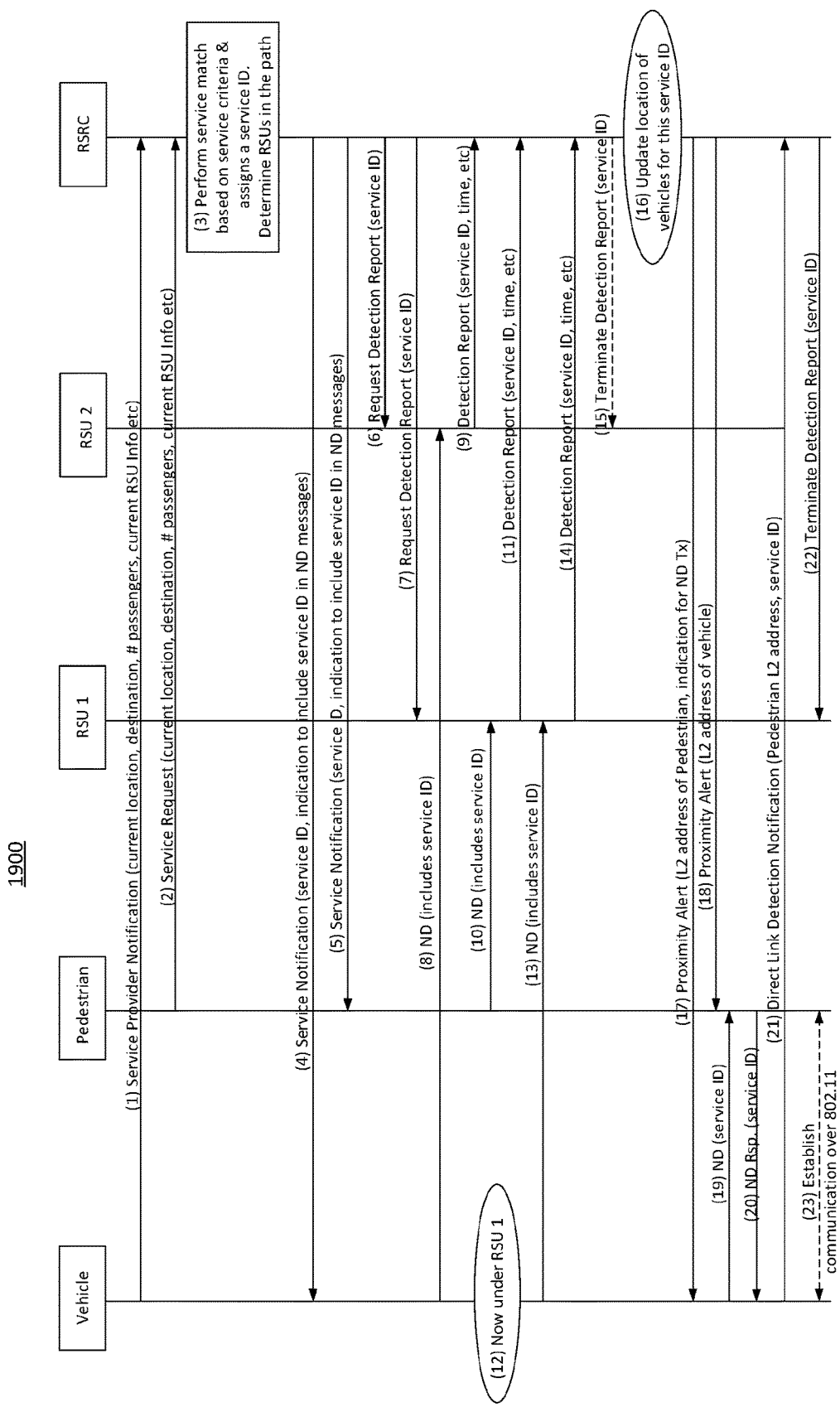
FIG. 19 is a call flow for service matching in accordance with an example embodiment.

In some cases, as the vehicle (and/or pedestrian) moves, the vehicle sends a ND message (new, or modified) that contains the service ID received from the RSRC. If an RSU detects a given service ID for which the RSRC has requested a detection report, the RSU may send a report to the RSRC and include the service ID, the L2 address of the vehicle (or pedestrian, or in general neighbor), the sender's IP address, time of detection, etc. The process may continue until the RSRC tracks the positions, such that both vehicle and pedestrian are under the same RSU. Then, the RSRC may inform the vehicle and pedestrian to start sending ND message in a unicast manner until they detect and find each other. In some examples, once this happens, one or both of the vehicle and the pedestrian may send a report to the RSRC concerning the detection. In an example, the RSRC may then contact the RSUs involved and indicate an end to the previous monitoring and detection reporting. The RSRC may include the service ID for which the detection should be terminated. The RSUs may delete the indicated service ID. The RSRC may update the service context to reflect the get-together between the vehicle and pedestrian. FIG. 19 shows an example of service matching described above.

Referring to FIG. 19, an example system 1900 is depicted that includes a vehicle, a pedestrian, a first RSU 1, a second RSU 2, and an RSRC. It will be appreciated that the example system 1900 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 19, and all such embodiments are contemplated as within the scope of the present disclosure.

At 1, in accordance with the illustrated example, the vehicle sends a service provider notification to the RSRC indicating that it can be a service provider. The vehicle also indicates its service criteria (e.g., destination, number of passengers, etc.). The vehicle may also include information about the RSU with which it is connected, and a current location of the vehicle. At 2, the pedestrian sends a service request to the RSRC indicating that it requires a service. The pedestrian may also indicate its service criteria (e.g., destination, number of passengers, etc.). The pedestrian may also include information concerning the RSU with which it is connected, and a current location of the pedestrian. At 3, the RSRC analyzes the messages from the vehicle and pedestrian and analyzes the service criteria. The RSRC may further perform service matching based on the service criteria. The RSRC may also allocate a service ID and/or determine the RSUs in the path of the vehicle. In the accordance with the illustrated example, there are two RSUs (RSU 1 and RSU 2) in the path, though it will be understood that any number of RSUs may be in the path of the vehicle. At 4, in accordance with the illustrated embodiment, the RSRC responds to the vehicle, provides the service ID, and indicates that the vehicle should send ND messages with the service ID. The RSRC may also provide various parameters (e.g., transmission periodicity, etc.) for sending the ND message and/or the triggers to do so (e.g., based on location).

Still referring to FIG. 19, in accordance with the illustrated example, at 5, the RSRC responds to the pedestrian, provides the service ID, and indicates that the pedestrian should send ND messages with the service ID. The RSRC may also provide the parameters (e.g., transmission periodicity, etc.) for sending the ND message and/or the triggers to do so (e.g., based on location). At 6, in accordance with the illustrated example, the RSRC sends a request to the RSU 2 in the path and includes a service ID for which a detection would trigger a report to the RSRC. The RSRC may also indicate if a solicitation message for this service ID should be sent by the RSU 2. In some cases, if it should, the RSRC provides the transmission parameters, periodicity, etc. Although not shown in the figure, the RSU 2 may acknowledge the request. The RSRC may also request the detection and report of a service ID coming from a particular L2 address, where the L2 address may be that of the vehicle or the pedestrian or both. At 7, The RSRC sends a request to the RSU 1 in the path and includes a service ID for which a detection would trigger a report to the RSRC. The RSRC may also indicate if a solicitation message for this service ID should be sent by the RSU 1. If it should, the RSRC may provide the transmission parameters, periodicity, etc. Although not shown in the figure, the RSU 1 may acknowledge the request. The RSRC may also request the detection and report of service ID coming from a particular L2 address, where the L2 address may be that of the vehicle or the pedestrian or both.

At 8, in accordance with the illustrated example, the vehicle starts transmitting ND messages and includes the service ID. It uses the configurations received from the RSRC, or local configurations, to set the L2 addresses, IP addresses, etc, accordingly. For example, the ND may be sent unicast to the RSU using a the configured L2 address of the RSU. At 9, the RSU 2 may detect a service ID in a ND message for which it is configured to send a report to the RSRC. In some cases, this may also be done if the L2 address matches the previously received L2 address corresponding to the service ID. In an example, the RSU sends a report to the RSRC and includes the service ID that is detected. The RSU may also include the sender's L2 address, IP address, time of detection, location, RSU Info, etc. At 10, in accordance with the illustrated example, the pedestrian starts transmitting ND messages, and includes the service ID. It may use the configurations received from the RSRC, or local configurations, to set the L2 addresses, IP addresses, etc, accordingly. For example, the ND may be sent unicast to the RSU using a the configured L2 address of the RSU. At 11, the RSU 1 detects a service ID in a ND message for which it is configured to send a report to the RSRC. In some examples, this may also be done if the L2 address matches the previously received L2 address corresponding to the service ID. The RSU may send a report to the RSRC and may include the service ID that is detected. The RSU may also include the sender's L2 address, IP address, time of detection, location, RSU Info, etc. At 12, in accordance with the illustrated example, the vehicle moves under the coverage of a new RSU, for instance from RSU 2 to RSU 1.

Still referring to FIG. 19, in accordance with the illustrated example, at 13, the vehicle starts transmitting ND messages and includes the service ID. It uses the configurations received from the RSRC, or local configurations, to set the L2 addresses, IP addresses, etc, accordingly. For example, the ND may be sent unicast to the RSU using a the configured L2 address of the RSU. At 14, the RSU 1 detects a service ID in a ND message for which it is configured to send a report to the RSRC. This may also be done if the L2 address matches the previously received L2 address corresponding to the service ID. In an example, the RSU sends a report to the RSRC and includes the service ID that is detected. The RSU may also include the sender's L2 address, IP address, time of detection, location, RSU Info, etc. At 15, in accordance with the illustrated example, neither the vehicle nor the pedestrian are in the coverage of the RSU 2, so the RSRC may request the RSU to stop monitoring and reporting of the previously provided service ID and any corresponding L2 address(es). At 16, the RSRC updates the service context to reflect the new location of the vehicle and pedestrian. In particular, the RSRC may update the service context to indicate that the vehicle and pedestrian are now under the coverage of RSU 1. At 17, the RSRC sends a proximity alert notification to the vehicle to inform it that the vehicle and the pedestrian are in proximity of each other. The RSRC may also provide the target (e.g., pedestrian) device's L2 address, IP address, etc. The RSRC may inform the vehicle to start sending ND message with the service ID, optionally sent to the unicast L2 and/or IP address of the pedestrian.

In accordance with the illustrated example, at 18, the RSRC sends a proximity alert notification to the pedestrian to inform it that the vehicle and the pedestrian are in proximity of each other. The RSRC may also provide the target (e.g., vehicle) device's L2 address, IP address, etc. The RSRC may inform the pedestrian to start sending ND message with the service ID, optionally sent to the unicast L2 and/or IP address of the vehicle. At 19, the vehicle sends a ND message (e.g., NS) and includes the service ID. The vehicle may send the ND message to the pedestrian's unicast L2 and/or IP address as indicated by the RSRC. In some cases, the ND message may include the vehicle's location information. At 20, the pedestrian detects the service ID in the ND message and responds by sending a ND message (NA). The pedestrian may include the service ID in the response message. Further, the ND message may also include the pedestrian's location information.

At 21, in accordance with the illustrated example, after the vehicle detects or receives the ND message (response) from the pedestrian, the vehicle sends a report to the RSRC to indicate that the vehicle is in direct range of the pedestrian. In some cases, the vehicle may be configured to periodically send the ND message, get a response, and verify proximity within a predefined range (e.g., 2 meters). The range may vary as desired, such that the vehicle can conclude that it is physically with the pedestrian. The operations at 19 and 20 may also be performed by the pedestrian and the vehicle, respectively. The RSRC may inform the parties about which node should solicit the other. In the illustrated example, the vehicle sends the solicitation, computes the distance between the two parties, and sends a report to the RSRC when the distance is below a certain threshold. In some cases, the pedestrian may also do the same. At 22, when the vehicle has confirmed direct communication with the pedestrian, the RSRC may request that the RSU to stop monitoring and reporting of the previously provided service ID and any corresponding L2 address(es). At 23, the vehicle and the pedestrian may engage in direct communication.

In an alternative example to informing the vehicle and pedestrian that they are in proximity of each other, the RSU may send a notification after it receives ND messages from the vehicle and the pedestrian. For example, the RSRC may send a message to the RSU 1 after the vehicle and the pedestrian become under its coverage (e.g., after operation 14 or 16 in the illustrated example). This message may indicate to the RSU (RSU 1) that it should send a notification to one or more devices (e.g., the vehicle and the pedestrian) when it receives ND messages from them, optionally with a given service ID, L2 address, IP address, etc. Thus, when the RSU receives a ND message from the vehicle, and separately from the pedestrian, with parameters or addresses as indicated by the RSRC, the RSU may then send a notification to the vehicle and the pedestrian. The indication may indicate that the peer (pedestrian or vehicle) is in proximity. A ND message (e.g., a new or modified ND message) can include the destination address of the peer, the location of the peer, IP address, etc. For example, if the message is sent to the vehicle, the destination address of the pedestrian may be indicated. By way of further example, if the message is sent to the pedestrian, the destination address of the vehicle may be indicated. This information may be included by the device (vehicle and pedestrian) in the ND messages that are sent.

Although the above examples of service discovery and matching use new or modified ND messages, it will be understood that embodiments may also be realized using other message, for instance WAVE messages. For example, a WSA can be used instead of ND messages. The behavior of the RSU, the vehicle, and the pedestrian will still be the same as described above, however, instead of ND messages, WAVE WSA messages can be used instead of advertisement messages in ND protocol. Also, new or modified WAVE solicitation messages can be defined to correspond to any solicitation message that was presented or used above.

For example, an RSU can advertise or include the IP address (and optionally an RSRC ID) of the RSRC in the WSA messages. A vehicle may receive a WSA message that includes the IP address (and optionally an RSRC ID) of the RSRC. The vehicle may then use the IP address to contact the RSRC and obtain RSU Info, Service Info, or a combination thereof.

In some cases, an RSU may also advertise in the WSA its capabilities for other access technologies that it may support. For example, a WSA may indicate in WSA messages that it supports cellular access (and optionally D2D communication). The RSU may also include the L2 address for the cellular interface, the IP address associated to it, and whether or not it can support a relay capability. A vehicle may receive a WSA with additional information about the support of other access technologies or about the support of a relay capability. The vehicle may then use the information to communicate with the RSU. For example, the vehicle may use an included L2 address to communicate with the RSU using the associated access technology (e.g., cellular access).

In some examples, an RSU may advertise a service related to discovery of Service Info. The advertisement and the associated information (e.g., WAVE channel, IP address to use to get this service, etc) may be included in the WSA message. The vehicle may receive a WSA message that advertises the availability of Service Info discovery service. The vehicle may then tune to the indicated WAVE channel, and/or the vehicle may then use the associated IP address to communicate with the RSU to get Service Info that it can use as described earlier herein.

It will be understood that the messages described above may be sent whether or not they are solicited by a requesting node (e.g., a vehicle). In some cases, existing or new solicitation messages over WAVE are used to solicit the advertisement of the messages described above. For example, a new WAVE solicitation message may be used by a vehicle to solicit the advertisement of RSU Info, Service Info, Additional Info, Group Neighbor Discovery, etc. The solicitation message may indicate if the response should be sent back over the control channel (CCH) or over the service channel (SCH). The message may also include the L2 address (of the solicitor) and the IP address that should be used for the response message. Similarly, the solicitation and response using WAVE solicitation and advertisement messages, respectively, can be used between vehicles to exchange RSU Info history, Service Info history, Additional Info, Access Technology Support, or any combination thereof. The solicitation messages may include information about the WAVE channel, L2 address and/or IP address to use when a target sends a response (e.g., advertisement) message. Furthermore, the solicitation and/or advertisement messages may also contain speed information, direction of driving, location information, etc. as described earlier herein. The sending and receiving nodes may take the same actions as already described above, regardless of whether the messages used are new WAVE solicitation and/or advertisement messages. It will be understood that the above-described embodiments, unless otherwise specified, may be implemented with WAVE messages, such as WSA or any new/modified WAVE solicitation messages for example. As such, the above-described parameters or information elements, such as, RSU Info, Service Info, Access Technology Info, Additional Info, or any combination thereof, can be included in WAVE messages (e.g., WSA).

Figure 7:
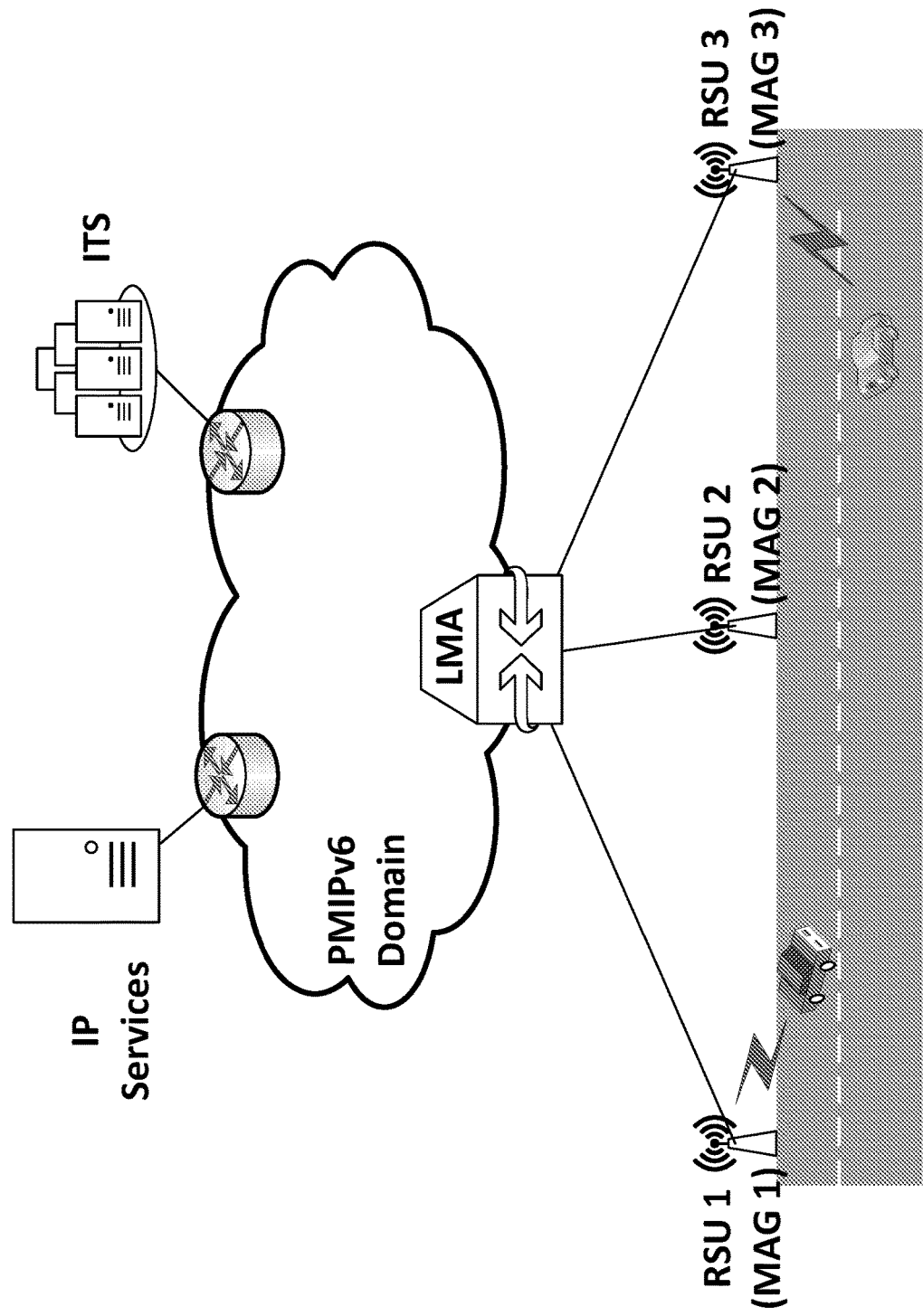
FIG. 7 depicts an example PMIP architecture.

Turning now to IP Mobility Enhancements, as described above, an existing IP session between a vehicle and an RSU (as an example) may be negatively impacted if the vehicle leaves the coverage of the RSU. As such, it is recognized herein that there is a need to make the impact as minimal as possible. In one current approach, PMIP is used, which uses MAGs (e.g., the function of the MAG may be implemented as software in the RSUs) and an LMA. FIG. 7 shows the architecture of PMIP, and the LMA is located in the PMIP domain, as shown. The LMA may be the last router in the service provider's domain. For example, the last router may refer to the router that the external networks and application service see as the entry point for data destined to devices in that network.

It is recognized herein that, when vehicles move at a relatively high speed, the time needed to establish new tunnels between a new RSU (under whose coverage a vehicle may have entered) and the LMA may not be enough, as the vehicle may have already moved again to a new RSU before the tunnel is established. Thus, existing IP sessions may drop or otherwise be negatively impacted. In an example embodiment PMIPv6 (which may also refer to PMIP generally or PMIP for IPv4, without limitation) is enhanced, such that an LMA may be visible to vehicles that were previously unaware of its presence.

In current approaches, during a handoff from one AP to another, tunnels may need to be established between the new AP (that acts as a MAG) and the LMA. When the vehicles move at high speeds, the frequency of tunnel establishment (between the new RSU/MAG and the LMA) and tunnel release (between the old RSU/MAG and the LMA) increases, the overhead increases, and packets may be dropped due to the tunnel setup delay given the high speed of the vehicle. The issue grows as coverage areas of a particular AP decreases.

In an example embodiment, a wireless LMA node (W-LMA) is capable of direct communication with the vehicles. Although different access technologies can be used, examples are described in terms cellular access for simplicity. Thus, the W-LMA may be capable of cellular communication and also D2D communication. The W-LMA can have a direct communication with the vehicles. In an example, this is at least partially enabled because the prefix is assigned by the LMA (W-LMA) and the W-LMA remains in the path of the data. Thus, a W-LMA has at least the same functions of an LMA, but also supports direct communication (e.g., PC5 based communication) with vehicles. In addition, the W-LMA can communicate directly with the vehicle to explicitly provide configuration information for switching between 802.11 and cellular communication, and it can initiate a procedure toward the MAGs (RSUs) for LMA-triggered tunnel establishment with the MAGs.

Figure 20:
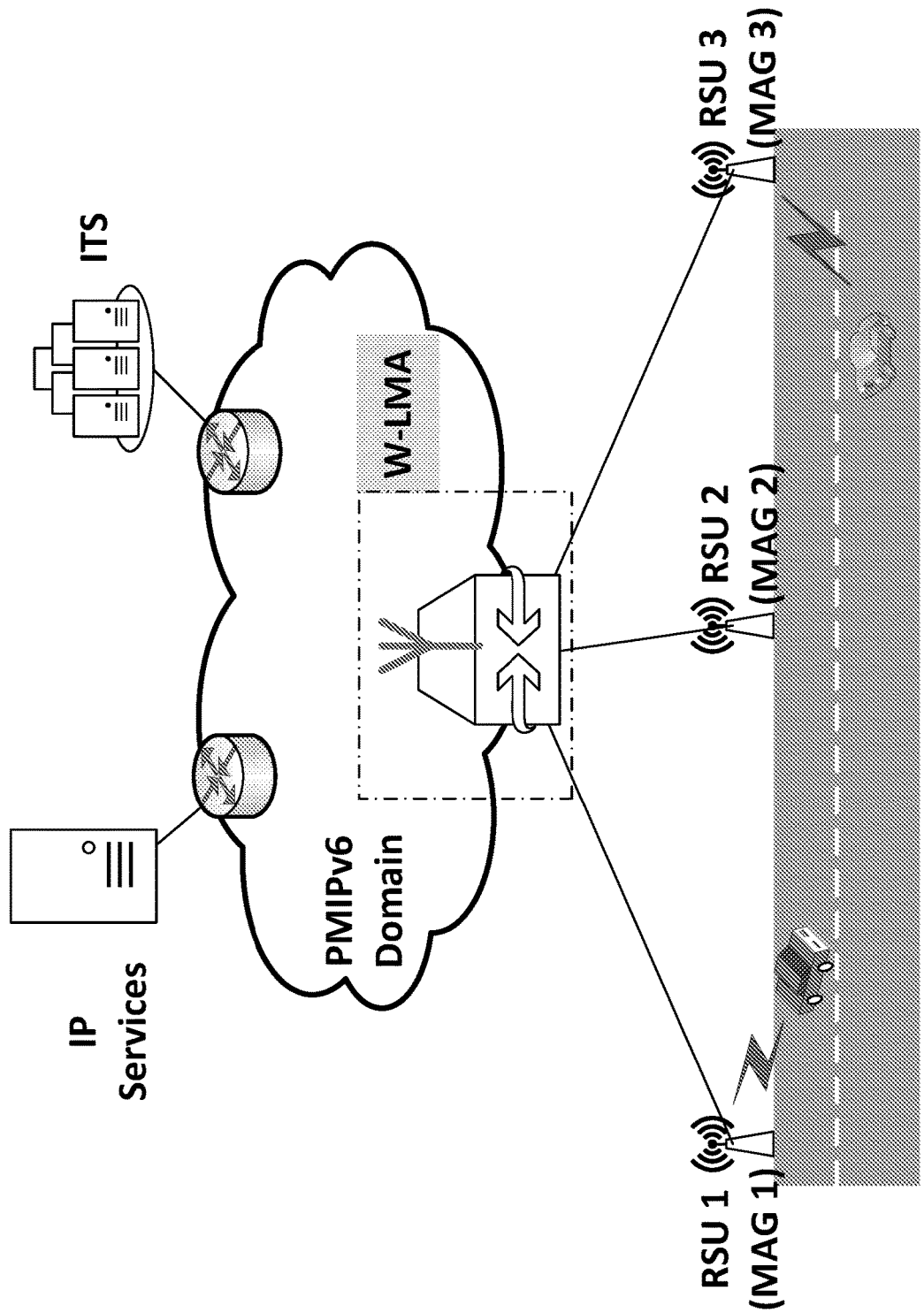
FIG. 20 depicts an example PMIP architecture that includes a Wireless local mobility anchor (W-LMA) in accordance with an example embodiment.

FIG. 20 shows an example PMIP architecture with a W-LMA, in accordance with an example embodiment. The W-LMA may trigger or provide policies to the vehicles to switch to direct communication with it (instead of the RSUs) based on several criteria. For example, the switch may be triggered for certain applications, or for certain IP flows, or when the speed exceeds a certain limit, or when the link quality with the RSU (e.g., 802.11 access) goes below a certain threshold, etc. This information may be provided or configured in the vehicle. The W-LMA may communicate this information with the vehicle using PC5 messages, or any of the previously described messages (e.g., for RSU discovery). In some cases, the RSU Info may be augmented to also contain an indication about the support of W-LMA function at an RSU. Furthermore, the configuration or policies may be transferred to the vehicle using any of the following, for example and without limitation: by the W-LMA (which can be considered a D2D-RSU) using direct PC5 messages (PC5-D, PC5-S, PC5-U) or by the ProSe Function. The switch to direct communication may also occur when the W-LMA sends an explicit PC5 message to a vehicle to do so. Similarly, configurations or policies may be provided to vehicles, using the mechanisms described above, to switch back to communication with the RSUs (or alternatively to stop direct communication with the W-LMA), or it may also be explicitly indicated by the W-LMA using PC5 messages.

In one example, the W-LMA is used temporarily during tunnel setup between a new RSU and the W-LMA, so that the service is not disrupted. After a tunnel is established between a new RSU (with which the vehicle is communicating), the vehicle can return to direct communication with the RSU and stop the direct PC5 communication with the W-LMA.

Figure 21:
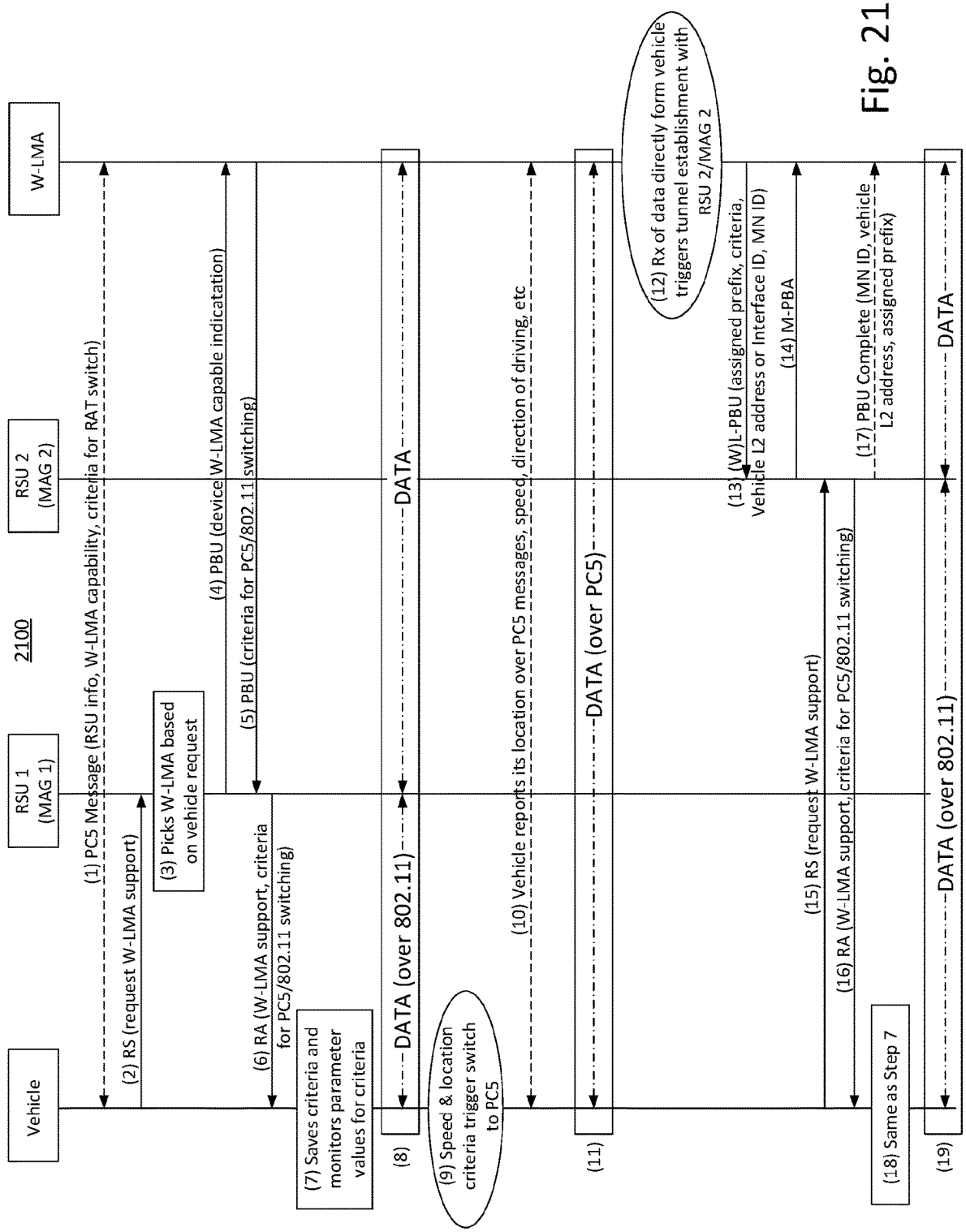
FIG. 21 is a call for PMIP operations with the W-LMA in accordance with an example embodiment.

Referring now to FIG. 21, an example system 2100 that includes a vehicle, a first RSU 1, a second RSU 2, and a W-LMA is shown. It will be appreciated that the example system 2100 is simplified to facilitate description of the disclosed subject matter and is not intended to limit the scope of this disclosure. Other devices, systems, and configurations may be used to implement the embodiments disclosed herein in addition to, or instead of, a system such as the system shown in FIG. 21, and all such embodiments are contemplated as within the scope of the present disclosure.

At 1, in accordance with the illustrated example, the vehicle uses PC5 communication (PC5-D, PC5-S, PC5-U), as described above, to discover the presence of the W-LMA. The vehicle may get the criteria, which can be referred to as switch criteria, for triggering a switch between one RAT and another. In the example, this switch is between 802.11 and PC5. Switch criteria may include criteria for switching between, and not just from one to the other, such that the switch criteria may be bi-directional switch per pair of RATs. In some cases, the PC5 message to the vehicle may also contain a list of RSU that support W-LMA operations (e.g., are connected to a W-LMA) and/or the locations where W-LMA support exists. At 2, the vehicle sends a ND message that is modified (or may be new) to indicate a request and/or the vehicle's capability for optimized W-LMA operation. The message may be a RS message, for example. At 3, the RSU 1 detects the presence of a request (or capability) for W-LMA operations from the vehicle in the ND message. Based on this, the RSU 1 selects an LMA that is capable of W-LMA operations. In some cases, the RSU 1 may be connected to a legacy LMA, but may select the W-LMA based on such request or capability indication from the vehicle. At 4, the RSU sends a PBU to the W-LMA. This message may contain various parameters such as, but not limited to, an indication about the vehicle's W-LMA capability. At 5, the W-LMA may process the PBU. The W-LMA may save in the vehicle's context that the vehicle is capable of communicating directly with the W-LMA. Based on this, the W-LMA may send the PBA and indicates the result of the request (e.g., whether L-WMA operation is allowed or not for this vehicle). The W-LMA may also include the switch criteria that should be used for switching data transmission between different RATs.

Still referring to FIG. 21, in accordance with the illustrated example, at 6, the RSU 1 sends a ND message that contains a new indication for W-LMA operation and the switch criteria. The ND message that is sent may be a response to the vehicle's solicitation, or may be an unsolicited message. At 7, the vehicle detects the availability of W-LMA operation. The vehicle may save the switch criteria and monitor the necessary parameters against the criteria. For example, one of the criterion may be the vehicle's speed. As such, the vehicle may monitor its speed against the speed threshold in the criteria. Another example criterion is location. For example, precise locations may be provided to the vehicle, and these locations may be triggers for switching, for instance when a location is at a boundary of a serving RSU's coverage area. At 8, the vehicle starts IP data exchange. The vehicle may use 802.11 for data exchange. In accordance with the illustrated example, the data path goes through RSU 1 and the W-LMA. At 9, based on the criteria and monitored parameters or conditions, the vehicle may decide to switch to a direct communication with the W-LMA. At 10, in accordance with the illustrated example, the vehicle also reports its location, direction of travel, speed, etc, using PC5 messages to the W-LMA. This may the W-LMA to select the target RSU (RSU 2/MAG 2). The W-LMA may also respond and explicitly inform the vehicle (e.g., over PC5 messages) to switch the data transmission over a direct link with the W-LMA. At 11, the vehicle may start exchanging data directly with the W-LMA based on the monitored conditions and switch criteria, or based on an explicit indication from the W-LMA.

Still referring to FIG. 21, in accordance with the illustrated example, at 12, the reception of data direction from the vehicle triggers the W-LMA to determine to establish a tunnel with the target RSU (RSU 2/MAG 2). The W-LMA may determine the target RSU based on the vehicle's location as described in operation 10. In other cases, the W-LMA may know the vehicle's location based on other mechanisms. Thus, the W-LMA selects a target RSU based, at least in part, on the vehicle's location. At 13, the W-LMA sends a new message to the RSU (RSU 2/MAG 2), for instance the (W)L-PBU (e.g., the (W-)LMA triggered PBU). The W-LMA may provide the assigned prefix for the vehicle, the vehicles interface ID, the MN ID (which the W-LMA may have), and/or the switch criteria. At 14, the RSU (RSU 2/MAG 2) acknowledges the receipt of the (W)L-PBU and saves the information that should be provided to the identified vehicle. In this example, the tunnel between RSU 2/MAG 2 is not up. Operation 15 is described above with respect to operation 2.

At 16, in accordance with the illustrated example, the RSU sends the RA with the information described in operation 6. In some cases, the RSU (RSU 2/MAG 2) does not need to execute operation 4 because the tunnel was pre-established. In another example, the RSU may perform the actions described in operation 4 and wait for a response as described with reference to operation 5. At 17, the RSU (RSU 2/MAG 2) sends a new message to inform the W-LMA that the vehicle is now associated with it, or that a connection is established with the vehicle. The W-LMA may send a PC5 message to the vehicle and explicitly indicate that a switch to a different RAT (e.g., 802.11 should be done). Alternatively, this may be done after the vehicle sends more information about its location, optionally after being solicited to do so by the W-LMA over PC5 messages, or the vehicle may be configured to send its location information to the W-LMA using PC5 message each time it associates with a new RSU. The report from the vehicle may also include its speed. In some cases, this can help the W-LMA decide whether or not the transmission of data should continue on PC5, for example, even if the UE is in coverage of the RSU. This may be, for example, based, at least in part, on the speed of the vehicle. Further, this determination may be based on whether the vehicle/user has a subscription that favors data over PC5 (optionally for some flows), for example, in order to minimize transmission delays due to handovers. Operation 18 may occur as described in operation 7. At 19, in accordance with the illustrated example, the criteria are met for switching back to data transmission over 802.11, or the vehicle received an explicit indication to do so as explained above. Thus, the vehicle may resume data exchange over 802.11. Alternatively, the W-LMA can send an explicit indication to switch back to 802.11 (although not shown in the FIG. 21). In some cases, this explicit indication can be sent by the W-LMA just after operation 14 or 17 in the example depicted in FIG. 21.

It will be understood that although the illustrated W-LMA is presented as D2D capable, the W-LMA may also be a RAN node (e.g., an eNB) or any other RAN node that uses a legacy radio interface (e.g., Uu in case of LTE) with the devices or vehicles. Thus, the W-LMA can be a RAN node that uses cellular communication that is not just limited to PC5 communications or interfaces.

Turning now to example 3GPP embodiments for RSU and service discovery, as used below, RSU info may refer to RSU Info, RSU Info and Service Info, or any combination of any of the previously defined parameters. In some examples, using PC5-D (e.g., discovery messages), a particular ProSe code can be defined to indicate that the service in question is related to RSU Info discovery. Thus, a device using Model A discovery can advertise this code to indicate that it contains RSU Info that can be provided to any entity that is interested about this information. Moreover, a solicitor or requester with Model B discovery can solicit another entity to respond and provide RSU Info using the ProSe code that indicates an RSU Info discovery service. An RSU Info IE can be defined and included in PC5-D messages. An RSU Info IE can be defined and exchanged over PC3 interface (IP-based) between the device and the ProSe Function. For example, a vehicle can connect to a ProSe Function and request the retrieval or discovery of RSU Info. The discovery request may have a value set to, as an example, "RSU Info discovery". The ProSe Function can respond and provide an RSU Info IE that contains the RSU Info, or the ProSe Function can provide a ProSe Code to a device that it can use to solicit RSU Info using Model B discovery. A D2D-RSU can also contact the ProSe Function to get the RSU Info and act as an announcing device for Model A discovery, where it uses the assigned code and optionally also includes the RSU Info in the discovery message. A device that receives a PC5-D message with a code that fully or partially matches a code for RSU Info, can then extract the RSU Info IE and consider the content as a valid RSU Info. The device may optionally first report a match and get confirmation about the validity of the announcer or the content, and also get the RSU Info from the ProSe Function if not already included in the PC5-D message. Alternatively, a PC5-D that is transmitted to inform of RSU Info discovery may, in addition to having an assigned code for that service, contain an IP address. The receiver may understand that the PC5-D message is to advertise or announce the existence of RSU Info and then the receiver uses the IP address to connect and get the actual RSU Info over IP. For PC5-D messages with RSU Info, a set of well-known frequency bands may be defined for the exchange of RSU Info, or a set of well-known radio resources blocks can be defined for this purpose.

With respect to using PC5-S (e.g., signaling messages), new PC5-S messages can be defined for discovery and retrieval of RSU Info. For example, a new RSU Info Request message may be defined to request a device or entity to provide RSU Info. The message may carry location info or a set of areas for which the information is desired. The message may also carry any of the previously proposed information. For example, a new RSU Info Response message can be defined to respond to a request for RSU Info. This message may carry RSU Info and any other information or parameters that were discussed above. A new RSU Info Notification can be used to autonomously send RSU Info to a target entity even if the information was not solicited. This message can also be used to refresh RSU Info that was previously sent to a target device or entity. The messages above may be sent unicast to a particular target after the target's L2 address has been discovered, for example, using prior communications. Alternatively, the messages above may be sent to a well-known L2 address that is reserved or defined for RSU Info exchange and discovery. The PC5-S messages listed above may also be used to exchange IP addresses, port numbers, transport protocol, etc, which can then be used to start an IP session (PC5-U) that then enables the exchange of RSU Info.

With respect to using PC5-U (e.g., IP communication), as mentioned above, a device may discover the presence of RSU Info in another device (e.g., using PC5-D messages). The message may contain an IP address that the interested entity (e.g., a vehicle) can use to establish an IP communication with the entity that has the RSU Info, which can then be sent over IP. Well known ports may also be defined for this purpose or exchanged as part of the PC5-S.

Turning now to example IETF embodiments for ND protocols, and in particular for RSU info discovery, the RSU info that is discovered may refer to various information elements, for example and without limitation, RSU Info, Service Info, Group ID, Access Technology Info, Additional Info, etc, or any combination thereof. Similarly, ND messages can be any of the existing messages in the ND protocol. In some cases, to enable exchange of RSU Info in ND messages, a new Type value can be defined to indicate that the ND message is for RSU Info solicitation or advertisement. For example, referring to FIG. 22, an example ND message is shown with a value for the Type field set to RSU Info Solicitation. Alternatively, a new ND advertisement message may be defined to respond to a solicitation for RSU Info, or to advertise RSU Info even without a solicitation. FIG. 23 shows one example of implementing this, where the Type field may contain a value set to RSU Info Advertisement, and the Length field indicates the length of the RSU Info Container IE.

In an alternative example for exchanging RSU Info, existing ND messages may be reused, and a new Options field value may be defined that may be set to "RSU Info Solicitation" or "RSU Info Advertisement" in solicitation and advertisement messages, respectively. For an example advertisement message, the RSU Info Container may follow the Options field, which in turn may be followed by a Length field to indicate the length of the RSU Info Container.

Figures 24, 25, 26:
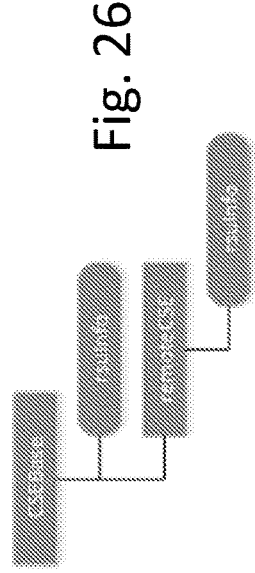
FIG. 24 depicts an example of a new ND message for group neighbor discovery (GND).
FIG. 25 depicts an example of a new ND message for information related to access technologies.
FIG. 26 shows an example resource tree of a oneM2M embodiment of the RSUs and/or the RSRC operating as CSEs.

With respect to an example IETF Embodiment for Group Neighbor Discovery (GND) and Access Technology Info Discovery, examples are now described for GND (with GIDs), but the examples also may apply to Access Technology Info. For example, in some cases, the GID can be replaced with Access Technology Type and/or Access Technology L2 Address. FIG. 24 shows an example new ND message, specifically, GND, which can be defined for group discovery as described above. For an example solicitation, a new Type field value can be set to "Group Neighbor Discovery Solicitation", and for an example advertisement a field can be set to "Group Neighbor Discovery Advertisement". The Group ID may contain the GID that is being solicited or advertised. In the illustrated example, the More Options indicates the number of Group ID entries in the message. FIG. 25 shows an example of a similar new message defined for Access Technology Info. Referring to FIG. 25, the type may be set to "Access Technology Information Solicitation" or "Access Technology Information Advertisement" for solicitation or advertisement messages. The first Length field may indicate the length of the whole ND message. The Access Type field may indicate the type of access (e.g., a value of 00000001 may indicate cellular, etc). The Length field following the Access Type field may indicate the length of the Link Layer Address and the IP Address/Prefix fields. The More Options may indicate if there is an additional entry after the IP Address/Prefix field. In some examples, an entry refers to the fields starting from the Access Type up until the IP Address/Prefix field. In some cases, instead of defining new messages, the Options field in existing ND messages can be defined with values to indicate any of the above information. Then, a container for GID, or a list of entries of access technology info can follow the field, or the messages as defined above can follow the Options field.

With respect to an example IETF Embodiment for PMIP Optimization, regardless of the protocol that is used for implementing the tunnel creation/deletion between MAGs and LMA, the various embodiments may be implemented. In an example, a new message is defined to enable an LMA-triggered tunnel establishment towards the MAG. The message may contain, for example and without limitation, the tunnel end-point identity or address, the identity of the device for which the tunnel is being setup (where the ID may be a permanent ID and not an IP address or a L2 address), the L2 address of the device for which the tunnel is being setup, the device's IP address, an optional service ID, a switch criteria (to be forwarded by the RSU to the device), and/or an assigned prefix. This message may be called (as an example) LMA-Proxy Binding Update (L-PBU).

In an example, a new message may be defined for a MAG to acknowledge the receipt of the LMA-triggered tunnel establishment. This message may be called (as an example) MAG-Proxy Binding Acknowledge (M-PBA). The same message (e.g., the M-PBA), or a new message (e.g., Proxy Binding Update Complete (PBU-C)) may be used by a MAG to inform an LMA (e.g., a W-LMA) that a device for which a tunnel was already established (e.g., by an LMA-triggered procedure) has connected with the RSU. The message may also include the identity of the device (e.g., where the ID may be a permanent ID and not an IP address or a L2 address), the L2 address of the device, the assigned prefix, etc.

Turning now to example oneM2M embodiments, in some cases, an RSU and RSRC can be an oneM2M Common Service Function (CSF), and a Vehicle can be an Application Entity (AE) and/or a CSF. For example, referring to FIG. 18, interactions between the Vehicle 1802 and the RSU 1804, and interactions between RSU 1804 and the RSRC 1806, may be implemented as oneM2M primitives (e.g., RESTful operations). Operations 1 and 2 can be implemented by expanding oneM2M CSE registration. Specifically, "RSU Info" may be a new parameter to a CSE registration request primitive, and "rsuInfo" and "remoteRsuInfo" may be new attributes to CSEBase resource and/or remoteCSE resource. In some cases, a "next fresh timer" may be a new parameter to a CSE registration response primitive and a "nextFreshTimer" may be a new attribute to CSEBase resource and/or remoteCSE resource. In some examples, the RSU Info parameter may also include the Service Info parameters proposed earlier herein. Alternatively, a different or parameter called "Service Info" can be used in the message and hence a "serviceInfo" attribute can also be defined as a new attribute to the CSEBase resource and/or remoteCSE resource. In some examples, the "remoteRsuInfo" represents the attributes (e.g., RSU Info parameters) related to other RSUs. For example, if an RSU A is registering to the RSRC (acting like the CSEBase), then the RSRC may create a "remoteRSUInfo" corresponding to the RSU Info for RSU A. Similarly, when RSU B registers, there may be another "remoteRsuInfo" corresponding to the RSU Info in RSU B, etc.

Alternatively, an RSU A (acting as an IN-CSE or remote CSE) may have the "rsuInfo" attribute, which corresponds to the RSU Info of RSU A. Moreover, RSU A can obtain (e.g., from the RSRC via a Retrieve operation or other mechanisms) RSU Info pertaining to RSU B and RSU C. Thus, RSU A may have a different "remoteRsuInfo" attribute representing the RSU Info for each of RSU B and RSU C.

Referring again to FIG. 18, operations 6 and 7 can be implemented by expanding oneM2M resource discovery. Specifically, "service info" and "location" may be new filter criteria for oneM2M resource discovery. Table 2 shows example attributes of the CSEBase resource with the inclusion of "rsuInfo", "remoteRsuInfo" and "nextFreshTimer" attributes as proposed above. These attributes can also be applicable to the remoteCSE resource.

TABLE 2

Example Attributes in the CSEBase

| Attributes of >CSEBase> | Multiplicity | RW/RO/WO | Description |
|---|---|---|---|
| resourceType | 1 | RO | See clause 9.6.1.3. |
| resourceID | 1 | RO | See clause 9.6.1.3. |
| resourceName | 1 | RO | See clause 9.6.1.3. |
| parentID | 1 | RO | See clause 9.6.1.3. Shall be NULL. |
| creationTime | 1 | RO | See clause 9.6.1.3. |
| lastModifiedTime | 1 | RO | See clause 9.6.1.3. |
| accessControlPolicyIDs | 0 . . . 1 (L) | RO | See clause 9.6.1.3. |
| Labels | 0 . . . 1 (L) | RO | See clause 9.6.1.3. |
| dynamicAuthorizationConsultationIDs | 0 . . . 1 (L) | RO | See clause 9.6.1.3. |
| cseType | 0 . . . 1 | RO | Indicates the type of CSE represented by the created resource: Mandatory for an IN-CSE, hence multiplicity (1). Its presence is subject to SP configuration in case of an ASN-CSE or a MN-CSE. |
| CSE-ID | 1 | RO | The CSE identifier in SP-relative CSE-ID format (clause 7.2). |
| supportedResourceType | 1 (L) | RO | List of the resource types which are supported in the CSE. This attribute contains subset of resource types listed in clause 9.2. |
| pointOfAccess | 1 (L) | RO | Represents the list of physical addresses to be used by remote CSEs to connect to this CSE (e.g. IP address, FQDN). This attribute is exposed to its Registree. |
| nodeLink | 0 . . . 1 | RO | The resource identifier of a <node> resource that stores the node specific information of the node on which the CSE represented by this <CSEBase> resource resides. |
| rsuInfo | 0 . . . 1 (L) | RW | Provides RSU information such as those shown in Table 3 |
| nextFreshTimer | 0 . . . 1 | RW | A timer value used to refresh about the RSU |
| notificationCongestionPolicy | 0 . . . 1 | RO | This attribute applies to CSEs generating subscription notifications. It specifies the rule which is applied when the storage of notifications for each subscriber (an AE or CSE) reaches the maximum storage limit for notifications for that subscriber. E.g. Delete stored notifications of lower notificationStoragePriority to make space for new notifications of higher notificationStoragePriority, or delete stored notifications of older creationTime to make space for new notifications when all notifications are of the same notificationStoragePriority. |
| e2eSecInfo | 0 . . . 1 | RO | See clause 9.6.1.3. |

Table 2 shows example attributes in the CSEBase, which can be in an RSRC or an RSU. In some cases, the same set of attributes can be in a remote CSE that can be in a vehicle or RSU. Although not shown, other attributes (e.g. "serviceInfo") can also be defined in these CSEs.

FIG. 26 shows an example resource tree of an oneM2M embodiment of the RSUs and/or the RSRC operating as CSEs. Both rsuInfo and nextFreshTimer attributes can be added to either the CSEBase or RemoteCSE resource to provide information about the RSUs. In one example scenario, a local RSU can be realized as an MN-CSE (e.g., CSEBase resource) and the RSRC can be an IN-CSE (e.g., remoteCSE resource). In this example scenario, the rsuInfo attribute for CSEBase provides RSU information about the local RSU, while the rsuInfo attribute for the remoteCSE resource provides RSU information about the RSRC. The RSRC can have multiple RSUs in its service territory and hence will have multiple remoteCSE resources in its resource tree. As a result, the RSRC may able to provide RSU information about those RSUs in the RSU Discovery procedure proposed above.

As such, a vehicle may obtain RSU Info from either the RSUs or the RSRC, as described above. In some cases, the "rsuInfo" attribute can include the parameters provided by the RSU Info and the Service Info parameters that were presented earlier. Table 3 below shows example parameters or sub-attributes that may be contained in the "rsuInfo" attribute presented above.

In some cases, a CSE may contain information that is local to another remote CSE whose content is also the "rsuInfo" attribute and "serviceInfo" attribute. For example, an RSU may have its an "rsuInfo" attribute reflecting its local RSU Info, and may also have at least one remoteCSE attribute in its resource tree, where the remoteCSE attribute contains an "rsuInfo" attribute related to the RSU Info in other RSUs. FIG. 26 shows an example of this concept, wherein the example shows an RSU having RSU Info that is local, and also having RSU Info that is associated with another RSU. FIG. 26 shows the attributes related to "rsuInfo" by way of example, thus the other attributes are not shown in FIG. 26 for simplicity.

TABLE 3

Example Parameters in the "rsuInfo" Attribute

| Parameters Name | Description |
| --- | --- |
| channelInfo | indicates the channel on which RSU Info or Service Info will be transmitted |
| prefixInfo | the Prefix Information as defined in the ND protocol [4] |
| locationInfo | information about the location of the RSU. This can be coordinate information (e.g. x, y, z coordinates), longitude, latitude, address, street name (may include zipcode), GPS based location information, or any other type of location information that can help determine where the RSU is located |
| ipConfigInfo | indicates how the IP address of the receiving entity (e.g. vehicle, pedestrian, etc) can be acquired, e.g. using SLAAC or DHCP or through some other means of IP address provisioning |
| dnsSupport | indication about the support of DNS services, by or via this RSU. If supported, the address of the DNS server is also provided |
| relaySupport | indicates whether the RSU is capable to act as a relay (for V2V or V2I). There may be one indication for relay capability between vehicles (i.e. vehicles communicate via the relay), and an indication for an RSU being capable to relay to another RSU |
| accessTechnology | indicates whether the RSU supports other access technologies, and provides the L2 address(es) per access technology of the RSU |
| connectivityType | whether the RSU provides a connection to the Internet, and/or whether the RSU provides a connection to a local IP domain/network (local IP service) |
| coverageArea | the location information where this RSU information is valid. For example, the provided RSU information may be valid within an area of 1 square kilometer. Note that this is just an example, however, the proposal is that a valid location may be included. Thus, the information will only be useful or accurate within the indicated location |
| validityPeriod | the period of time during which this information is valid and after which a refresh of the information should be done |
| services | list of services that can be obtained from the RSU. For example, this list could include indications that the RSU can be used to obtain Internet connectivity, connectivity to local IP networks, local radio, video gaming, send SMS messages, place voice calls, place only emergency calls, list of local restaurants, local events, video streaming, etc |

As mentioned earlier, a separate attribute referred to as a "serviceInfo" attribute can also be defined which contains any subset or all of the parameters of the "rsuInfo". For example, a vehicle may register with an RSU using oneM2M registration messages. The vehicle may use an AE identity that is preconfigured in the vehicle. Similarly, an RSU or the vehicle can include filter criteria in the Retrieve message. Some examples of filter criteria are now discussed.

Table 4 below presents new example filters that can be used as parameters for making available, to a requesting node, necessary information in the form of RSU Info and/or Service Info described above.

TABLE 4

Example Filter Criteria for Retrieving RSU Info or Service Info

| Condition Tag | Multiplicity | Example Matching Condition |
| --- | --- | --- |
| locationInfo | 0 . . . 1 | The location parameter of the rsuInfo, remoteRsuInfo, remoteServiceInfo, or serviceInfo is the same as the specified value |
| services | 0 . . . 1 | The services of the rsuInfo, remoteRsuInfo, remoteServiceInfo, or serviceInfo is the same as the specified value |
| accessTechnology | 0 . . . 1 | The accessTechnology parameter of the rsuInfo, remoteRsuInfo, remoteServiceInfo, or serviceinfo is the same as the specified value |
| capability | 0 . . . 1 | The capability parameter of the rsuInfo, remoteRsuInfo, remoteServiceInfo, or serviceInfo is the same as the specified value |
| coverageArea | 0 . . . 1 | The coverageArea parameter of the rsuInfo, remoteRsuInfo, remoteServiceInfo, or serviceInfo is the same as the specified value |
| connectivityType | 0 . . . 1 | The connectivityType parameter of the rsuInfo, remoteRsuInfo, remoteServiceInfo, or serviceInfo is the same as the specified value |

Figure 27:
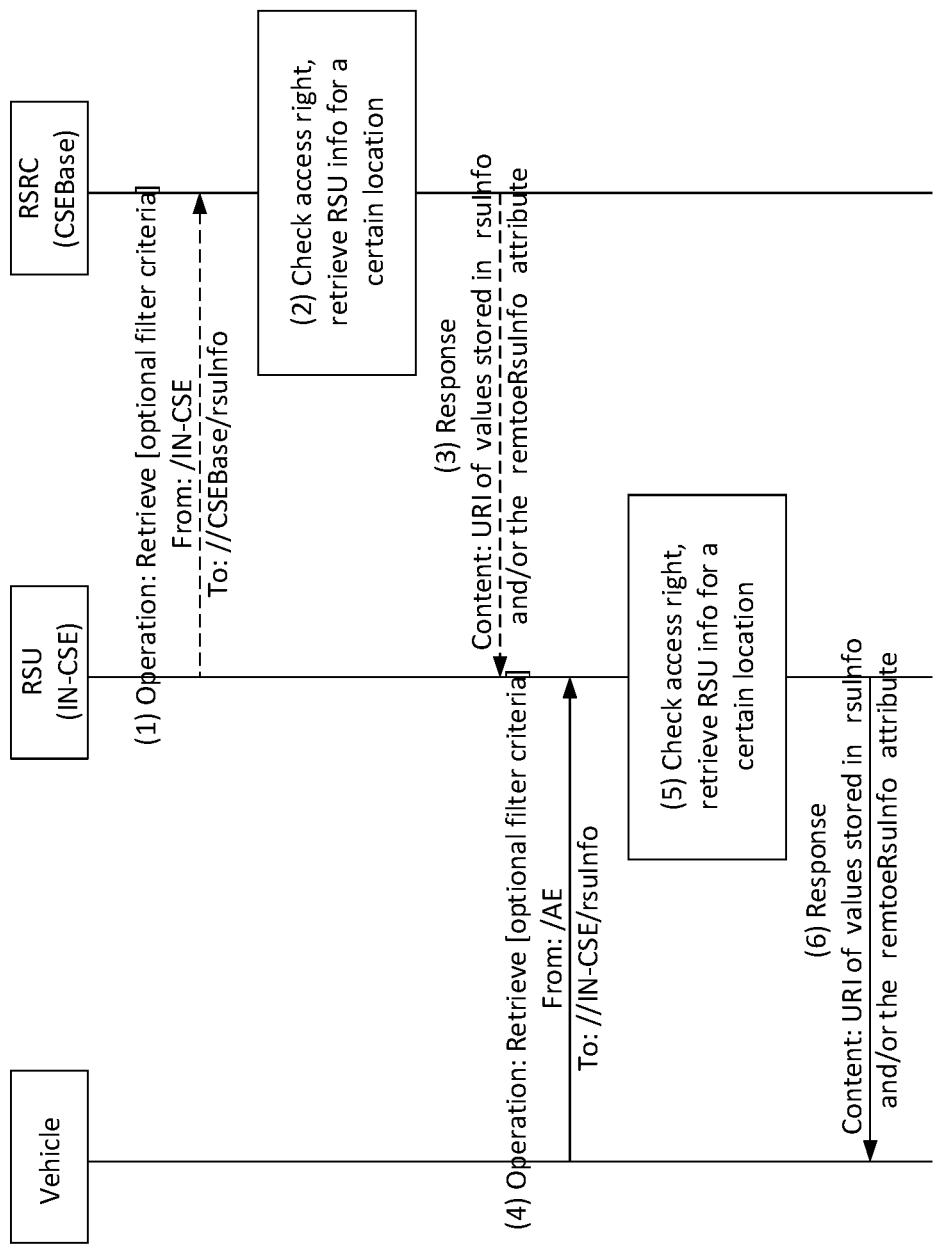
FIG. 27 is a call for in which a vehicle or an RSU uses the Retrieve operation to get RSU Info from an RSU or an RSRC, respectively, in accordance with an example embodiment.

RSU may register with a network node (e.g., RSRC) using oneM2M messages. The RSU may be configured with a remoteCSE identity that is preconfigured in the RSU. FIG. 27 shows an example of how a vehicle or an RSU may uses the Retrieve operation to get RSU Info from an RSU or an RSRC, respectively.

In some cases, the RSU retrieve operation may be optional and may happen at the time when the vehicle sends a retrieve request to the RSU, although FIG. 27 shows that the RSU sends the retrieve operation from the RSRC. The In some cases, each of the example parameters in Table 3 can be used as a filter criterion, and it will be understood that the criteria shown in Table 4 serve as one example, among others.

Referring now to FIG. 26, an example GUI is shown, which can be displayed in a vehicle described herein. In accordance with the illustrated example, the screen provides the user with a snapshot of the map around the car, and the option to discover an access point or find local services (as an example). The user may, for example, choose to see the nearby access points for this area (e.g., discover RSUs).

Figure 28:
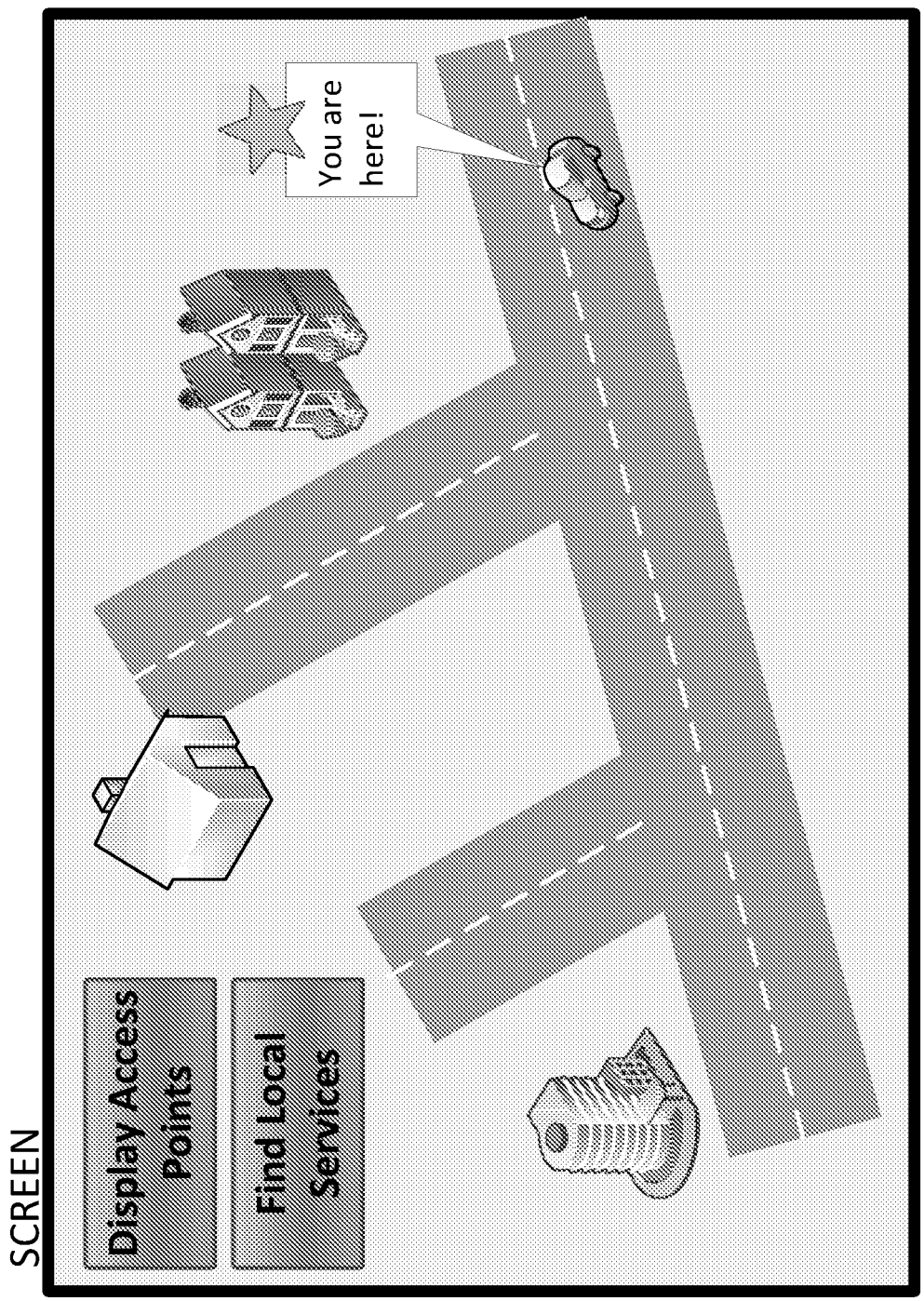
FIG. 28 is an example user interface (UI) for showing access points (e.g., RSUs) and services.
Figure 29:
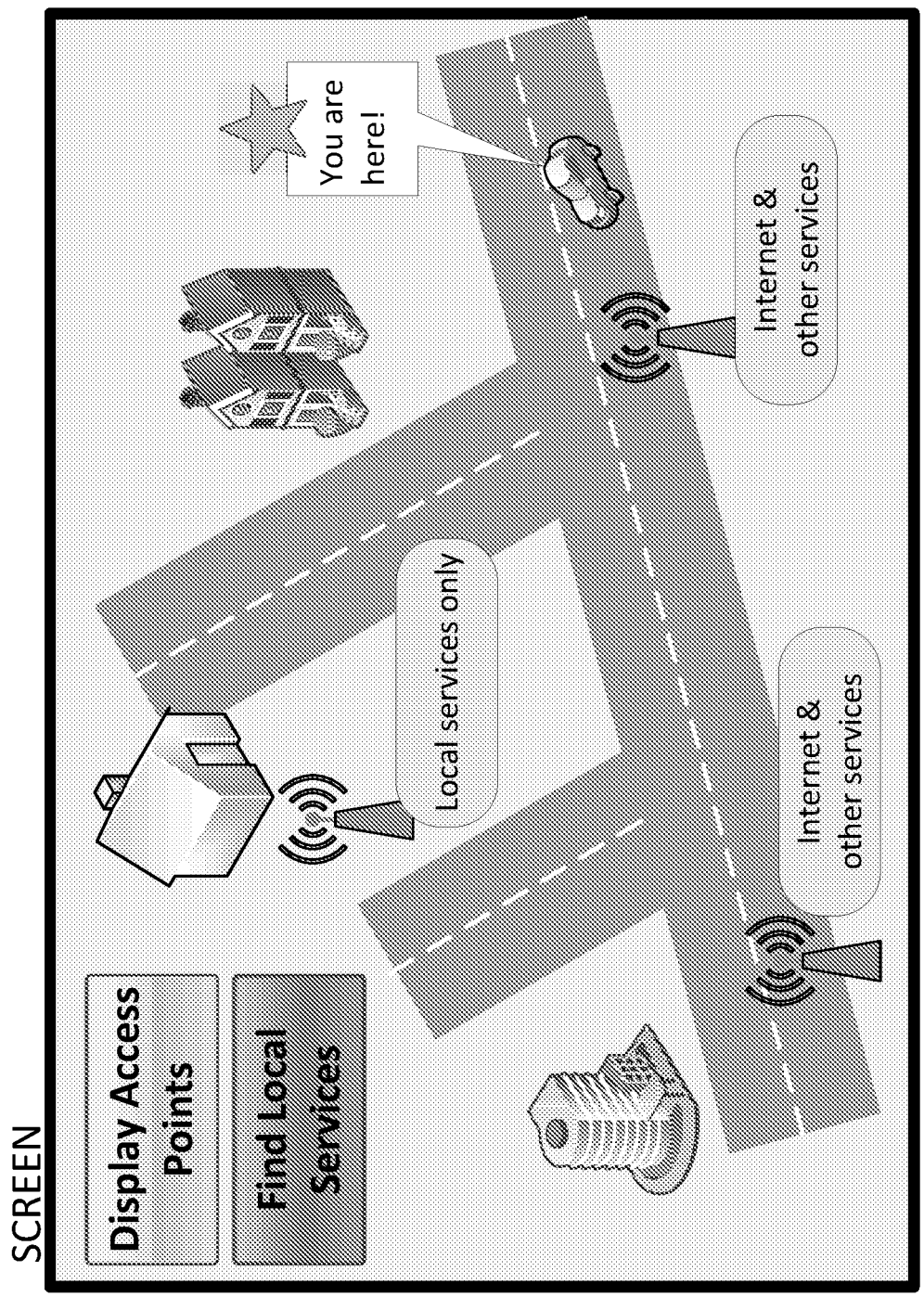
FIG. 29 is an example UI for displaying neighboring access points.
Figure 30:
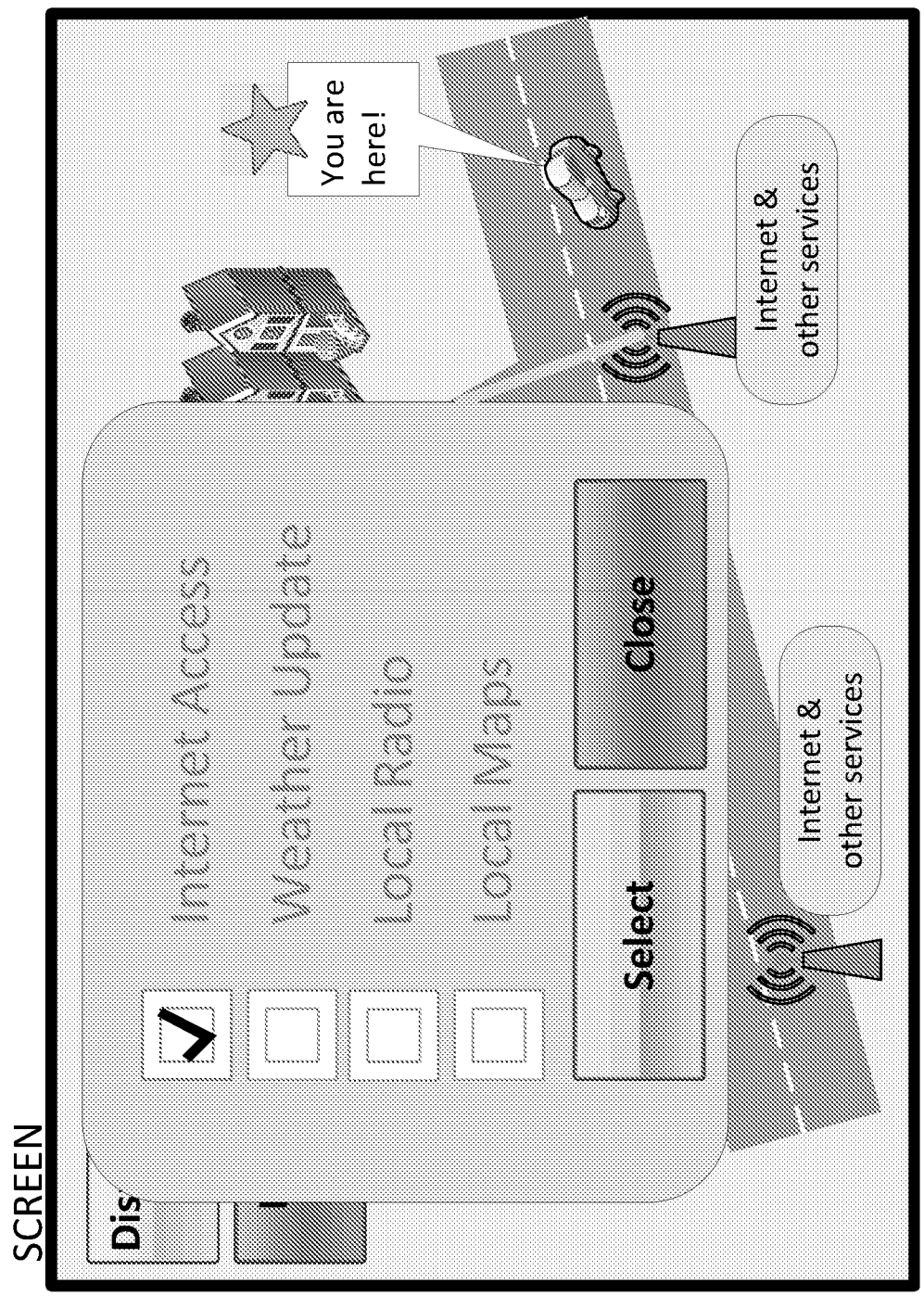
FIG. 30 is an example UI for displaying services that are available via an access point.

After selecting the example "Display Access Points" option, the screen, in FIG. 27, shows example access points around the car, and also indicates if each access point provides any services. For example, the "Internet & other services" indicates that the access point or RSU has both Internet and other (e.g., local) services. In some examples, the user may select one of the access point service indicators. For example, the user may select the access point on the bottom right of the screen, which may generate a pop-up on the screen exemplified by FIG. 28. The pop-up may indicate the type of services (e.g., Internet, Local Radio, etc.) The user may select a service (e.g. Internet Access) and can then press "Select", which may trigger the vehicle to select and connect to the RSU.

It will be understood that the above-described examples of service and RSU discovery are not exhaustive, and the user may make other determinations or selections using the GUIs as desired. Thus, it will be further understood that the GUIs can provide a user with various information in which the user is interested via a variety of charts or alternative visual depictions.

FIGS. 8-30 and the description related thereto illustrate various embodiments of methods and apparatuses for enabling efficient vehicular services. In these figures, particularly FIGS. 9A-16, 18, 19, 21, and 27, various steps or operations are shown being performed by one or more nodes, devices, functions, or networks. It is understood that the nodes, devices, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 17 or 20, or 31A or 31B described below. That is, the methods illustrated in FIGS. 9A-16, 18, 19, 21, and 27 may be implemented in the form of software (e.g., computer-executable instructions) stored in a memory of a network node or apparatus, such as for example the node or computer system illustrated in FIG. 31C or 31D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 31C and 31D, respectively) of the node under control of the processor of the node and the computer-executable instructions (e.g., software) that it executes.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms apparatus, vehicle, vehicle apparatus, road side unit, road side unit apparatus, pedestrian, network apparatus, node, device, and network node may be used interchangeably, unless otherwise specified.

Figure 31A:
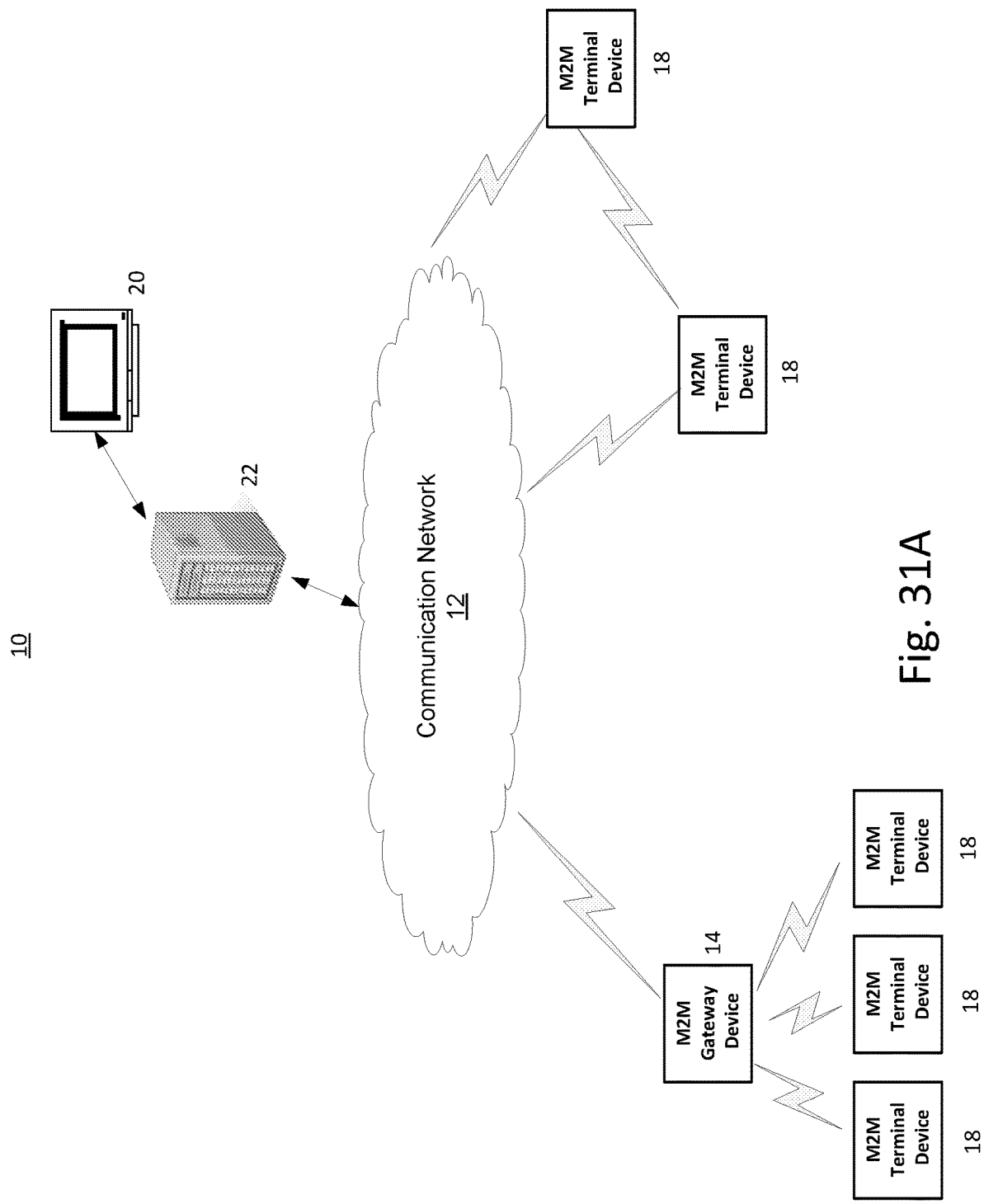
FIG. 31A is a system diagram of an example machine-to-machine (M2M), Internet of Things (IoT), or Web of Things (WoT) communication system in which one or more disclosed embodiments may be implemented.

FIG. 31A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the vehicle, RSU, or devices illustrated in any of FIGS. 9A-16, 18, 19, 21, and 27 may comprise a node of a communication system, such as the ones illustrated in FIG. 17, 20, 31A, or 31B.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 31A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 31A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 31B:
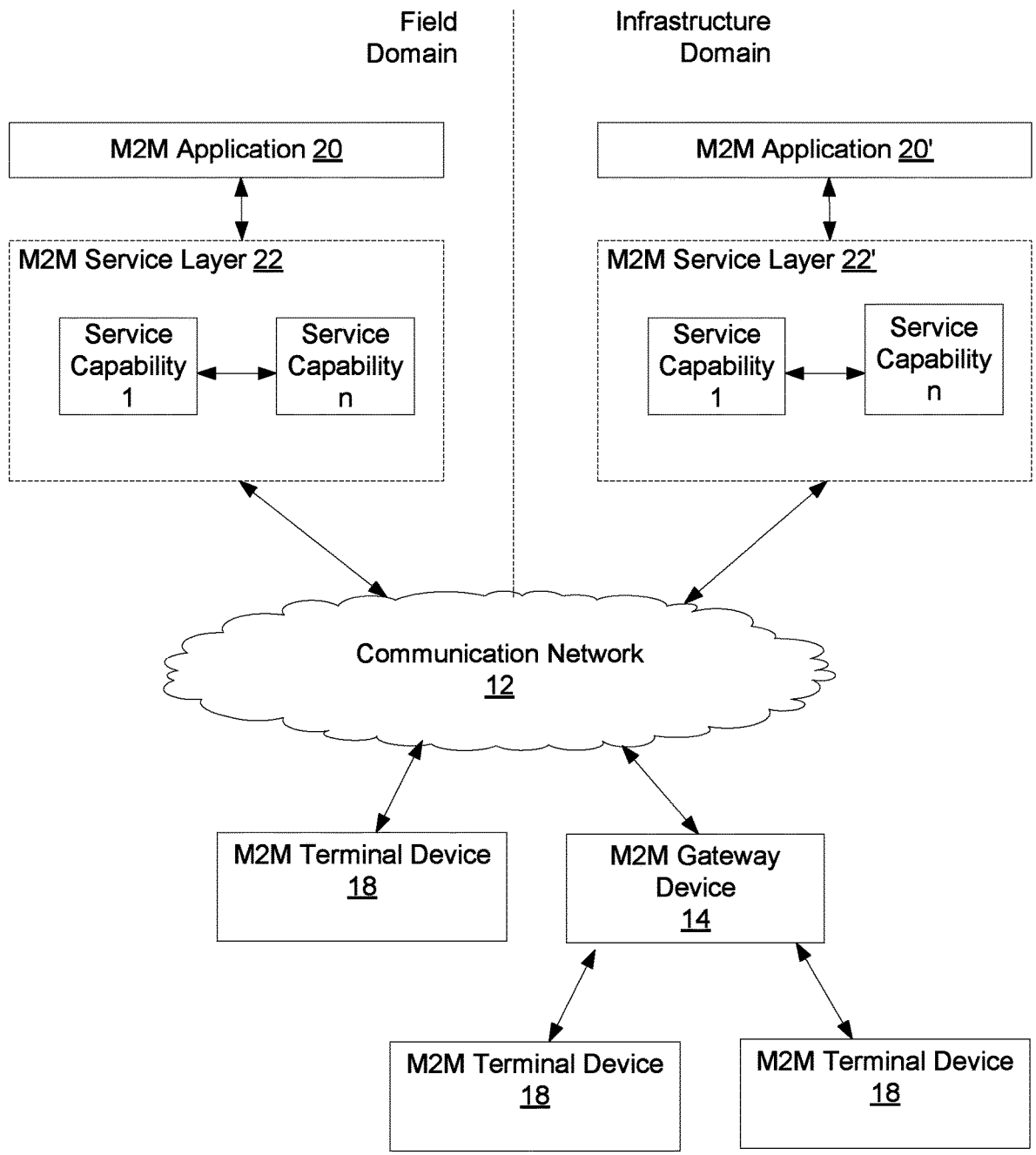
FIG. 31B is a system diagram of an example architecture that may be used within the M2M/IoT/WoT communications system illustrated in FIG. 31A.

Referring to FIG. 31B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 31B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 31B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 31C or FIG. 31D described below.

Further, the methods and functionalities described herein may be implemented as part of an M2M network that uses a Service Oriented Architecture (SOA) and/or a Resource-Oriented Architecture (ROA) to access services.

Figure 31C:
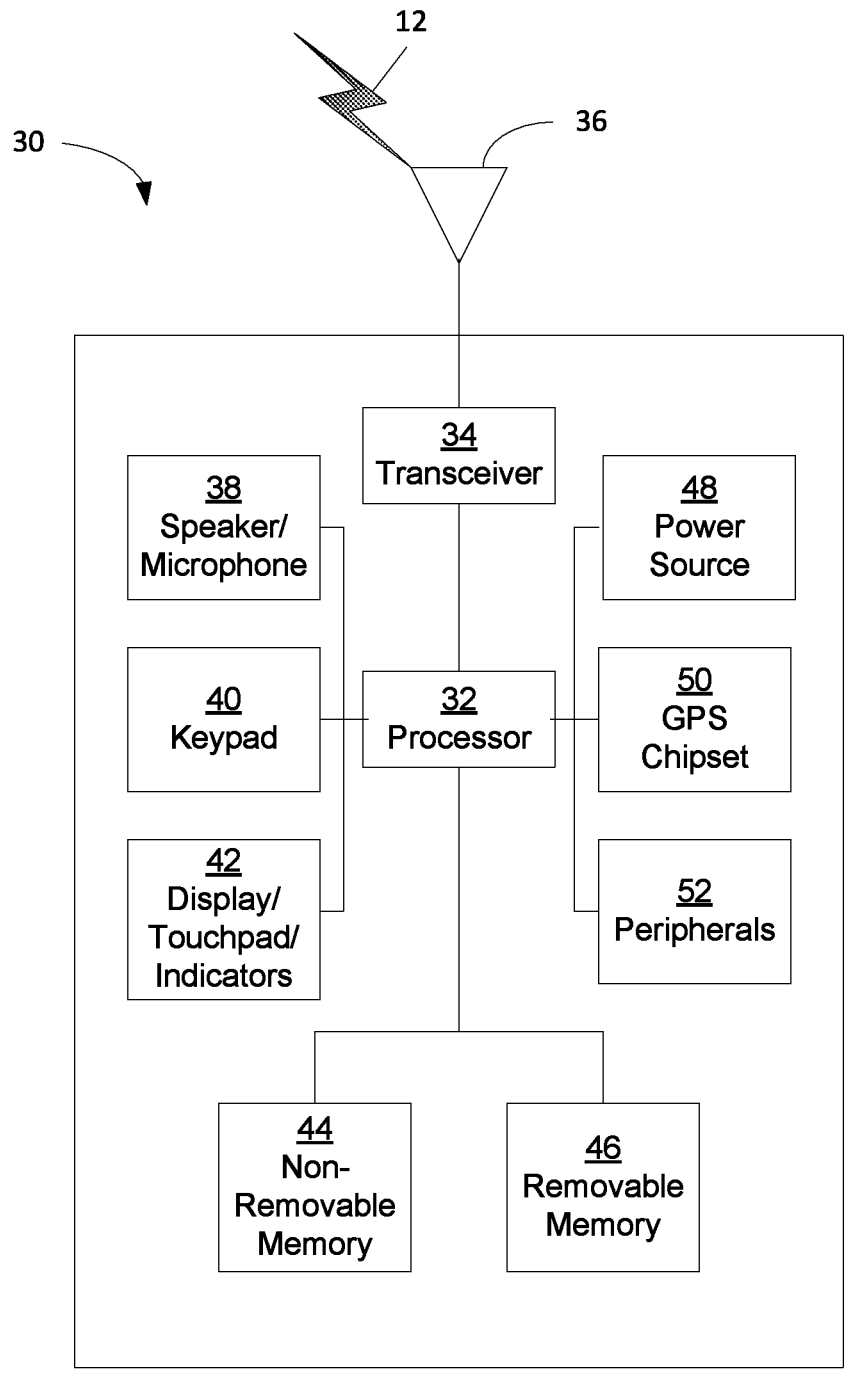
FIG. 31C is a system diagram of an example communication network node, such as an M2M/IoT/WoT device, gateway, or server that may be used within the communications system illustrated in FIGS. 31A and 31B.

FIG. 31C is a block diagram of an example hardware/software architecture of a node of a network, such as one of the vehicles, RSU, or devices illustrated in FIG. 9A-16, 18, 19, 21, or 27, which may operate as an M2M server, gateway, device, or other node in an M2M network such as that illustrated in FIG. 31A or 31B. As shown in FIG. 31C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements vehicular services, e.g., in relation to the methods described in reference to FIG. 9A-16, 18, 19, 21, or 27, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 31C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the interworking steps herein, e.g., in relation to FIG. 9A-16, 18, 19, 21, or 27, or in a claim. While FIG. 31C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 31C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 31D:
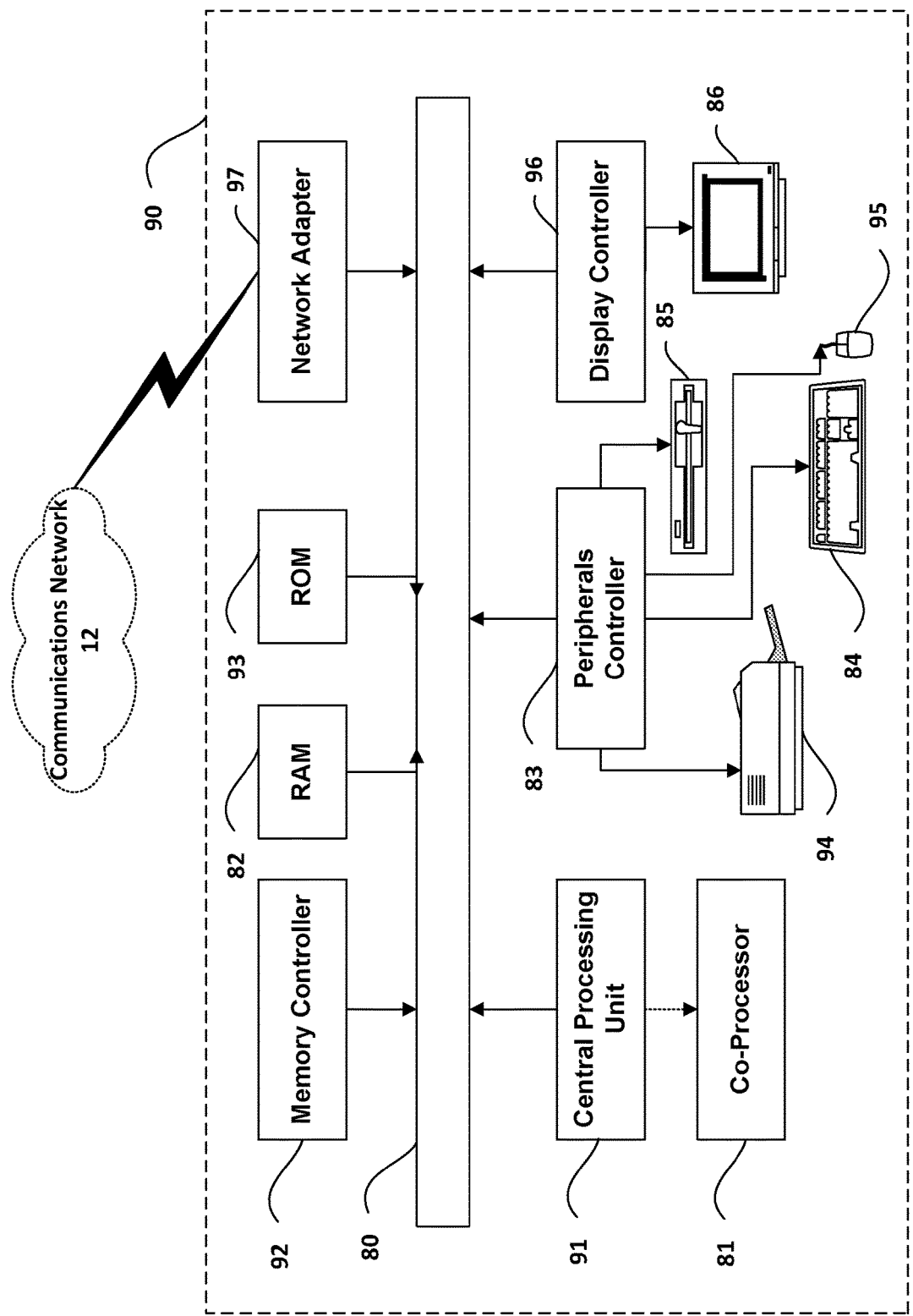
FIG. 31D is a block diagram of an example computing system in which a node of the communication system of FIGS. 31A and 31B may be embodied.

FIG. 31D is a block diagram of an exemplary computing system 90 which may also be used to implement one or more nodes of a network, such as the vehicles, RSUs, servers, or devices illustrated in FIG. 9A-16, 18, 19, 21, or 27, which may operate as an M2M server, gateway, device, or other node in an M2M network such as that illustrated in FIG. 17, 20, 31A, or 31B Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 31A-D, to enable the computing system 90 to communicate with other nodes of the network. The communication circuitry, alone or in combination with the CPU 91, may be used to perform the transmitting and receiving steps described herein (e.g., in FIGS. 9A-16, 18, 19, 21, and 27) and in the claims.

The following is a list of acronyms relating to technologies that may appear in the above description. Unless otherwise specified, the acronyms used herein refer to the corresponding term listed below.

3GPP $3^{rd}$ Generation Partnership Project
AE Application Entity
AP Access Point
BSS Basic Service Set
BSSID BSS Identity
CCH Control Channel
CoAP Constrained Application Protocol
CoRE Constrained RESTful Environment
CSE Common Service Entity
D2D Device-to-Device
DHCP Dynamic Host Configuration Protocol
DHCPv6 DHCP version 6 for Internet Protocol version 6
DSRC Dedicated Short Range Communications
GUI Graphical User Interface
HTTP HyperText Transfer Protocol
IEEE Institute of Electrical and Electronics Engineers
IETF Internet Engineering Task Force
IoT Internet of Things
IP Internet Protocol
IPv6 Internet Protocol Version 6
IPWAVE IP Wireless Access in Vehicular Environments
LLC Logical Link Control
LMA Local Mobility Anchor
M2M Machine-to-Machine
MAC Media Access Control
MAG Mobile Access Gateway
MIP Mobile IP
MN Mobile Node
NA Neighbor Advertisement
ND Neighbor Discovery
NS Neighbor Solicitation
OCB Outside the Context of a BSS
OCF Open Connectivity Foundation
OIC Open Interconnection Consortium
PBA Proxy Binding Acknowledgement
PBU Proxy Binding Update
PDU Protocol Data Unit
PHY Physical Layer
PMIP Proxy Mobility IP
PMIPv6 PMIP version 6
ProSe Proximity Services
RA Router Advertisement
REST Representational State Transfer
RFC Request for Comments
RS Router Solicitation
RSRC RSU and Service Repository Center
RSU Road Side Unit
SCH Service Channel
SLAAC Stateless Address Auto-Configuration
TCP Transmission Control Protocol
TD Thing Description
UDP User Datagram Protocol
URI Uniform Resource Identifier
V2I Vehicle-to-Infrastructure
V2P Vehicle-to-Pedestrian
V2V Vehicle-to-Vehicle
WAVE Wireless Access in Vehicular Environment
WG Working Group WRA WAVE RA
WSA WAVE Service Advertisement
WSM WAVE Short Message
WSMP WAVE Short Message Protocol In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A road side unit comprising a processor, a memory, and communication circuitry, the road side unit being connected to a network via its communication circuitry, the road side unit further comprising computer-executable instructions stored in the memory of the road side unit which, when executed by the processor of the road side unit, cause the road side unit to perform operations comprising:
    receiving configuration information related to how the road side unit should advertise information associated with the road side unit; and
    based on the configuration information, sending a transmission of information associated with the road side unit, the transmission being sent over a channel to one or more vehicles, such that the road side unit is selectable by the one or more vehicles based on the information associated with the road side unit,
    wherein the information associated with the road side unit comprises at least one of a location of the road side unit, a coverage area associated with the road side unit, one or more services obtainable via the road side unit, one or more access technologies supported by the road side unit, an indication of a connectivity type associated with the road side unit, or a period of time during which the information is valid.

2. The road side unit as recited in claim 1, further comprising computer-executable instructions that, when executed by the processor of the road side unit, cause the road side unit to perform further operations comprising:
    receiving a solicitation, from the one or more vehicles, for the information associated with the road side unit, wherein the transmission of information associated with the road side unit is sent in response to the solicitation.

3. The road side unit as recited in claim 1, wherein the transmission is sent in a neighbor discovery message, and the information associated with the road side unit further comprises information associated with one or more road side units adjacent to the road side unit.

4. The road side unit as recited in claim 1, wherein the configuration information is received from the network.

5. The road side unit as recited in claim 1, wherein the configuration information is received via a user interface communicatively coupled to the road side unit.

6. The road side unit as recited in claim 1, wherein the computer-executable instructions, when executed by the processor of the road side unit, further cause the road side unit to perform operations comprising:
    receiving a first request for information associated with road side units, the request indicating one or more areas pertaining to the first request for information;
    determining whether the information pertaining to the one or more areas is available at the road side unit;
    if the information pertaining to the one or more areas is not available at the road side unit, determining one or more target road side units corresponding to the one or more areas; and
    if the information pertaining to the one or more areas is available at the road side unit, sending a response to one or more vehicles, the response comprising the information pertaining to the one or more areas.

7. The road side unit as recited in claim 6, further comprising computer-executable instructions that, when executed by the processor of the road side unit, cause the road side unit to perform further operations comprising:
    when the information pertaining to the one or more areas is not available at the road side unit, sending a second request to the one or more target road side units so that the one or more target road side units can determine whether the information is available at the target road side unit for the one or more areas.

8. The road side unit as recited in claim 6, further comprising computer-executable instructions that, when executed by the processor of the road side unit, cause the road side unit to perform further operations comprising:
    when the information pertaining to the one or more areas is not available at the road side unit, sending a second request to a road side unit repository that comprises coverage areas of a plurality of road side units.

9. The road side unit as recited in claim 8, wherein the one or more areas pertaining to the first request for information define a number of areas, and the second request is sent when the number of areas exceeds a predetermined threshold.

10. The road side unit of claim 1, wherein the road side unit is deployed on one of a road and a traffic light.

11. A method comprising:
    receiving, by a road side unit, configuration information related to how the road side unit should advertise information associated with the road side unit; and
    based on the configuration information, sending a transmission of information associated with the road side unit, the transmission being sent over a channel to one or more vehicles, such that the road side unit is selectable by the one or more vehicles based on the information associated with the road side unit,
    wherein the information associated with the road side unit comprises at least one of a location of the road side unit, a coverage area associated with the road side unit, one or more services obtainable via the road side unit, one or more access technologies supported by the road side unit, an indication of a connectivity type associated with the road side unit, or a period of time during which the information is valid.

12. The method recited in claim 11, further comprising:
    receiving, by the road side unit, a solicitation, from the one or more vehicles, for the information associated with the road side unit, wherein the transmission of information associated with the road side unit is sent in response to the solicitation.

13. The method as recited in claim 11, wherein the transmission is sent in a neighbor discovery message, and the information associated with the road side unit further comprises information associated with one or more road side units adjacent to the road side unit.

14. The method as recited in claim 11, wherein the configuration information is received from the network.

15. The method as recited in claim 11, wherein the configuration information is received via a user interface communicatively coupled to the road side unit.

16. The method as recited in claim 11, further comprising:
receiving, by the road side unit, a first request for information associated with road side units, the request indicating one or more areas pertaining to the first request for information;
determining whether the information pertaining to the one or more areas is available at the road side unit;
if the information pertaining to the one or more areas is not available at the road side unit, determining one or more target road side units corresponding to the one or more areas; and
if the information pertaining to the one or more areas is available at the road side unit, sending a response to one or more vehicles, the response comprising the information pertaining to the one or more areas.

17. The method as recited in claim 16, further comprising:
when the information pertaining to the one or more areas is not available at the road side unit, sending a second request to the one or more target road side units so that the one or more target road side units can determine whether the information is available at the target road side unit for the one or more areas.

18. The method as recited in claim 16, further comprising:
when the information pertaining to the one or more areas is not available at the road side unit, sending a second request to a road side unit repository that comprises coverage areas of a plurality of road side units.

19. The method as recited in claim 18, wherein the one or more areas pertaining to the first request for information define a number of areas, and the second request is sent when the number of areas exceeds a predetermined threshold.

20. The method of claim 11, wherein the road side unit is deployed on one of a road and a traffic light.

* * * * *